US010928578B2

(12) United States Patent
Yagi et al.

(10) Patent No.: US 10,928,578 B2
(45) Date of Patent: Feb. 23, 2021

(54) LIGHTING DEVICE AND DISPLAY DEVICE

(71) Applicant: SHARP KABUSHIKI KAISHA, Sakai (JP)

(72) Inventors: Shugo Yagi, Yonago (JP); Takeshi Ishida, Sakai (JP); Yuuichi Kanbayashi, Sakai (JP); Satoshi Tsubooka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/747,302

(22) Filed: Jan. 20, 2020

(65) Prior Publication Data

US 2020/0233145 A1 Jul. 23, 2020

(30) Foreign Application Priority Data

Jan. 21, 2019 (JP) ............................ JP2019-008050

(51) Int. Cl.
*F21V 8/00* (2006.01)

(52) U.S. Cl.
CPC ......... *G02B 6/0053* (2013.01); *G02B 6/0036* (2013.01); *G02B 6/0038* (2013.01); *G02B 6/0055* (2013.01); *G02B 6/0056* (2013.01)

(58) Field of Classification Search
CPC .. G02B 6/0053; G02B 6/0036; G02B 6/0038; G02B 6/0055; G02B 6/0056
See application file for complete search history.

(56) References Cited

U.S. PATENT DOCUMENTS 6,027,220 A * 2/2000 Arai ..................... G02B 6/0056 362/19
2008/0094552 A1* 4/2008 Kim ..................... G02B 6/0038 349/113
2008/0205066 A1* 8/2008 Ohta .................... G02B 6/0065 362/311.06
2009/0080196 A1* 3/2009 Shibasaki ............. G02B 5/045 362/277
2013/0265512 A1* 10/2013 Oshima ................ G02B 6/0053 349/33
2016/0054507 A1* 2/2016 Hirayama ............ G02B 6/0091 349/65
2016/0313496 A1* 10/2016 Hirayama ......... G02F 1/133606
2017/0038515 A1* 2/2017 Yuki .................... G02B 6/0061
2017/0115446 A1* 4/2017 Hirayama ............ G02B 6/0056
2017/0322348 A1* 11/2017 Shimamura .......... G02B 6/0051
2017/0363798 A1* 12/2017 Hirayama ............ G02B 6/0061
2019/0285949 A1* 9/2019 Chen ................. G02F 1/133606

FOREIGN PATENT DOCUMENTS

JP 2009-266792 A 11/2009
WO WO-2013085129 A1 * 6/2013 ........... G02B 6/0053

* cited by examiner

*Primary Examiner* — Alexander K Garlen
(74) *Attorney, Agent, or Firm* — ScienBiziP, P.C.

(57) ABSTRACT

First and second prism sheets have pluralities of first and second unit prisms, respectively, arranged along a first direction and extending along a second direction, each of which has a base that is parallel to the first direction and a pair of oblique sides standing from both ends, respectively, of the base, and an angle that a second LED facing oblique side, which is one of the oblique sides that faces toward the LED, forms with respect to the base in the first direction in the second unit prism is smaller than an angle that a first LED facing oblique side that faces toward the LED forms with respect to the base in the first direction in the first unit prism.

13 Claims, 47 Drawing Sheets

12
16
21
23
23A1
23A2
23A
15B
24
15C
15
17
18
19
20
18A
18B
18B1
18B2
18B3
19A
19B
19B1
19B2
19B3
θ1
θ2
θ3
θ4
θ5
θ6
Y
Z 12
16
23A
15B
15C
23A
22A1
22A
22A1
23
22
15
21A1
21A
21
19A
18A
18
17
19
20
X
Z 23A
23A1
23A2
24
23A
23A
23A1
23A2
24
22
X
Y

RELATIVE LUMINANCE (%)
100
80
60
40
20
0
ANGLE (DEGREES)
-80
-60
-40
-20
0
20
40
60
80

FIG. 13

| | COMPARATIVE EXAMPLE 1 | COMPARATIVE EXAMPLE 2 | EXAMPLE 1 |
|---|---|---|---|
| MAXIMUM LUMINANCE (RELATIVE LUMINANCE) | 300 cd/$m^2$ (100%) | 345 cd/$m^2$ (115%) | 375 cd/$m^2$ (125%) |
| FULL ANGLE AT HALF MAXIMUM IN Y-AXIS DIRECTION | 52 DEGREES | 33 DEGREES | 43 DEGREES |
| FULL ANGLE AT HALF MAXIMUM IN X-AXIS DIRECTION | 60 DEGREES | 45 DEGREES | 52 DEGREES |
| VIEWING ANGLE DETERMINATION | GOOD | NARROW | GOOD |

LIGHT-GUIDING PLATE
FIRST PRISM SHEET
RELATIVE LUMINANCE (%)
100
80
60
40
20
0
ANGLE (DEGREES)
−90
−60
−30
0
30
60
90

90 DEGREES
100 DEGREES
110 DEGREES
70 DEGREES
80 DEGREES
LUMINANCE (cd/m²)
1600
1200
800
400
0
-90
-60
-30
0
30
60
90
ANGLE (DEGREES)

FIG. 18

| $\theta 6$ (DEGREES) | 70 | 80 | 90 | 100 | 110 |
|---|---|---|---|---|---|
| MAXIMUM LUMINANCE ($cd/m^2$) | 1962 | 2755 | 3044 | 2604 | 3063 |
| FULL ANGLE AT HALF MAXIMUM (DEGREES) | 29 | 22 | 20 | 27 | 31 |

FIG. 19

| $\theta 6$ (DEGREES) | 70 | 80 | 90 | 100 | 110 |
|---|---|---|---|---|---|
| MAXIMUM LUMINANCE ($cd/m^2$) | 1100 | 1233 | 1464 | 1294 | 1393 |
| FULL ANGLE AT HALF MAXIMUM (DEGREES) | 59 | 41 | 38 | 47 | 47 |

FIG. 23

| $\theta 2$ (DEGREES) | 60 | 55 | 50 | 45 | 40 | 35 | 30 | 25 |
|---|---|---|---|---|---|---|---|---|
| RELATIVE LUMINANCE (%) | 76 | 90 | 99 | 100 | 97 | 96 | 92 | 87 |

FIG. 25

| $\theta 1$ (DEGREES) | 35 | 40 | 45 | 50 | 55 | 60 | 65 |
|---|---|---|---|---|---|---|---|
| RELATIVE LUMINANCE (%) | 96 | 100 | 106 | 112 | 123 | 115 | 110 |

FIG. 27

| | REFRACTIVE INDEX | CHROMATICITY x | CHROMATICITY y | VARIATION IN x VALUE | VARIATION IN y VALUE |
|---|---|---|---|---|---|
| REFERENCE EXAMPLE 1 | 1.57 | 0.333 | 0.347 | - | - |
| FIRST UNIT PRISM | 1.49 | 0.331 | 0.344 | -0.002 | -0.003 |
| | 1.52 | 0.336 | 0.348 | 0.003 | 0.002 |
| | 1.55 | 0.340 | 0.352 | 0.007 | 0.005 |
| | 1.57 | 0.343 | 0.354 | 0.010 | 0.008 |
| | 1.59 | 0.346 | 0.356 | 0.013 | 0.009 |

17
120
119
118
118A
25
19A
25
21
25A
25A1
21A
21A1
112
16
123A
15B
115C
123A
22A1
122A
22A1
123
122
115
X
Z

LIGHT-GUIDING PLATE
FIRST PRISM SHEET
SECOND PRISM SHEET
REFLECTIVE POLARIZING SHEET
RELATIVE LUMINANCE (%)
ANGLE (DEGREES)
100
80
60
40
20
0
−90
−70
−50
−30
−10
0
10
30
50
70
90

REFERENCE EXAMPLE 2
EXAMPLE 1
EXAMPLE 2
EXAMPLE 3
EXAMPLE 4
RELATIVE LUMINANCE (%)
100
90
80
70
60
50
40
30
20
10
0
-80
-60
-40
-20
0
20
40
60
80
ANGLE (DEGREES)

FIG. 34

| | COMPARATIVE EXAMPLE 2 | COMPARATIVE EXAMPLE 3 | REFERENCE EXAMPLE 3 |
|---|---|---|---|
| LENS UNIT | — | ANGLE OF CONTACT 50 DEGREES | — |
| FIRST LIGHT-GUIDING PLATE LENS UNIT | ANGLE OF CONTACT 50 DEGREES | ANGLE OF CONTACT 50 DEGREES | ANGLE OF CONTACT 50 DEGREES |
| SECOND LIGHT-GUIDING PLATE LENS UNIT | — | — | VERTEX ANGLE 140 DEGREES |
| PHOTO | 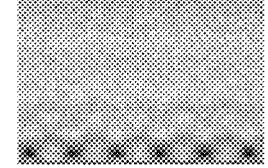 | 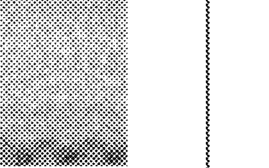 | 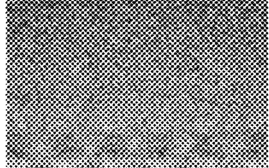 |
| Cm VALUE | 0.222 | 0.117 | 0.087 |
| DETERMINATION RESULT | BAD | INSUFFICIENT | INSUFFICIENT |

| | EXAMPLE 5 | EXAMPLE 6 | EXAMPLE 7 |
|---|---|---|---|
| LENS UNIT | ANGLE OF CONTACT 50 DEGREES | ANGLE OF CONTACT 50 DEGREES | ANGLE OF CONTACT 50 DEGREES |
| FIRST LIGHT-GUIDING PLATE LENS UNIT | ANGLE OF CONTACT 50 DEGREES | ANGLE OF CONTACT 50 DEGREES | ANGLE OF CONTACT 50 DEGREES |
| SECOND LIGHT-GUIDING PLATE LENS UNIT | VERTEX ANGLE 140 DEGREES | VERTEX ANGLE 120 DEGREES | VERTEX ANGLE 100 DEGREES |
| PHOTO | 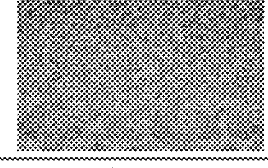 | | 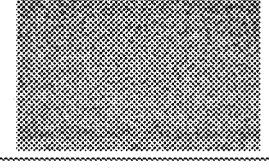 |
| Cm VALUE | 0.055 | 0.061 | 0.053 |
| DETERMINATION RESULT | GOOD | FAIR | GOOD |

RELATIVE LUMINANCE (%)
130
125
120
115
110
105
100
95
90
ANGLE OF TILT (DEGREES)
0
30
60
90
120
150
180

RELATIVE LUMINANCE (%)
130
125
120
115
110
105
100
95
90
ANGLE OF TILT (DEGREES)
0
30
60
90
120
150
180

FIG. 46

| | COMPARATIVE EXAMPLE 2 | COMPARATIVE EXAMPLE 3 | REFERENCE EXAMPLE 5 |
|---|---|---|---|
| LENS UNIT | — | ANGLE OF CONTACT 50 DEGREES | — |
| FIRST LIGHT-GUIDING PLATE LENS UNIT | ANGLE OF CONTACT 50 DEGREES | ANGLE OF CONTACT 50 DEGREES | ANGLE OF CONTACT 50 DEGREES |
| SECOND LIGHT-GUIDING PLATE LENS UNIT | — | — | ANGLE OF CONTACT 30 DEGREES |
| PHOTO | 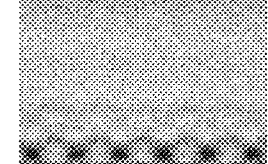 | 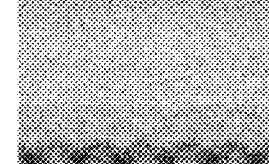 | 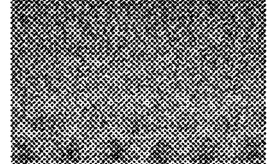 |
| Cm VALUE | 0.222 | 0.117 | 0.085 |
| DETERMINATION RESULT | BAD | INSUFFICIENT | INSUFFICIENT |

| | EXAMPLE 10 | EXAMPLE 11 | EXAMPLE 12 |
|---|---|---|---|
| LENS UNIT | ANGLE OF CONTACT 50 DEGREES | ANGLE OF CONTACT 50 DEGREES | ANGLE OF CONTACT 50 DEGREES |
| FIRST LIGHT-GUIDING PLATE LENS UNIT | ANGLE OF CONTACT 50 DEGREES | ANGLE OF CONTACT 50 DEGREES | ANGLE OF CONTACT 50 DEGREES |
| SECOND LIGHT-GUIDING PLATE LENS UNIT | ANGLE OF CONTACT 30 DEGREES | ANGLE OF CONTACT 49 DEGREES | ANGLE OF CONTACT 62 DEGREES |
| PHOTO | | 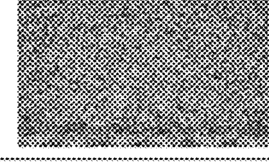 | 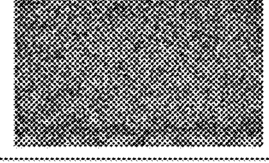 |
| Cm VALUE | 0.061 | 0.066 | 0.062 |
| DETERMINATION RESULT | GOOD | FAIR | FAIR |

REFERENCE EXAMPLE 2
EXAMPLE 1
EXAMPLE 19
EXAMPLE 18
EXAMPLE 17
EXAMPLE 16
EXAMPLE 15
EXAMPLE 14
EXAMPLE 13
RELATIVE LUMINANCE (%)
100
90
80
70
60
50
40
30
20
10
0
−80
−60
−40
−20
0
20
40
60
80
ANGLE (DEGREES)

LIGHTING DEVICE AND DISPLAY DEVICE

CROSS REFERENCE TO RELATED APPLICATION

This application claims priority from Japanese Patent Application No. 2019-008050 filed on Jan. 21, 2019. The entire contents of the priority application are incorporated herein by reference.

BACKGROUND

1. Field

The present disclosure relates to a lighting device and a display device.

2. Description of the Related Art

Conventionally, a lighting device described in Japanese Unexamined Patent Application Publication No. 2009-266792 has been known as an example of a lighting device that is used in a liquid crystal display device or the like. The lighting device described in Japanese Unexamined Patent Application Publication No. 2009-266792 is a surface light source device including: a light source; a light-guiding plate having a side surface that faces the light source and on which light from the light source falls and an upper surface that is orthogonal to the side surface and from which light is emitted; an upward prism sheet, disposed above the light-guiding plate, that has a flat sheet bottom surface, a prism formation surface located on a side opposite to the sheet bottom surface, a plurality of prism columns disposed adjacent to one another so that their prism axes are parallel to one another on the prism formation surface and that causes incident light having fallen on the sheet bottom surface to be emitted from the prism formation surface; and an optical sheet, disposed above the upward prism sheet, that controls a direction of polarization of light that falls on the optical sheet.

The surface light source device described in Japanese Unexamined Patent Application Publication No. 2009-266792 described above is configured such that two of these upward prism sheets are stacked, with the lower upward prism sheet having a frontal base angle of 66 degrees and the upper upward prism sheet having a frontal base angle of 80 degrees. In such a configuration, when light raised by the lower upward prism sheet falls on the upper upward prism sheet, the light is emitted after having been raised by the upper upward prism sheet further toward a frontal direction. This gives very high frontal luminance. However, since markedly less light tends to be emitted from the surface light source device and travel in a direction inclined with respect to the frontal direction. This has undesirably resulted in poor viewing angle characteristics.

It is desirable to improve viewing angle characteristics.

SUMMARY

According to an aspect of the disclosure, there is provided a lighting device including: a light source; a light-guiding plate that forms a plate shape, at least a part of whose outer peripheral end face serves as a light entrance end face on which light emitted from the light source falls, and a first plate surface of which serves as a light exit plate surface from which light is emitted; a first prism sheet, placed on a light exit side of the light-guiding plate, that includes a plurality of first unit prisms which are arranged along a first direction including a direction from the light source toward the light-guiding plate and which extend along a second direction orthogonal to both the first direction and a plate thickness direction of the light-guiding plate; and a second prism sheet, placed on a light exit side of the first prism sheet, that includes a plurality of second unit prisms which are arranged along the first direction and which extend along the second direction, wherein each of the first and second unit prisms of the first and second prism sheets has a base that is parallel to the first direction and a pair of oblique sides standing from both ends, respectively, of the base, and an angle that one of the oblique sides that faces toward the light source forms with respect to the base in the first direction in the second unit prism is smaller than an angle that the oblique side that faces toward the light source forms with respect to the base in the first direction in the first unit prism.

According to an aspect of the disclosure, there is provided a display device including the light device described above and a display panel that performs a display through use of light from the lighting device.

BRIEF DESCRIPTION OF THE DRAWINGS

FIG. 13 is a table of experimental results of Comparative Experiment 1;

FIG. 18 is a table of experimental results regarding light emitted from the second prism sheets in Comparative Experiment 2;

FIG. 19 is a table of experimental results regarding light emitted from the reflective polarizing sheets in Comparative Experiment 2;

FIG. 23 is a table of relationships between angles of inclination θ2 and relative luminance in Comparative Experiment 3;

FIG. 25 is a table of relationships between angles of inclination θ1 and relative luminance in Comparative Experiment 4;

FIG. 27 is a table of relationships between the refractive indices and chromaticity of the first unit prisms in Comparative Experiment 5;

FIG. 34 is a table of experimental results of Comparative Experiment 8;

FIG. 46 is a table of experimental results of Comparative Experiment 11;

DESCRIPTION OF THE EMBODIMENTS

Embodiment 1

Figure 2:
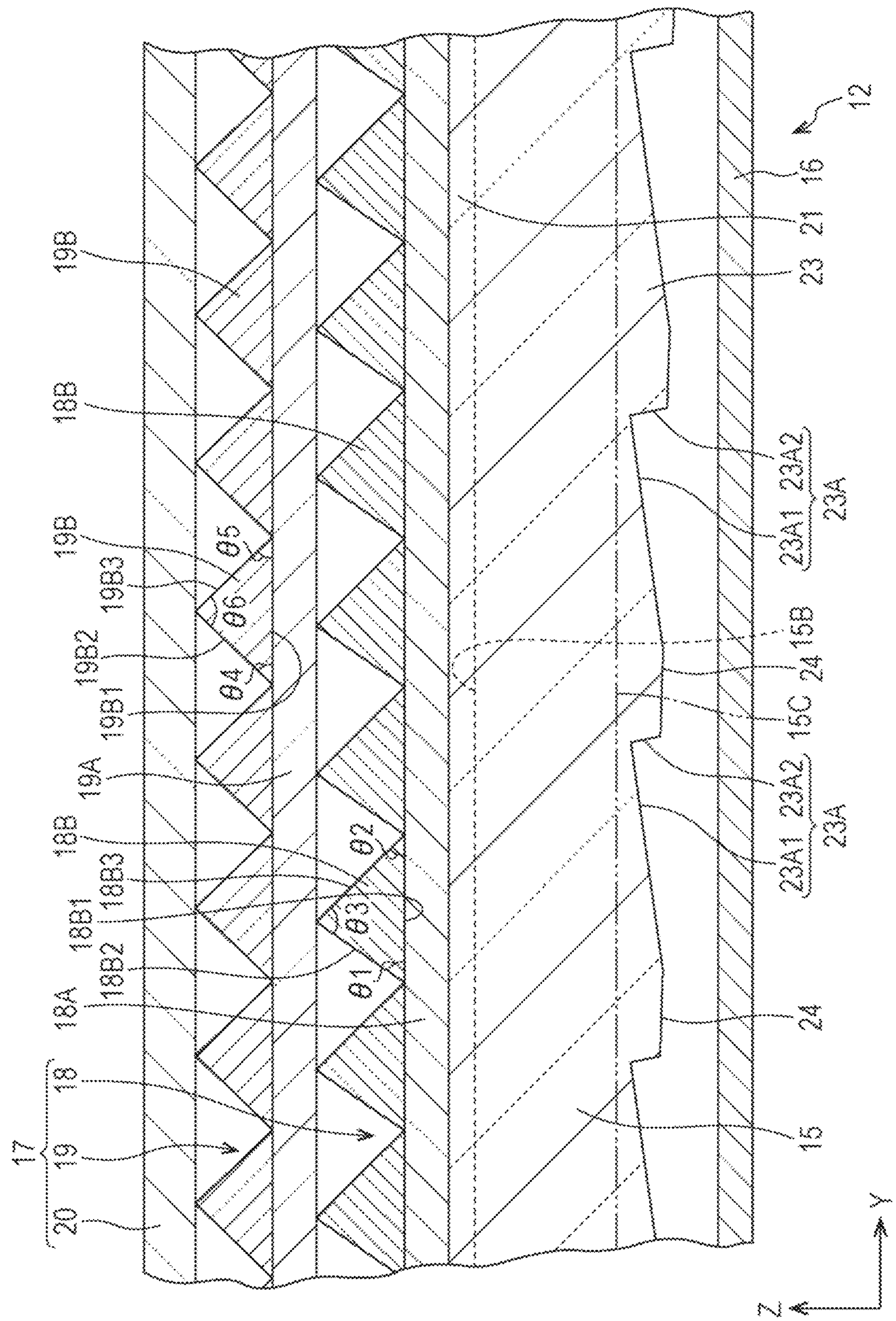
FIG. 2 is a cross-sectional view of a backlight device of the liquid crystal display device as taken along a Y-axis direction.
Figure 3:
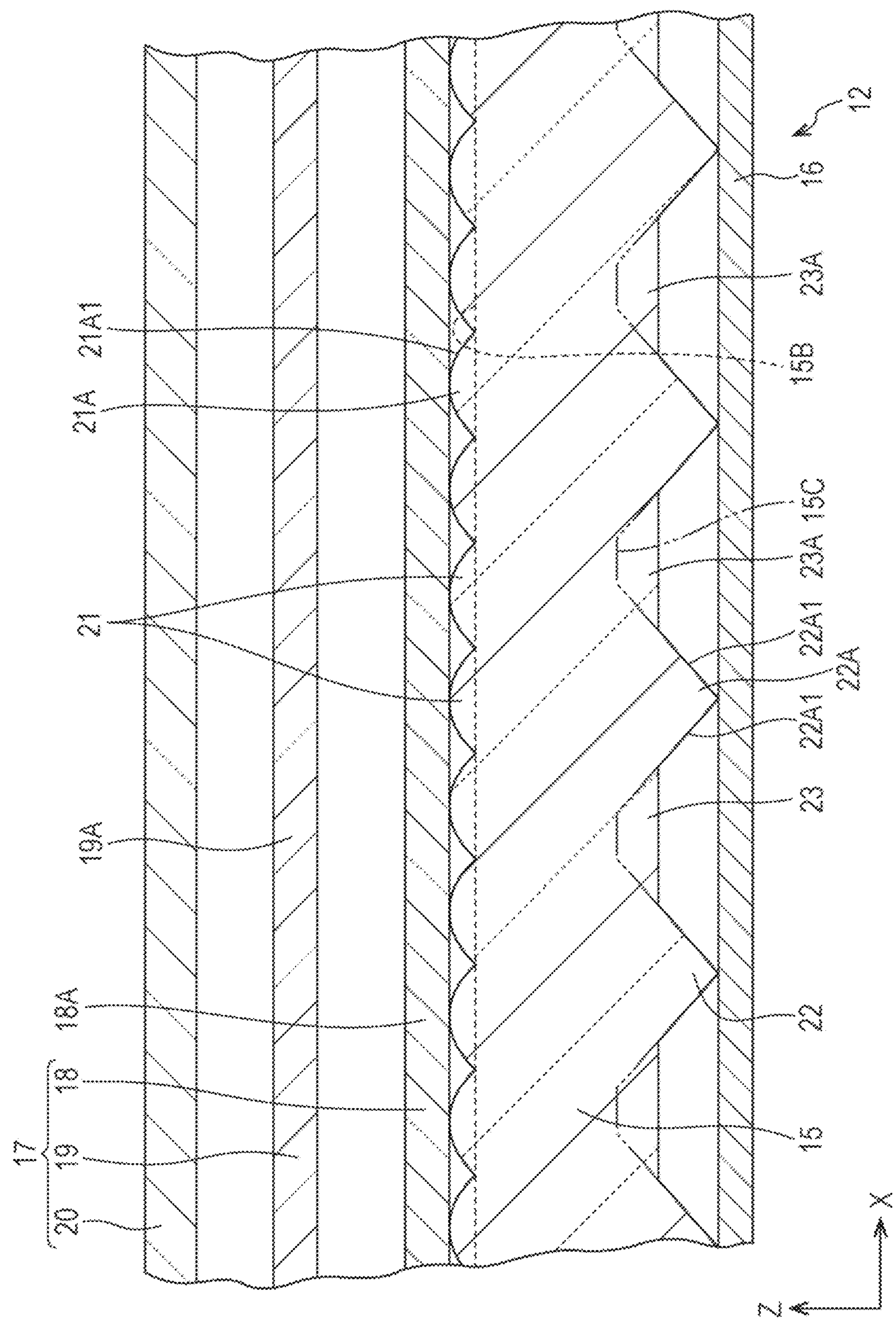
FIG. 3 is a cross-sectional view of the backlight device as taken along an X-axis direction.

Embodiment 1 of the present disclosure in described with reference to FIGS. 1 to 28. The present embodiment illustrates a liquid crystal display device (display device) 10. It should be noted that some of the drawings show an X axis, a Y axis, and a Z axis and are drawn so that the direction of each axis is an identical direction in each drawing. Further, FIGS. 2 and 3 serve as a basis for a vertical direction, and FIGS. 2 and 3 show the front side up and the back side down.

Figure 1:
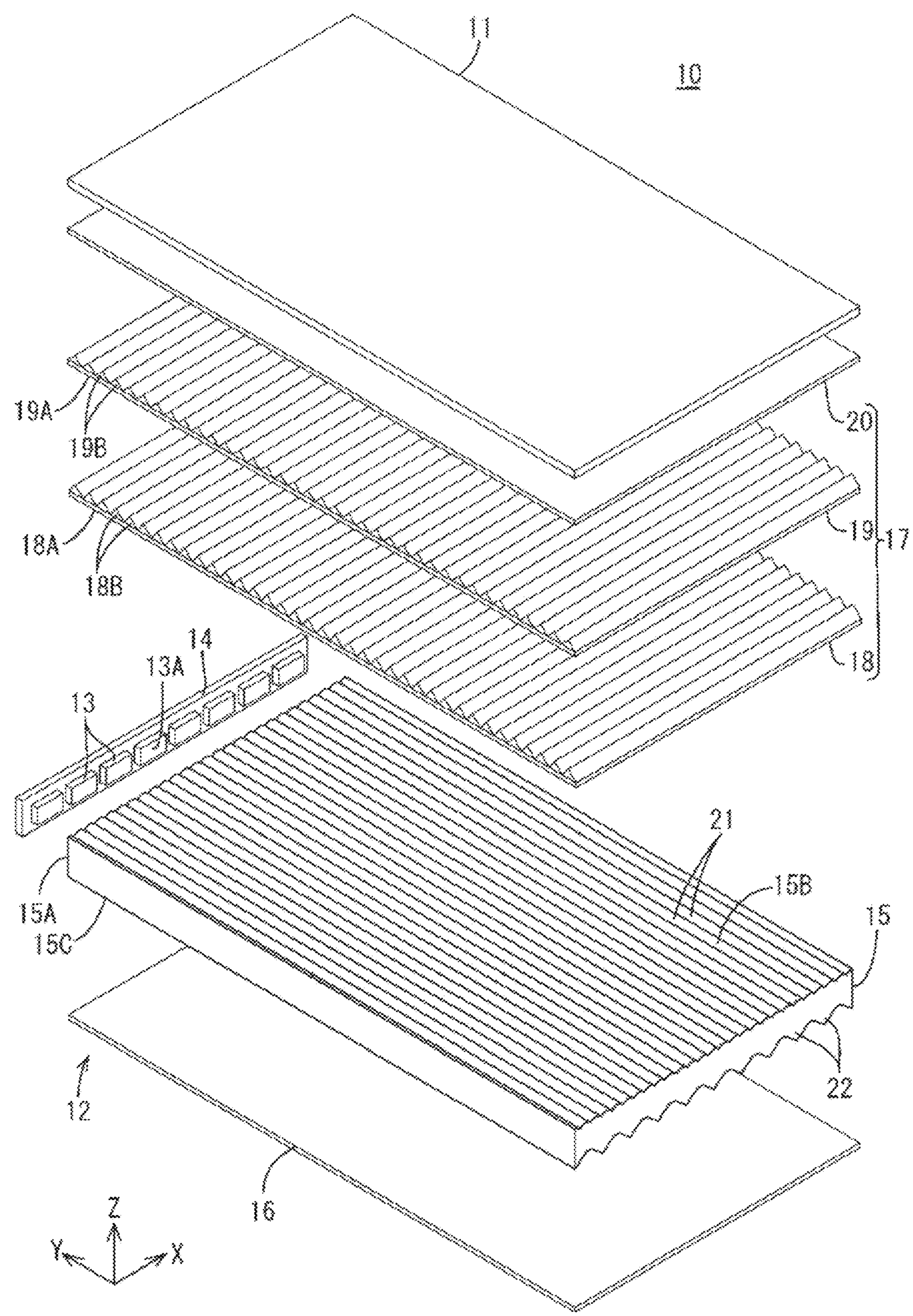
FIG. 1 is an exploded perspective view of a liquid crystal display device according to Embodiment 1 of the present disclosure.

As shown in FIG. 1, the liquid crystal display device 10 includes a liquid crystal panel (display panel) 11 that displays an image and a backlight device (lighting device) 12, placed behind the liquid crystal panel 11, that illuminates the liquid crystal panel 11 with light for use in display. The liquid crystal panel 11 has a square plate shape as a whole, and has its long side direction, short side direction, and plate thickness direction corresponding to the Y-axis direction, the X-axis direction, the Z-axis direction, respectively. The liquid crystal panel 11 includes a pair of substrates and a liquid crystal layer sealed in between the two substrates. The pair of substrates includes a CF substrate (counter substrate) placed at the front and an array substrate (TFT substrate) placed at the back. The CF substrate is provided with structures such as an alignment film in addition to being provided with a color filter in which colored portions such as R (red), G (green), and B (blue) colored portions are arranged in a predetermined array and a light blocker (black matrix) that partitions adjacent colored portions from one another. The array substrate (TFT substrate) is provided with structures such as switching elements (e.g. TFTs) connected to source lines and gate lines that are orthogonal to each other, pixel electrodes connected to the switching elements, and an alignment film. The liquid crystal panel 11 has its plate surfaces constituted by a central portion serving as a display area that is capable of displaying an image and a frame-shaped outer peripheral portion serving as a non-display area that surrounds the display area. Attached to a back (outer) plate surface of the array substrate of the liquid crystal panel 11 is a reflective polarizing sheet 20 of the backlight device 12, which will be described next. The reflective polarizing sheet 20 will be described in detail later. It should be noted that a polarizing plate is attached to a front (outer) plate surface of the CF substrate of the liquid crystal panel 11.

Next, the backlight device 12 is described. As shown in FIG. 1, the backlight device 12 includes at least an LED (light source) 13, an LED substrate (light source substrate) 14 on which the LED 13 is mounted, a light-guiding plate 15 that guides light from the LED 13, a reflective sheet 16 placed behind the light-guiding plate 15, and a plurality of optical sheets 17 placed in such a manner as to be sandwiched between the light-guiding plate 15 and the liquid crystal panel 11. The LED 13 is a “light source”, and the backlight device 12 is of a one-side light entrance edge-lighting type in which light from the LED 13 enters the light-guiding plate 15 only through one side of the light-guiding plate 15.

As shown in FIG. 1, the LED 13 is constituted by a base member firmly fixed to the LED substrate 14, an LED chip, and a sealant by which the LED chip is sealed in on the base member. The LED 13 is configured such that its LED chip monochromatically emits, for example, blue light, and emits white light as a whole through the use of a phosphor dispersedly contained in the sealant. The phosphor contains a yellow phosphor, a green phosphor, a red phosphor, and the like. The LED 13 is of a so-called top-surface-emitting type in which a surface of the LED 13 opposite to a mounting surface of the LED 13 on the LED substrate 14 serves as a light-emitting surface 13A. The LED substrate 14 has its plate surfaces placed in such a posture as to be parallel to one end face (i.e. the after-mentioned light entrance end face 15A) of the light-guiding plate 15. A plate surface of the LED substrate 14 that faces toward the light-guiding plate 15 serves as a mounting surface on which the LED 13 is mounted. On the mounting surface, a plurality of the LEDs 13 are mounted in such a manner as to be arranged at intervals along the X-axis direction. Accordingly, it can be said that a direction of arrangement of the LED 13 and the light-guiding plate 15 corresponds to the Y-axis direction (first direction), and the Y-axis direction includes a direction from the LED 13 toward the light-guiding plate 15 and a direction from the light-guiding plate 15 toward the LED 13. Further, a direction of arrangement of the plurality of LEDs 13 corresponds to the X-axis direction (second direction), and the X-axis direction is orthogonal to both the Y-axis direction and the Z-axis direction (plate thickness direction of the light-guiding plate 15).

The light-guiding plate 15 is made of a substantially transparent synthetic resin material (e.g. acrylic resin such as PMMA) that is sufficiently higher in refractive index than air. As shown in FIG. 1, the light-guiding plate 15 has a plat shape, and has its plate surfaces parallel to a plate surface of the liquid crystal panel 11. It should be noted that a long side direction of the light-guiding plate 15 on its plate surfaces, a short side direction of the light-guiding plate 15 on its plate surfaces, and a plate thickness direction of the light-guiding plate 15 in a direction normal to the plate surfaces correspond to the Y-axis direction, the X-axis direction, and the Z-axis direction, respectively. The light-guiding plate 15 is placed directly below the liquid crystal panel 11 and the optical sheets 17, and one short-side end face of outer peripheral end faces of the light-guiding plate 15 serves as a light entrance end face 15A that faces the light-emitting surface 13A and on which light from the light-emitting surface 13A falls. A front plate surface of the pair of plate surfaces of the light-guiding plate 15 that faces the liquid crystal panel 11 and the optical sheet 17 serves as a light exit plate surface 15B that emits light guided through the inside of the light-guiding plate 15, and a back plate surface of the pair of plate surfaces of the light-guiding plate 15 that faces the reflective sheet 16 serves as an opposite plate surface 15C. Moreover, the light-guiding plate 15 has a function of introducing through the light entrance end face 15A light emitted from the LED 13 toward the light-guiding plate 15, raising the light forward (i.e. toward a light exit) along the Z-axis direction after having propagated the light inside, and emitting the light. A detailed structure of the light-guiding plate 15 will be described later. It should be noted that a direction normal to the light entrance end face 15A corresponds to the Y-axis direction.

As shown in FIG. 1, the reflective sheet 16 has its plate surfaces parallel to the plate surfaces of the liquid crystal panel 11 and the light-guiding plate 15, and is placed in such a manner as to cover the opposite plate surface 15C of the light-guiding plate 15. The reflective sheet 16 is superior in light reflectivity, and can efficiently raise forward, i.e. toward the light exit plate surface 15B, light having leaked from the opposite plate surface 15C of the light-guiding plate 15. The reflective sheet 16 is a size larger in outer shape than the light-guiding plate 15, and is disposed to overlap substantially the entirety of the opposite plate surface 15C.

As shown in FIG. 1, the optical sheets 17 have sheet shapes, and have their plate surfaces parallel to the plate surfaces of the liquid crystal panel 11 and the light-guiding plate 15. As is the case with the liquid crystal panel 11 and the light-guiding plate 15, a long side direction of the optical sheets 17 on their plate surfaces, a short side direction of the optical sheets 17 on their plate surfaces, and a plate thickness direction of the optical sheets 17 in a direction normal to the plate surfaces correspond to the Y-axis direction, the X-axis direction, and the Z-axis direction, respectively. The optical sheets 17 are disposed to be sandwiched between the liquid crystal panel 11 and the light-guiding plate 15 in the Z-axis direction, and have a function of, for example, giving a predetermined optical effect to light emitted from the LED 13 and, at the same time, causing the light to be emitted toward the liquid crystal panel 11. Plates surfaces of the optical sheets 17 that face backward, i.e. toward the light-guiding plate 15, serve as light entrance surfaces on which light falls, and plate surfaces of the optical sheets 17 that face forward, i.e. toward the liquid crystal panel 11, serve as light exit surfaces from which light is emitted. The optical sheets 17 include a total of three optical sheets, namely a first prism sheet 18, a second prism sheet 19, and the reflective polarizing sheet 20, which are arranged in this order from the back.

First, the reflective polarizing sheet 20 shown in FIG. 1 is described. The reflective polarizing sheet 20 includes a polarizing layer having a particular polarizing axis (transmission axis), a multilayer film in which layers differing in refractive index from each other are alternately stacked, a protective layer, or other layers. The polarizing layer is constituted by a polarizer obtained by mixing an absorber such as iodine or dichroic dye into a polymer resin film such as a PVA (polyvinyl alcohol) film and uniaxially drawing the film to orient the absorber and protective films, such as TAC (triacetyl cellulose) films, between which the polarizer is sandwiched. The polarizer thus uniaxially drawn has a polarizing axis and an absorption axis that is orthogonal to the polarizing axis, thereby being able to selectively transmit linearly polarized light that is parallel to the polarizing axis and being able to convert circularly polarized light into linearly polarized light along the polarizing axis. The polarizing axis of this polarizing layer is orthogonal to the polarizing axis of a polarizing plate attached to the outer plate surface of the CF substrate. The multilayer film includes a plurality of layers composed, for example, of PEN (polyethylene naphthalate) and exhibits, through its multilayer structure, reflection properties (transmission properties) differing between a p-wave and an s-wave of light. That is, the multilayer film has such reflection properties as to typically have a higher reflectance with respect to an s-wave than with respect to a p-wave. An s-wave reflected by the multilayer film is reflected again forward by the light-guiding plate 15, the reflective sheet 16, the other optical sheets 17, and the like and, in so doing, is separated from a p-wave. By thus including the multilayer film, the reflective polarizing sheet 20 makes it possible to reuse an s-wave, which is supposed to be absorbed by the polarizing layer, by reflecting it backward, thus making it possible to enhance efficiency in the use of light (and by extension the luminance).

As shown in FIGS. 1 and 2, the first prism sheet 18 includes a first base member 18A formed in a sheet shape and a first unit prism 18B provided on a front (light exit side) plate surface (light exit side plate surface) of the first base member 18A. The first base member 18A is made of substantially transparent synthetic resin and, specifically, is constituted by a crystalline transparent resin material such as PET (polyethylene terephthalate). The base member 18A is formed into the shape of a sheet by drawing the crystalline transparent resin material, which serves as a raw material, by a biaxial drawing process, and is suitable to achieving a reduction in manufacturing cost. The first unit prism 18B is constituted by a substantially transparent ultraviolet-curable resin material that is a type of photo-curable resin material. The first prism sheet 18 is manufactured in the following manner. For example, a molding die is filled with an uncured ultraviolet-curable resin material. The uncured ultraviolet-curable resin material is placed in contact with the front plate surface by covering an opening end of the die with the first base member 18A. In that state, the ultraviolet-curable resin material is irradiated with ultraviolet rays via the first base member 18A. Then, the ultraviolet-curable resin material is cured, whereby the first base member 18A is provided integrally with the first unit prism 18B. An example of the ultraviolet-curable resin material that constitutes the first unit prism 18B is acrylic resin such as PMMA. It is preferable that the refractive index of the ultraviolet-curable resin material that constitutes the first unit prism 18B be in a range of 1.49 to 1.52, most preferably 1.49. The first unit prism 18B is provided in such a manner as to project from the plate surface of the first base member 18A forward (i.e. toward a side opposite to the light-guiding plate 15) along the Z-axis direction. A cross-sectional shape of the first unit prism 18B as taken along the Y-axis direction forms a substantially triangular shape (substantially mountain shape) and extends linearly along the X-axis direction (second direction), and a plurality of the first unit prisms 18B are continuously arranged with substantially no intervals along the Y-axis direction (first direction) on the plate surface of the first base member 18A. The first unit prism 18B has a base 18B1 that is parallel to the Y-axis direction (i.e. the plate surface of the first base member 18A) and a pair of oblique sides 18B2 and 18B3 standing from both ends, respectively, of the base 18B1. The pair of oblique sides 18B2 and 18B3 of the first unit prism 18B include a first LED facing oblique side (first light source facing oblique side) 18B2 that faces toward the LED 13 in the Y-axis direction and a first LED opposing oblique side (first light source opposing oblique side) 18B3 located on a side opposite to the first LED facing oblique side 18B2. Of them, the first LED opposing oblique side 18B3 is struck by and refracts a portion of light incident on the first unit prism 18B that travels mainly in a direction away from the LED 13 in the Y-axis direction. On the other hand, the first LED facing oblique side 18B2 is struck by and refracts a portion of light incident on the first unit prism 18B that travels mainly in a direction toward the LED 13 in the Y-axis direction. In either case, most of light refracted by the pair of oblique sides 18B2 and 18B3 of the first unit prism 18B is selectively raised and gathered in the Y-axis direction.

Moreover, as shown in FIGS. 1 and 2, the first unit prism 18B is structured such that the angle of inclination θ1 (angle, frontal base angle) of the first LED facing oblique side 18B2 with respect to the base 18B1 is larger than the angle of inclination θ2 (angle, rear base angle) of the first LED opposing oblique side 18B3 with respect to the base 18B1. That is, the first unit prism 18B has a cross-sectional shape that is an asymmetric shape and a scalene triangle. Specifically, it is preferable that the angle of inclination θ1 of the first LED facing oblique side 18B2 with respect to the base 18B1 of the first unit prism 18B be in a range of 50 to 60 degrees, most preferably 55 degrees. On the other hand, it is preferable that the angle of inclination θ2 of the first LED opposing oblique side 18B3 with respect to the base 18B1 of the first unit prism 18B be in a range of 35 to 50 degrees, most preferably 45 degrees. Further, it is preferable that a vertex angle (angle) θ3 formed by the pair of oblique sides 18B2 and 18B3 of the first unit prism 18B be in a range of 70 to 95 degrees, most preferably 80 degrees. A plurality of the first unit prisms 18B arranged along the X-axis direction are substantially equal in all of their height dimensions, width dimensions of the bases 18B1, the angles of inclination of the oblique angles 18B2 and 18B3 with respect to the bases 18B1, and the like, and intervals of arrangement of adjacent first unit prisms 18B are such that the first unit prisms 18B are virtually constantly arranged at regular intervals.

As shown in FIGS. 1 and 2, the second prism sheet 19 includes a second base member 19A formed in a sheet shape and a second unit prism 19B provided on a front (light exit side) plate surface (light exit side plate surface) of the second base member 19A. The second base member 19A is made of substantially transparent synthetic resin and, specifically, is constituted by the crystalline transparent resin material such as PET (polyethylene terephthalate) as the first base member 18A. The second unit prism 19B is constituted by a substantially transparent ultraviolet-curable resin material that is a type of photo-curable resin material. The second prism sheet 19 is manufactured by the same method as the first prism sheet 18. An example of the ultraviolet-curable resin material that constitutes the second unit prism 19B is acrylic resin such as PMMA, and the refractive index of the ultraviolet-curable resin material that constitutes the second unit prism 19B is higher than the refractive index of the material of the first prism 18B, for example approximately 1.61. The second unit prism 19B is provided in such a manner as to project from the plate surface of the second base member 19A forward (i.e. toward a side opposite to the first prism sheet 18) along the Z-axis direction. A cross-sectional shape of the second unit prism 19B as taken along the Y-axis direction forms a substantially triangular shape (substantially mountain shape) and extends linearly along the X-axis direction, and a plurality of the second unit prisms 19B are continuously arranged with substantially no intervals along the Y-axis direction on the plate surface of the second base member 19A. The second unit prism 19B has a base 19B1 that is parallel to the Y-axis direction (i.e. the plate surface of the second base member 19A) and a pair of oblique sides 19B2 and 19B3 standing from both ends, respectively, of the base 19B1. The pair of oblique sides 19B2 and 19B3 of the second unit prism 19B include a second LED facing oblique side (second light source facing oblique side) 19B2 that faces toward the LED 13 in the Y-axis direction and a second LED opposing oblique side (second light source opposing oblique side) 19B3 located on a side opposite to the second LED facing oblique side 19B2. Of them, the second LED opposing oblique side 19B3 is struck by and refracts a portion of light incident on the second unit prism 19B that travels mainly in a direction away from the LED 13 in the Y-axis direction. On the other hand, the second LED facing oblique side 19B2 is struck by and refracts a portion of light incident on the second unit prism 19B that travels mainly in a direction toward the LED 13 in the Y-axis direction. In either case, most of light refracted by the pair of oblique sides 19B2 and 19B3 of the second unit prism 19B is selectively raised and gathered in the Y-axis direction.

Moreover, as shown in FIGS. 1 and 2, the second unit prism 19B is structured such that the angle of inclination θ4 (angle, frontal base angle) of the second LED facing oblique side 19B2 with respect to the base 19B1 is equal to the angle of inclination θ5 (angle, rear base angle) of the second LED opposing oblique side 19B3 with respect to the base 19B1. That is, the second unit prism 19B has a cross-sectional shape that is a symmetric shape and an isosceles triangle. On top of that, the angle of inclination θ4 of the second LED facing oblique side 19B2 with respect to the base 19B1 of the second unit prism 19B is smaller than the angle of inclination θ1 of the first LED facing oblique side 18B2 with respect to the base 18B1 of the first unit prism 18B of the first prism sheet 18. Specifically, it is preferable that the respective angles of inclination θ4 and 05 of the pair of oblique angles 19B2 and 19B3 with respect to the base 19B1 of the second unit prism 19B be in a range of 40 to 50 degrees, most preferably 45 degrees. On the other hand, it is preferable that a vertex angle (angle) 06 formed by the pair of oblique sides 19B2 and 19B3 of the second unit prism 19B be in a range of 80 to 100 degrees, most preferably 90 degrees, i.e. a right angle. It should be noted that a plurality of the second unit prisms 19B arranged along the X-axis direction are substantially equal in all of their height dimensions, width dimensions of the bases 19B1, the angles of inclination of the oblique sides 19B2 and 19B3 with respect to the bases 19B1, and the like, and intervals of arrangement of adjacent second unit prisms 19B are such that the second unit prisms 19B are virtually constantly arranged at regular intervals. Further, for a reduction in appearance of interference fringes called moiré, it is preferable that the height dimensions and intervals of arrangement in the second unit prism 19B be different from the height dimensions and intervals of arrangement in the first unit prism 18B.

Of the pair of plate surfaces of the light-guiding plate 15, the back plate surface, i.e. the plate surface located on a side opposite to the light exit plate surface 15B, serves as the opposite plate surface 15C. As shown in FIGS. 1 and 3, the light exit plate surface 15B and opposite plate surface 15C of the light-guiding plate 15 are provided with a first light-guiding plate lens unit (light-guiding plate lens unit) 21 and a second light-guiding plate lens unit (light-guiding plate lens unit) 22, respectively. The first light-guiding plate lens unit 21 includes a plurality of first light-guiding plate unit lenses (light-guiding plate unit lenses) 21A extending along the Y-axis direction and arranged along the X-axis direction on the light exit plate surface 15B of the light-guiding plate 15. In the present embodiment, the first light-guiding plate lens unit 21 is a so-called lenticular lens, and each of the first light-guiding plate unit lenses 21A is a convex cylindrical lens that projects from the light exit plate surface 15B forward. A cross-sectional shape of each of the first light-guiding plate unit lenses 21A as taken along the X-axis direction is a semicircular shape and a semicylindrical shape that extends linearly along the Y-axis direction, and each of the first light-guiding plate unit lenses 21A has its surface serving as an arc surface 21A1. Assuming that an angle that a tangent to a base end of the arc surface 21A1 forms with respect to the X-axis direction is an “angle of contact”, the angle of contact of the first light-guiding plate unit lens 21A is for example approximately 62 degrees. The plurality of first light-guiding plate unit lenses 21A arranged along the X-axis direction are substantially equal in all of the angles of contact and the width dimensions (intervals of arrangement) and height dimensions of the bases. In order to provide the light-guiding plate 15 integrally with the first light-guiding plate lens unit 21 thus configured, it is enough, for example, to manufacture the light-guiding plate 15 by injection molding and form, in advance on a molding surface of the molding die for molding the light exit plate surface 15B, a transfer shape for transferring the first light-guiding plate lens unit 21.

As shown in FIGS. 1 and 3, the second light-guiding plate lens unit 22 includes a plurality of second light-guiding plate unit lenses (light-guiding plate unit lenses) 22A extending along the Y-axis direction and arranged along the X-axis direction on the opposite plate surface 15C of the light-guiding plate 15. In the present embodiment, the second light-guiding plate lens unit 22 is a so-called prism lens, and each of the second light-guiding plate unit lenses 22A is a convex prism that projects from the light exit plate surface 15B backward. A cross-sectional shape of each of the second light-guiding plate unit lenses 22A as taken along the X-axis direction forms a substantially triangular shape (substantially mountain shape) and extends linearly along the Y-axis direction. Each of the second light-guiding plate unit lenses 22A has its width dimension (second direction dimension) uniform over the entire length in the first direction. Each of the second light-guiding plate unit lenses 22A is substantially isosceles triangular in cross-section and has a pair of oblique surfaces 22A1, and it is preferable that the vertex angle of each of the second light-guiding plate unit lenses 22A be an obtuse angle (angle exceeding 90 degrees) or, specifically, be in a range of 100 to 150 degrees, most preferably 140 degrees. The plurality of second light-guiding plate unit lenses 22A arranged along the X-axis direction are substantially equal in all of the vertex angles and the width dimensions (intervals of arrangement) and height dimensions of the bases. In the present embodiment, the intervals of arrangement of the second light-guiding plate unit lenses 22A are greater than the intervals of arrangement of the first light-guiding plate unit lenses 21A. In order to provide the light-guiding plate 15 integrally with the second light-guiding plate lens unit 22 thus configured, it is enough, for example, to manufacture the light-guiding plate 15 by injection molding and form, in advance on a molding surface of the molding die for molding the light exit plate surface 15B, a transfer shape for transferring the second light-guiding plate lens unit 22.

According to such a configuration, as shown in FIG. 2, light propagating through the inside of the light-guiding plate 15 travels zigzag substantially along the Y-axis direction while being repeatedly reflected by striking the arc surfaces 21A1 of the first light-guiding plate unit lenses 21A of the first light-guiding plate lens unit 21 on the side of the light exit plate surface 15B in the Z-axis direction. Meanwhile, light propagating through the inside of the light-guiding plate 15 travels zigzag substantially along the Y-axis direction while being repeatedly reflected by striking the oblique surfaces 22A1 of the second light-guiding plate unit lenses 22A of the second light-guiding plate lens unit 22 on the side of the opposite plate surface 15C in the Z-axis direction. This restrains light propagating through the inside of the light-guiding plate 15 from spreading in the X-axis direction, thus making it hard for unevenness in brightness to appear near or around the LED 13 in the X-axis direction.

As shown in FIGS. 1 and 2, the opposite plate surface 15C of the light-guiding plate 15 is provided with a light exit reflector 23. The light exit reflector 23 includes a plurality of unit reflectors 23A arranged at intervals along the Y-axis direction. Each of the unit reflectors 23A is provided so as to project from the opposite plate surface 15C backward along the Z-axis direction, and a cross-sectional shape of the unit reflector 23A as taken along the Y-axis direction is a triangular shape. Each of the unit reflectors 23A has a first reflection surface 23A1 placed toward the LED 13 in the Y-axis direction and inclined with respect to the Y-axis direction and a second reflection surface 23A2 disposed on a side opposite to the first reflection surface 23A1 and inclined with respect to the Y-axis direction. These reflection surfaces 23A1 and 23A2 serve to reflect light propagating through the inside of the light-guiding plate 15 and promote emission of light from the light exit plate surface 15B by raising the light forward to an angle close to the Z-axis direction. The first reflection surface 23A1 functions mainly to reflect and raise light traveling away from the LED 13 in the Y-axis direction. Meanwhile, the second reflection surface 23A2 functions mainly to reflect and raise light traveling toward the LED 13 in the Y-axis direction. The first reflection surface 23A1 has a gradient whose distance from the light exit plate surface 15B, on which the light exit reflector 23 is not placed, becomes gradually smaller away from the LED 13 in the Y-axis direction. The first reflection surface 23A1 has an angle of inclination of, for example, approximately 8 degrees with respect to the Y-axis direction. The second reflection surface 23A2 has a gradient whose distance from the light exit plate surface 15B, on which the light exit reflector 23 is not placed, becomes gradually greater away from the LED 13 in the Y-axis direction, i.e. a gradient opposite to that of the first reflection surface 23A1. The second reflection surface 23A2 has a nearly vertical steep gradient at an angle of inclination of, for example, approximately 80 degrees with respect to the Y-axis direction, and has a larger angle of inclination than the first reflection surface 23A1. Further, the plurality of unit reflectors 23A arranged along the Y-axis direction are designed to become gradually bigger in height dimension (Z-axis direction dimension) and length dimension (Y-axis direction dimension) away from the LED 13 in the Y-axis direction. More specifically, a unit reflector 23A located farther away from the LED 13 in the Y-axis direction is larger in area of the first reflection surface 23A1 and the second reflection surface 23A2 than a unit reflector 23A located closer to the LED 13 in the Y-axis direction. With this, on a side closer to the LED 13 in the Y-axis direction, light hardly strikes the reflection surfaces 23A1 and 23A2 of a unit reflector 23A, so that emission of light is suppressed; on the other hand, on a side farther away from the LED 13 in the Y-axis direction, light easily strikes the reflection surfaces 23A1 and 23A2 of a unit reflector 23A, whereby emission of light is promoted. As a result, the amount of light that is emitted from the light exit plate surface 15B is uniformed on both the side of the LED 13 and a side opposite thereto in the Y-axis direction.

As shown in FIGS. 1 and 2, the opposite plate surface 15C of the light-guiding plate 15 is provided with an inclined surface 24 placed adjacent to a unit reflector 23A in the Y-axis direction. A plurality of the inclined surfaces 24 are placed so as to be repeatedly arranged alternately with the unit reflectors 23A in the Y-axis direction on the opposite plate surface 15C. The inclined surface 24 is joined to the second reflection surface 23A2 of a unit reflector 23A adjacent thereto on the side of the LED 13 in the Y-axis direction and to the first reflection surface 23A1 of a unit reflector 23A adjacent thereto on a side opposite to the LED 13. The inclined surface 24 has a gradient whose distance from the light exit plate surface 15B, on which the light exit reflector 23 is not placed, becomes gradually greater away from the LED 13 in the Y-axis direction. That is, the inclined surface 24 has a gradient which is the same as that of the second reflection surface 23A2 of each of the unit reflectors 23A. The inclined surface 24 has an angle of inclination of, for example, approximately 1.4 degrees with respect to the Y-axis direction, and is smaller in angle of inclination than any of the reflection surfaces 23A1 and 23A2 of each of the unit reflectors 23A. The inclined surface 24 thus configured so reflects light traveling through the inside of the light-guiding plate 15 that the light moves away from the LED 13, and thereby causes the light to travel toward the light exit plate surface 15B; however, since the angle of incidence of the light with respect to the light exit plate surface 15B does not exceed a critical angle, the light is totally reflected by the light exit plate surface 15B and guided farther away from the LED 13. This makes it hard for light emitted from the light exit plate surface 15B to be deflected toward the LED 13 in the Y-axis direction. As noted above, the light-guiding plate 15 is configured such that the angle of inclination of the second reflection surface 23A2 with respect to the Y-axis direction is larger than the angle of inclination of the first reflection surface 23A1 with respect to the Y-axis direction and the angle of inclination of the first reflection surface 23A1 with respect to the Y-axis direction is larger than the angle of inclination of the inclined surface 24 with respect to the Y-axis direction. Further, a plurality of the inclined surfaces 24 arranged along the Y-axis direction are designed such that an inclined surface 24 located farther away from the LED 13 in the Y-axis direction is smaller in length dimension than an inclined surface 24 located closer to the LED 13 in the Y-axis direction. This is because a unit reflector 23A located farther away from the LED 13 in the Y-axis direction is greater in length dimension and therefore occupies a larger area than a unit reflector 23A located closer to the LED 13 in the Y-axis direction.

Figure 4:
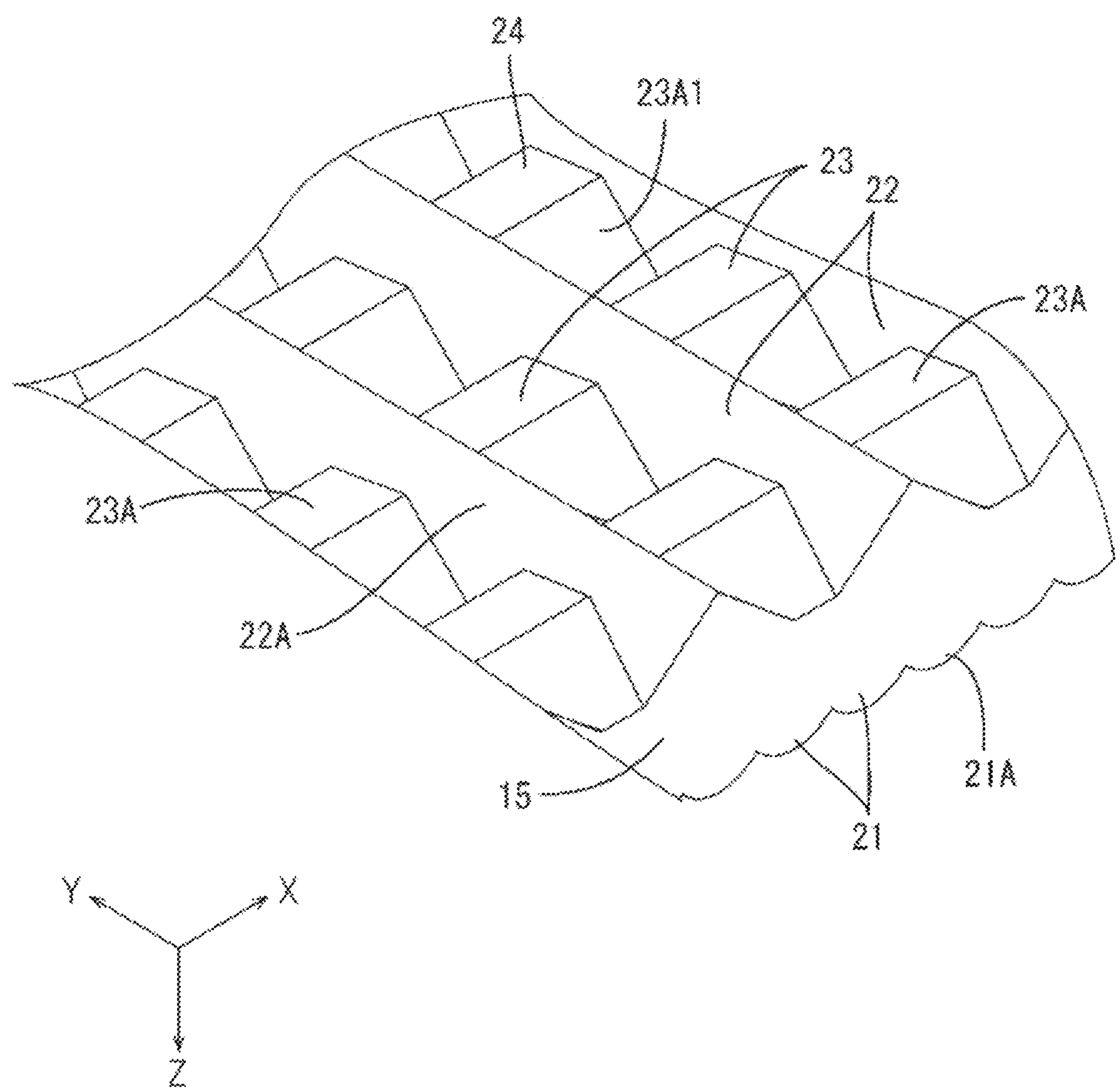
FIG. 4 is a perspective view of a light-guiding plate of the backlight device from the side of an opposite plate surface.
Figure 5:
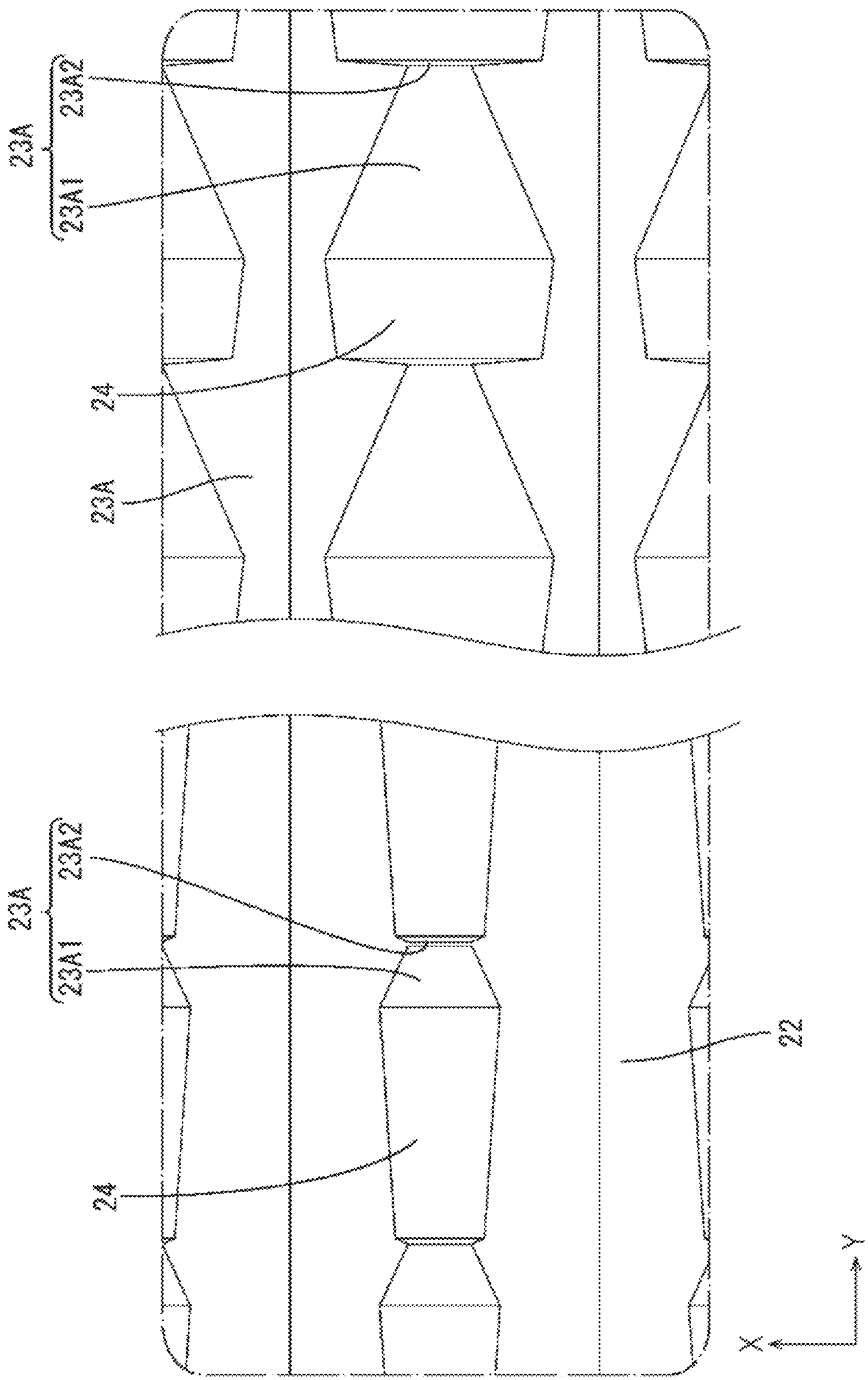
FIG. 5 is a bottom view showing a configuration of the light-guiding plate on the opposite plate surface.
Figure 6:
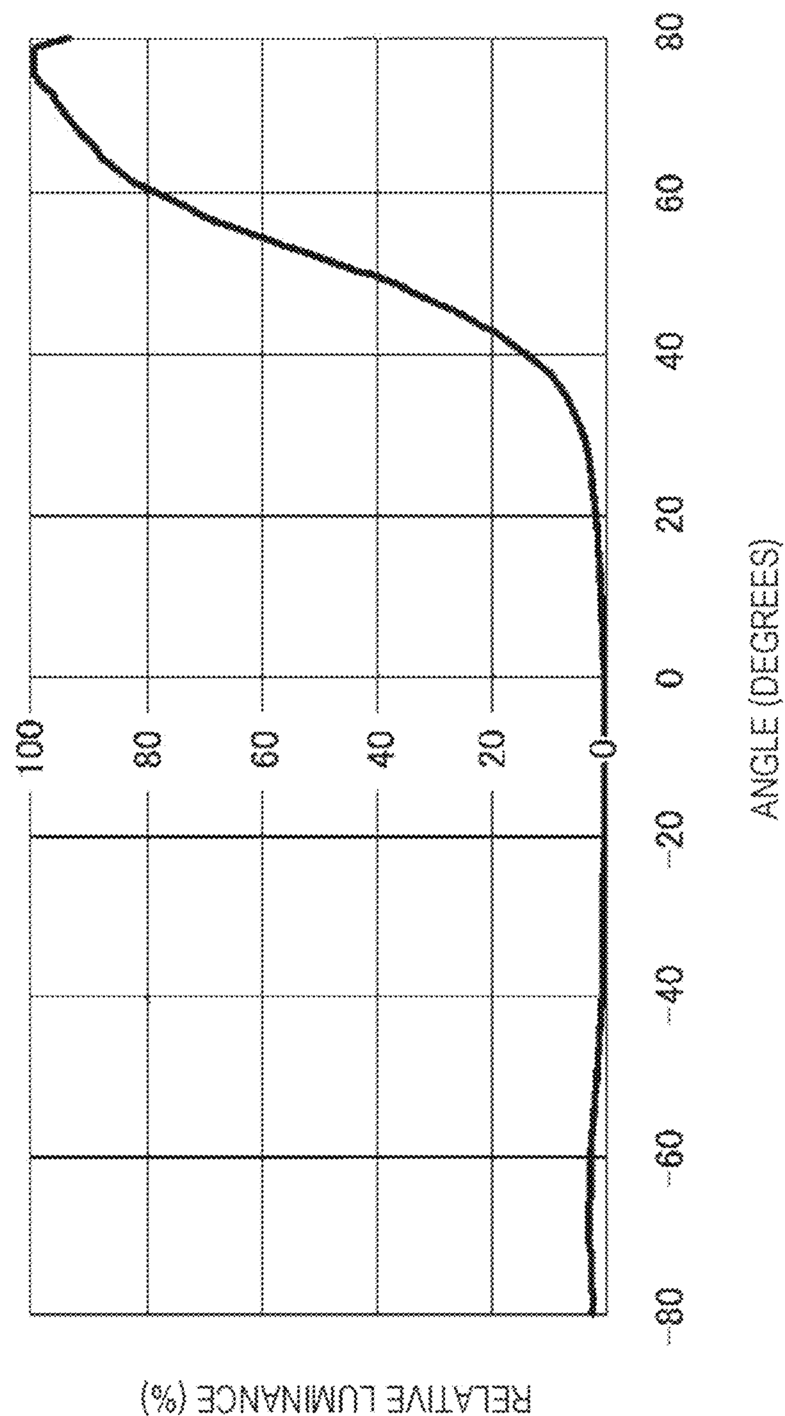
FIG. 6 is a graph showing a luminance angle distribution in the Y-axis direction of light emitted from a light-guiding plate in Demonstration Experiment 1.
Figure 7:
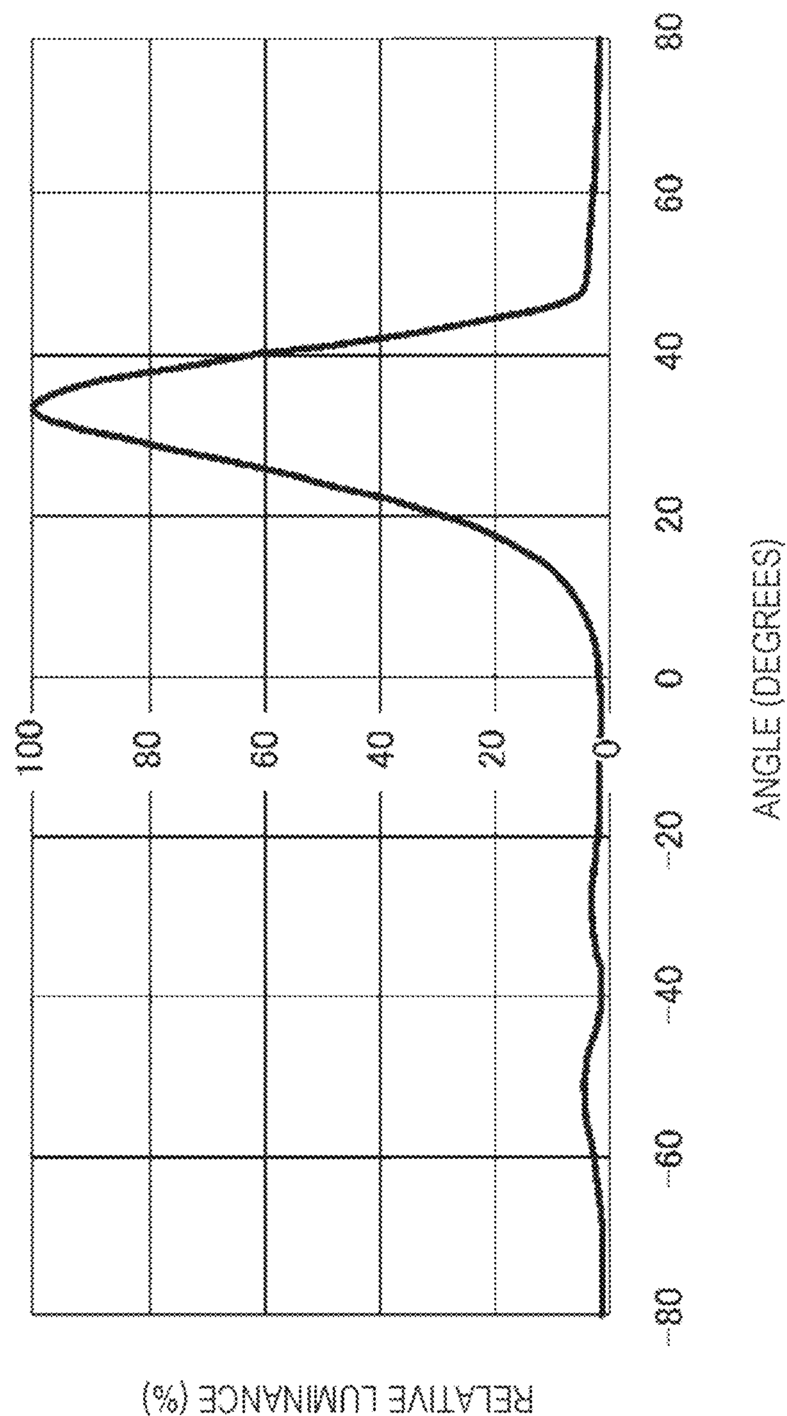
FIG. 7 is a graph showing a luminance angle distribution in the Y-axis direction of light emitted from a first prism sheet in Demonstration Experiment 1.
Figure 8:
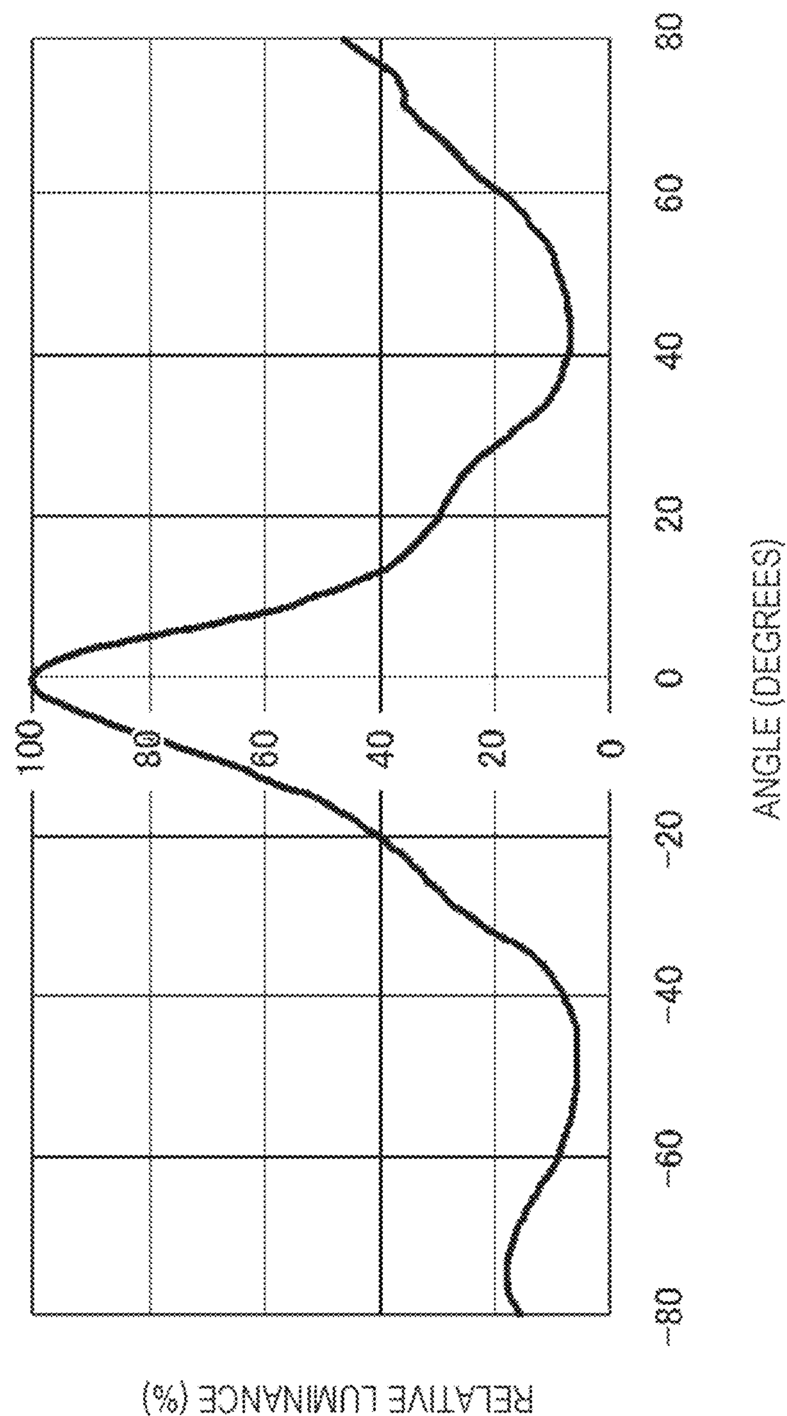
FIG. 8 is a graph showing a luminance angle distribution in the Y-axis direction of light emitted from a second prism sheet in Demonstration Experiment 1.
Figure 9:
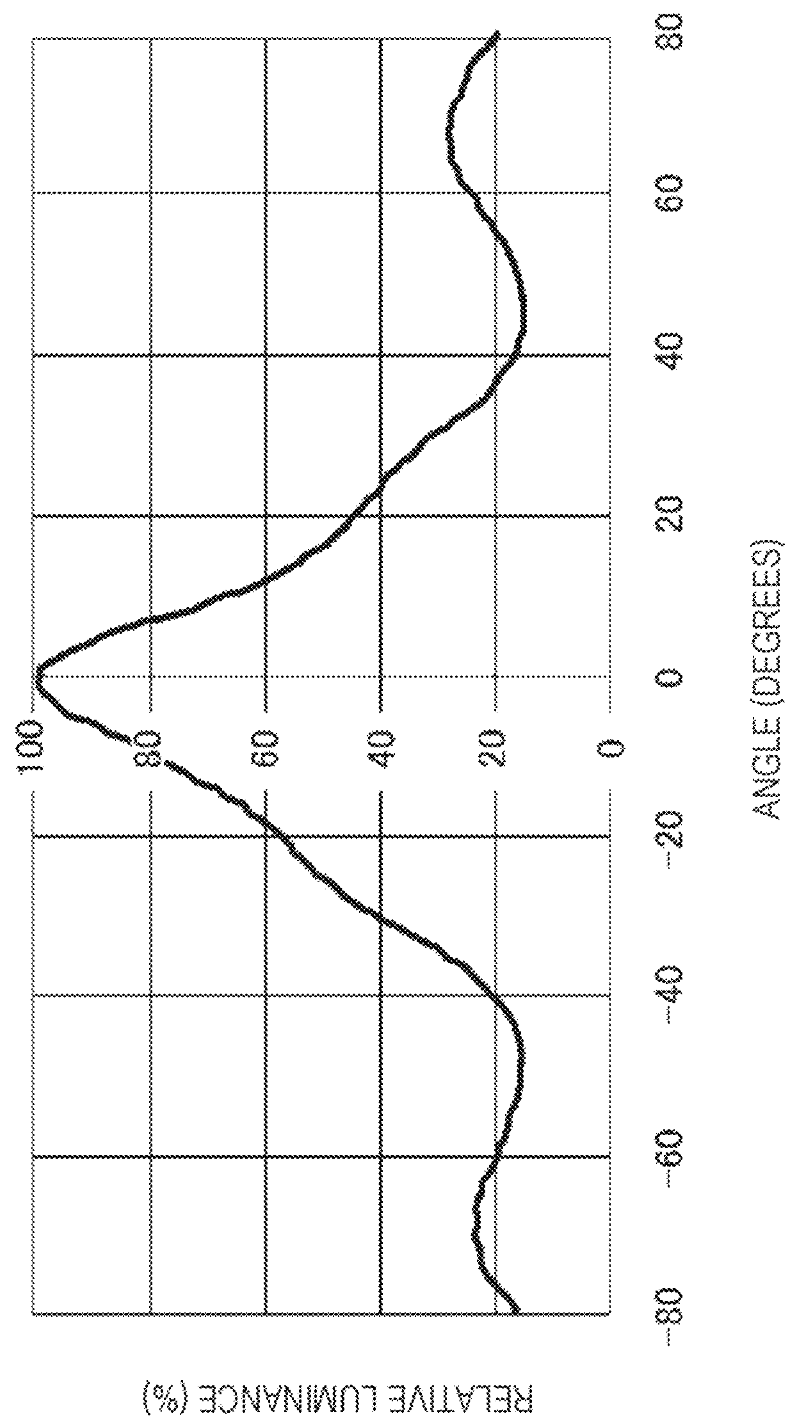
FIG. 9 is a graph showing a luminance angle distribution in the Y-axis direction of light emitted from a reflective polarizing sheet in Demonstration Experiment 1.

As shown in FIGS. 3 to 5, the light exit reflector 23 and the inclined surface 24 thus configured are disposed to be interposed between two second light-guiding plate unit lenses 22A adjacent to each other in the X-axis direction. Accordingly, the light exit reflector 23 and the inclined surface 24 are placed so as to be repeatedly arranged alternately with the second light-guiding plate unit lenses 22A in the X-axis direction. The unit reflectors 23A, which constitute the light exit reflector 23, are smaller in maximum value of projection dimension (height dimension) from the opposite plate surface 15C than the second light-guiding plate unit lenses 22A. Accordingly, even a unit reflector 23A located farthest away from the LED 13 in the Y-axis direction does not project further backward than the second light-guiding plate unit lenses 22A.

Next, Demonstration Experiment 1 and Comparative Experiments 1 to 6 were conducted as follows in order to examine the superiority of a backlight device 12 and a liquid crystal display device 10 according to the present embodiment. Comparative Experiments 1 to 6 will be described later. First, in Demonstration Experiment 1, luminance angle distributions of light emitted from a backlight device 12 according to the present embodiment were measured. Specifically, in Demonstration Experiment 1, a luminance angle distribution in the Y-axis direction of light emitted from the light-guiding plate 15, a luminance angle distribution in the Y-axis direction of light emitted from the first prism sheet 18, a luminance angle distribution in the Y-axis direction of light emitted from the second prism sheet 19, and a luminance angle distribution in the Y-axis direction of light emitted from the reflective polarizing sheet 20 were measured, and the results are as shown in FIGS. 6 to 9. In each of FIGS. 6 to 9, the vertical axis represents relative luminance (in "%") based on maximum luminance (as 100%), and the horizontal axis represents angles (in "degrees") in the Y-axis direction with respect to the frontal direction (Z-axis direction). The angle on the horizontal axis in each of FIGS. 6 to 9 indicates that a – (negative) side (left side of each of FIGS. 6 to 9) with respect to a reference of 0 degree (frontal direction) corresponds to the side of the LED 13 (side of the light entrance end face 15A) in the Y-axis direction and that a + (positive) side (right side of each of FIGS. 6 to 9) with respect to 0 degree corresponds to a side opposite to the LED 13 in the Y-axis direction.

Experimental results of Demonstration Experiment 1 are explained. According to the graph shown in FIG. 6, the light emitted from the light-guiding plate 15 is mostly angled toward a side opposite to the LED 13 in the Y-axis direction and tends to be higher in light intensity with increase in angle in an angular range of +20 to +80 degrees with respect to the frontal direction. According to the graph shown in FIG. 7, the light emitted from the first prism sheet 18 is mostly angled toward a side opposite to the LED 13 in the Y-axis direction, as is the case with the light emitted from the light-guiding plate 15, but exhibits a luminance angle distribution that approximates to a normal distribution having a peak of luminance near an angle of 35 degrees with respect to the frontal direction. According to the graph shown in FIG. 8, the light emitted from the second prism sheet 19 exhibits a luminance angle distribution that approximates to a normal distribution having a peak of luminance near the frontal direction but contains side lobe light in a range of ±60 to ±80 degrees. This luminance angle distribution has a full angle at half maximum of approximately 25 degrees. From this, it can be said that the second prism sheet 19 raises the light emitted from the first prism sheet 18 so that the light efficiently travels in the frontal direction and, at the same time, emits the light. Conversely, the first prism sheet 18 emits light that is easily gathered by the second prism sheet 19. According to the graph shown in FIG. 9, the light emitted from the reflective polarizing sheet 20 exhibits a luminance angle distribution that approximates to a normal distribution having a peak of luminance near the frontal direction, as is the case with the light emitted from the second prism sheet 19, but contains less side lobe light in a range of ±60 to ±80 degrees than in the case of the second prism sheet 19, and the luminance angle distribution has a larger full angle at half maximum of approximately 43 degrees than in the case of the second prism sheet 19. A possible reason for that is that a portion of the light emitted from the second prism sheet 19 whose angle of incidence with respect to the reflective polarizing sheet 20 takes on a large absolute value is efficiently reflected by the reflective polarizing sheet 20 for reuse.

Then, in Comparative Experiment 1, luminance angle distributions of emitted light were measured in relation to Example 1, which is a backlight device 12 according to the present embodiment, and Comparative Examples 1 and 2, which are two backlight devices differing in configuration from Example 1. Comparative Example 1, which is the same in light-guiding plate and reflective sheet as Example 1, is configured such that a diffusing sheet that diffuses light, a prism sheet including a base member and unit prisms, provided on a light exit side plate surface of the base member, that extend along the X-axis direction, and a prism sheet including a base member and unit prisms, provided on a light exit side plate surface of the base member, that extend along the Y-axis direction are stacked as optical sheets over the front side of the light-guiding plate. Comparative Example 2, which is the same in light-guiding plate and reflective sheet as Example 1, is configured such that an inverted prism sheet including a base member and unit prisms, provided on a light entrance side plate surface of the base member, that extend along the X-axis direction and a diffusing sheet that diffuses light are stacked as optical sheets over the front side of the light-guiding plate. Experimental results of Comparative Experiment 1 are as shown in FIGS. 10 to 13. In each of FIGS. 10 to 12, the solid line indicates a luminance angle distribution in the Y-axis direction, and the dotted line indicates a luminance angle distribution in the X-axis direction. In each of FIGS. 10 to 12, the vertical axis represents luminance (in "$cd/m^2$"), and the horizontal axis represents angles (in "degrees") in the X-axis or Y-axis direction with respect to the frontal direction (Z-axis direction). Regarding the Y-axis direction, the positive and negative signs assigned to this horizontal axis are the same in meaning as the description of FIGS. 6 to 9 of Demonstration Experiment 1 described above. FIG. 13 is a table of experimental results showing the maximum luminance, full angles at half maximum in the Y-axis direction, full angles at half maximum in the X-axis direction, and results of viewing angle determination. Of them, the viewing angle determination was made as "GOOD" in the case of a sufficiently wide viewing angle and made as "NARROW" in the case of an insufficiently wide viewing angle by an inspector viewing light emitted from each of Example 1 and Comparative Examples 1 and 2. Further, in the maximum luminance column, relative luminance based on Comparative Example 1 (as 100%) is written in parentheses.

Figure 10:
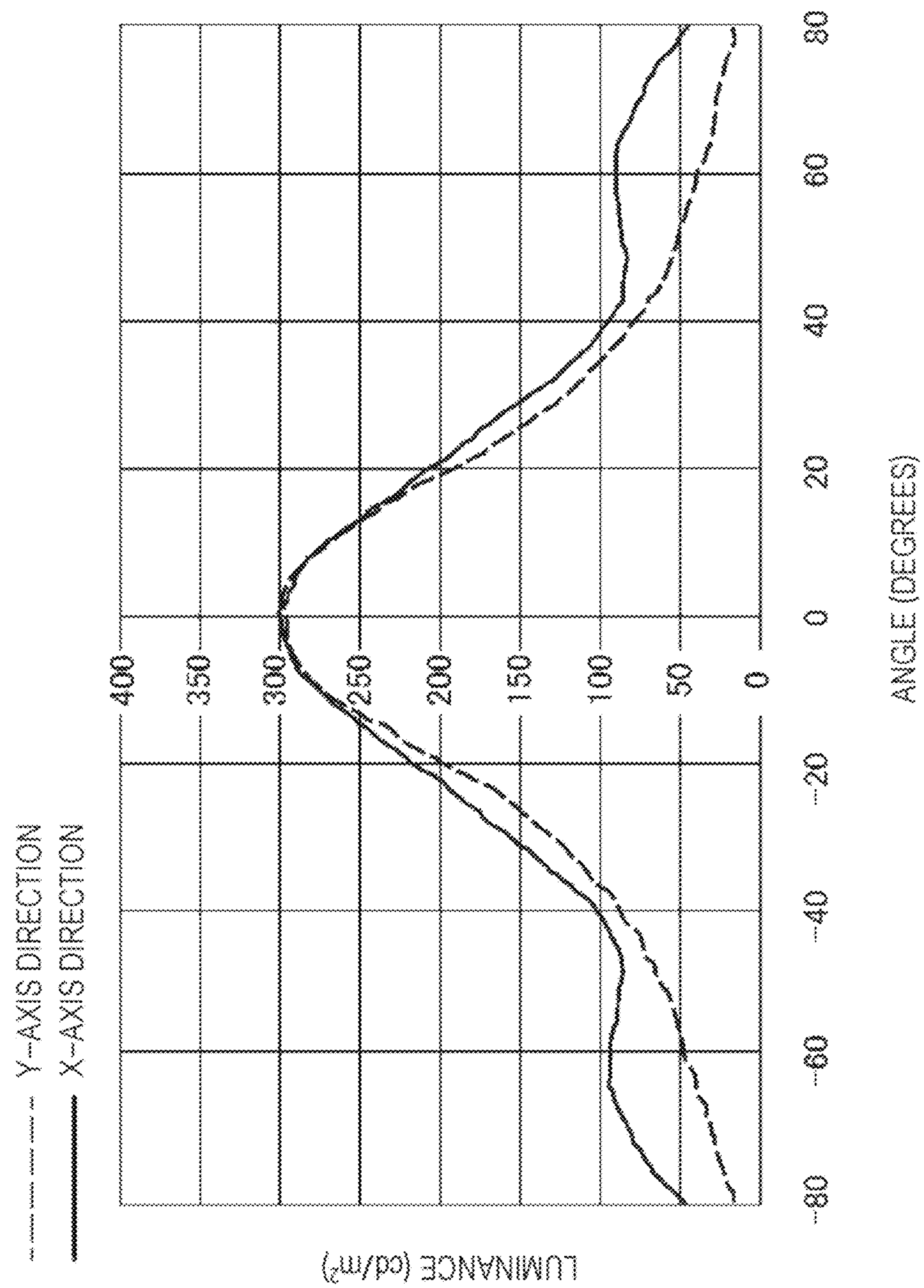
FIG. 10 is a graph showing a luminance angle distribution in the Y-axis direction of emitted light according to Comparative Example 1 of Comparative Experiment 1.
Figure 11:
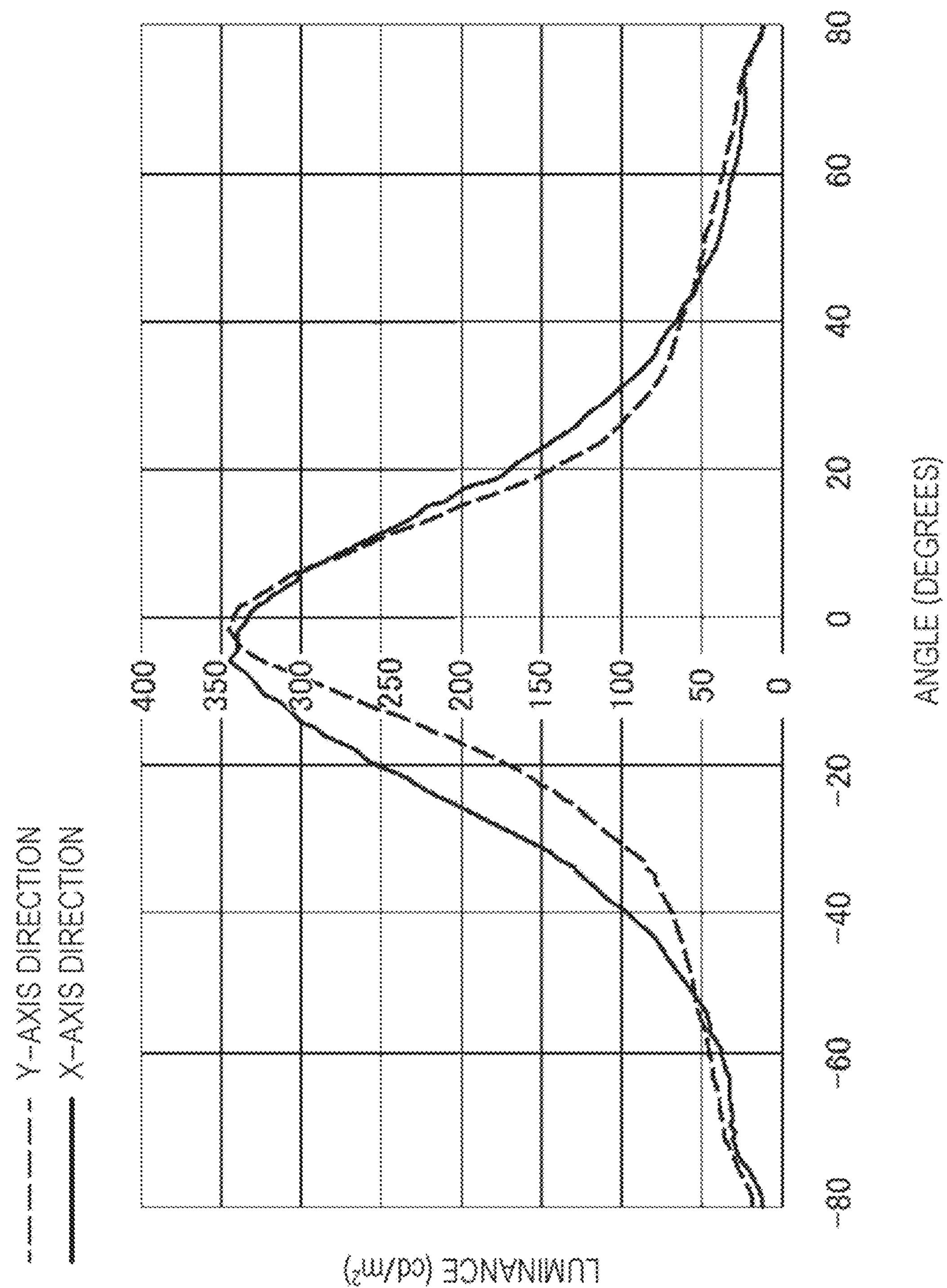
FIG. 11 is a graph showing a luminance angle distribution in the Y-axis direction of emitted light according to Comparative Example 2 of Comparative Experiment 1.
Figure 12:
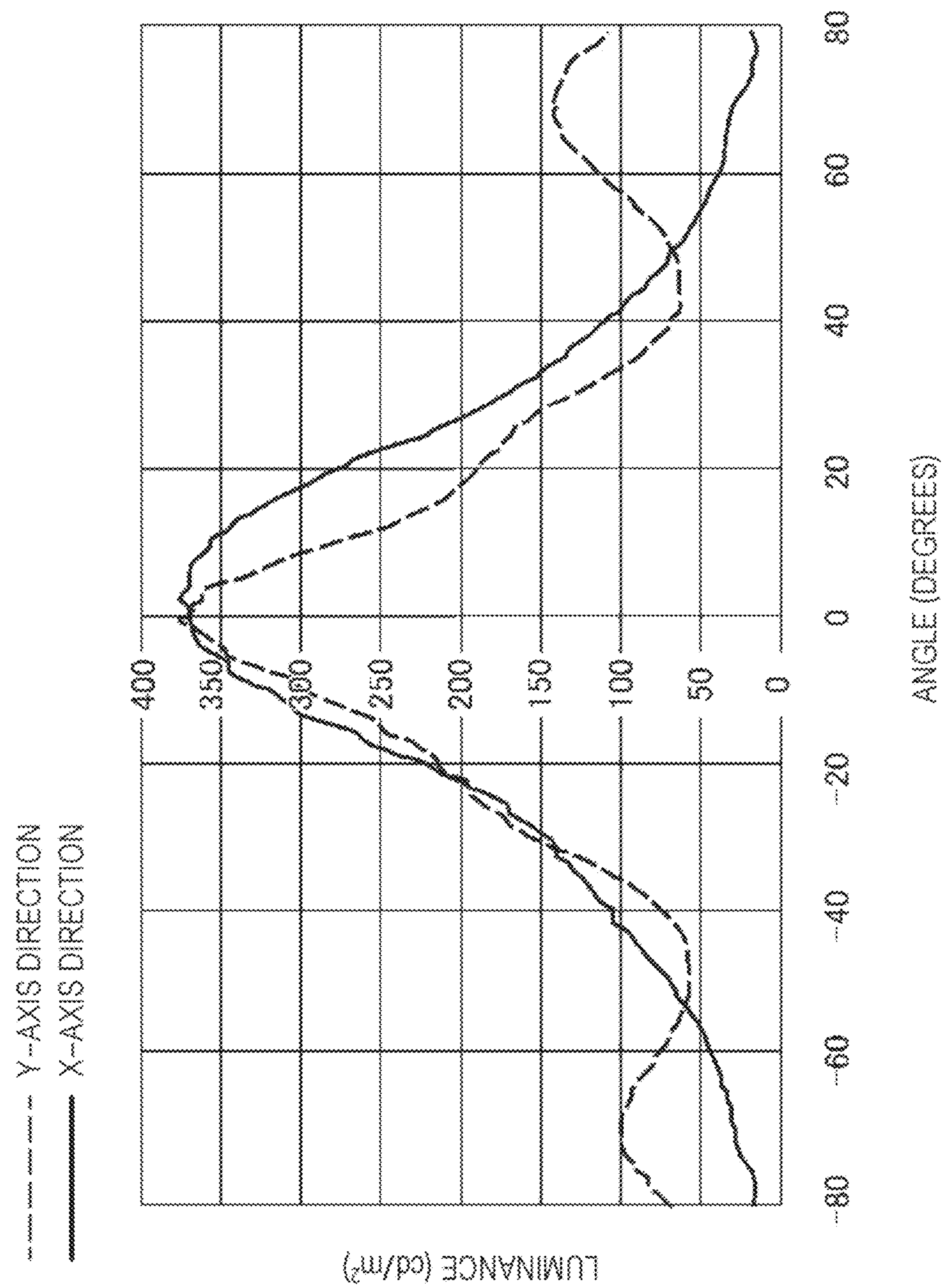
FIG. 12 is a graph showing a luminance angle distribution in the Y-axis direction of emitted light according to Example 1 of Comparative Experiment 1.

The experimental results of Comparative Experiment 1 are explained. According to FIGS. 10 and 13, Comparative Example 1 has sufficiently large full angles at half maximum of 52 degrees and 60 degrees in the Y-axis and X-axis directions, respectively, and is therefore superior in viewing angle characteristics. However, Comparative Example 1, whose maximum luminance is as low as 300 cd/m$^2$ (100%), lacks brightness. According to FIGS. 11 and 13, Comparative Example 2 has a sufficiently high maximum luminance of 345 cd/m$^2$ (115%). However, Comparative Example 2, whose full angles at half maximum in the Y-axis and X-axis directions are 33 degrees and 45 degrees, respectively, and are therefore unable to be said to be sufficiently large, is poor in viewing angle characteristics especially in the Y-axis direction. A possible reason for this is that the inverted prism sheet gives a very high light-gathering effect selectively in the Y-axis direction. According to FIGS. 12 and 13, Example 1 has sufficiently large full angles at half maximum of 43 degrees and 52 degrees in the Y-axis and X-axis directions, respectively, and a very high maximum luminance of 375 cd/m$^2$ (125%). Accordingly, Example 1 can be said to be good in both viewing angle characteristics and luminance.

Figure 14:
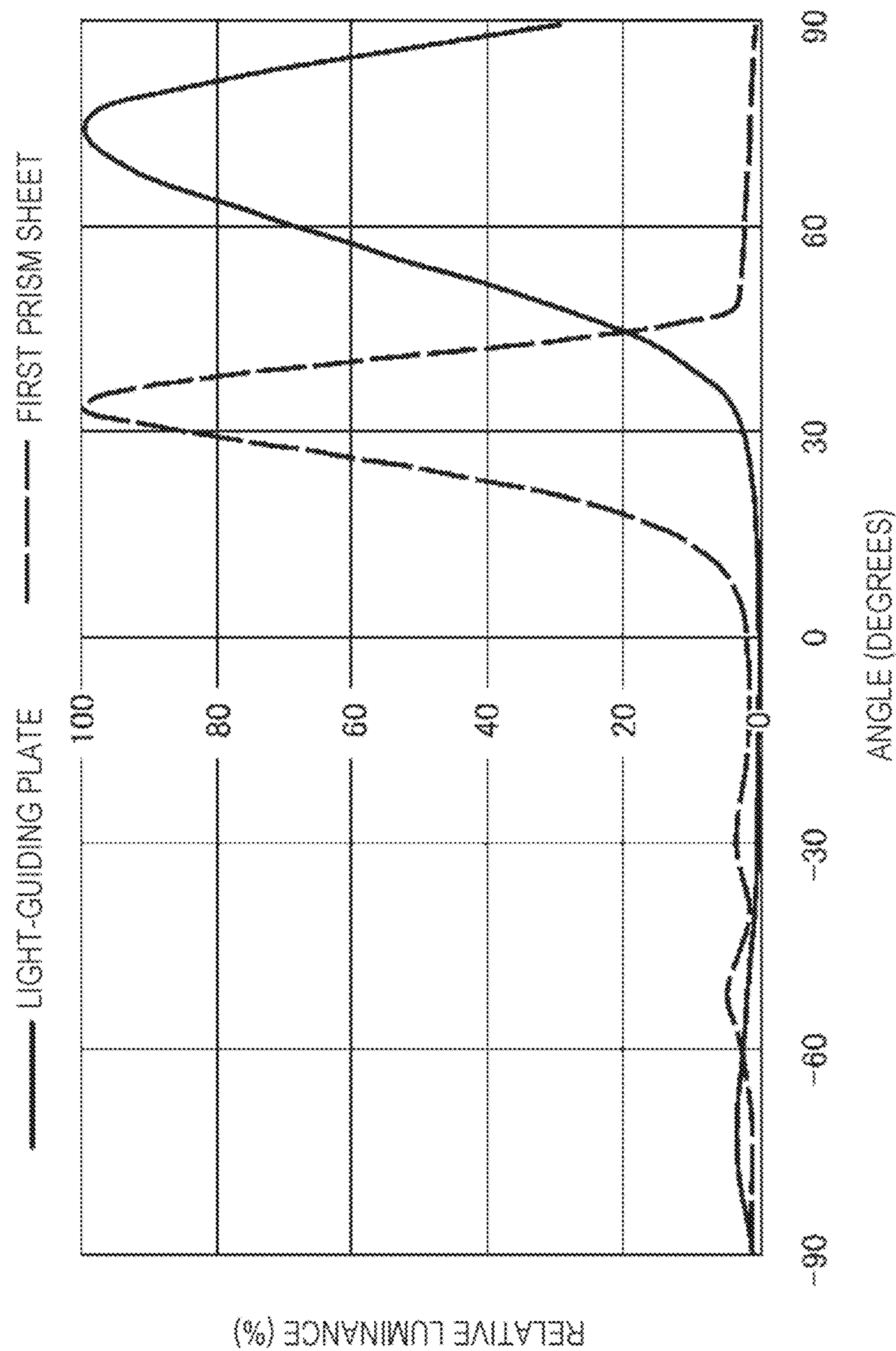
FIG. 14 is a graph showing luminance angle distributions in the Y-axis direction of light emitted from a light-guiding plate and a first prism sheet in Comparative Experiment 2.
Figure 15:
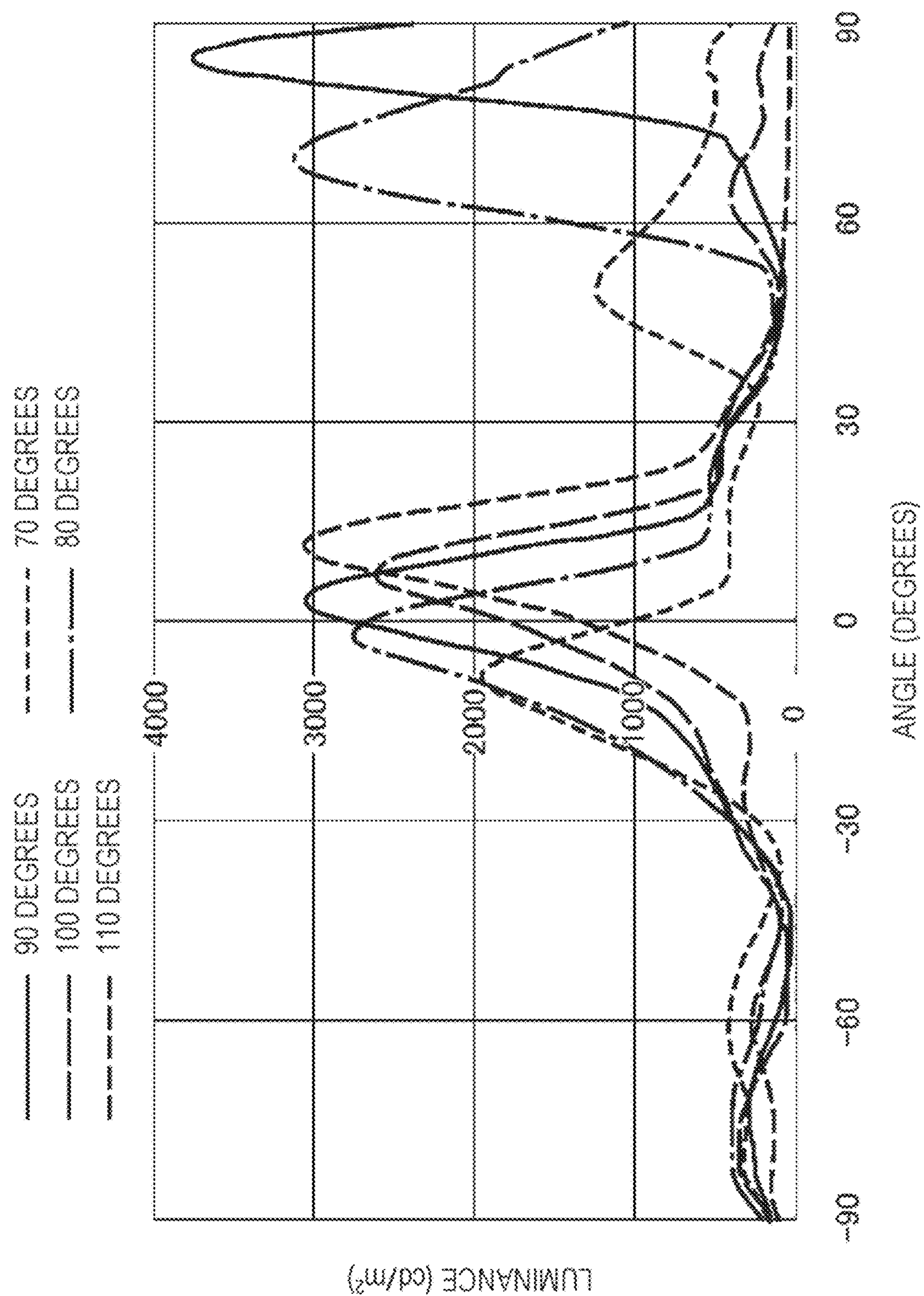
FIG. 15 is a graph showing luminance angle distributions in the Y-axis direction of light emitted from second prism sheets in Comparative Experiment 2.
Figure 16:
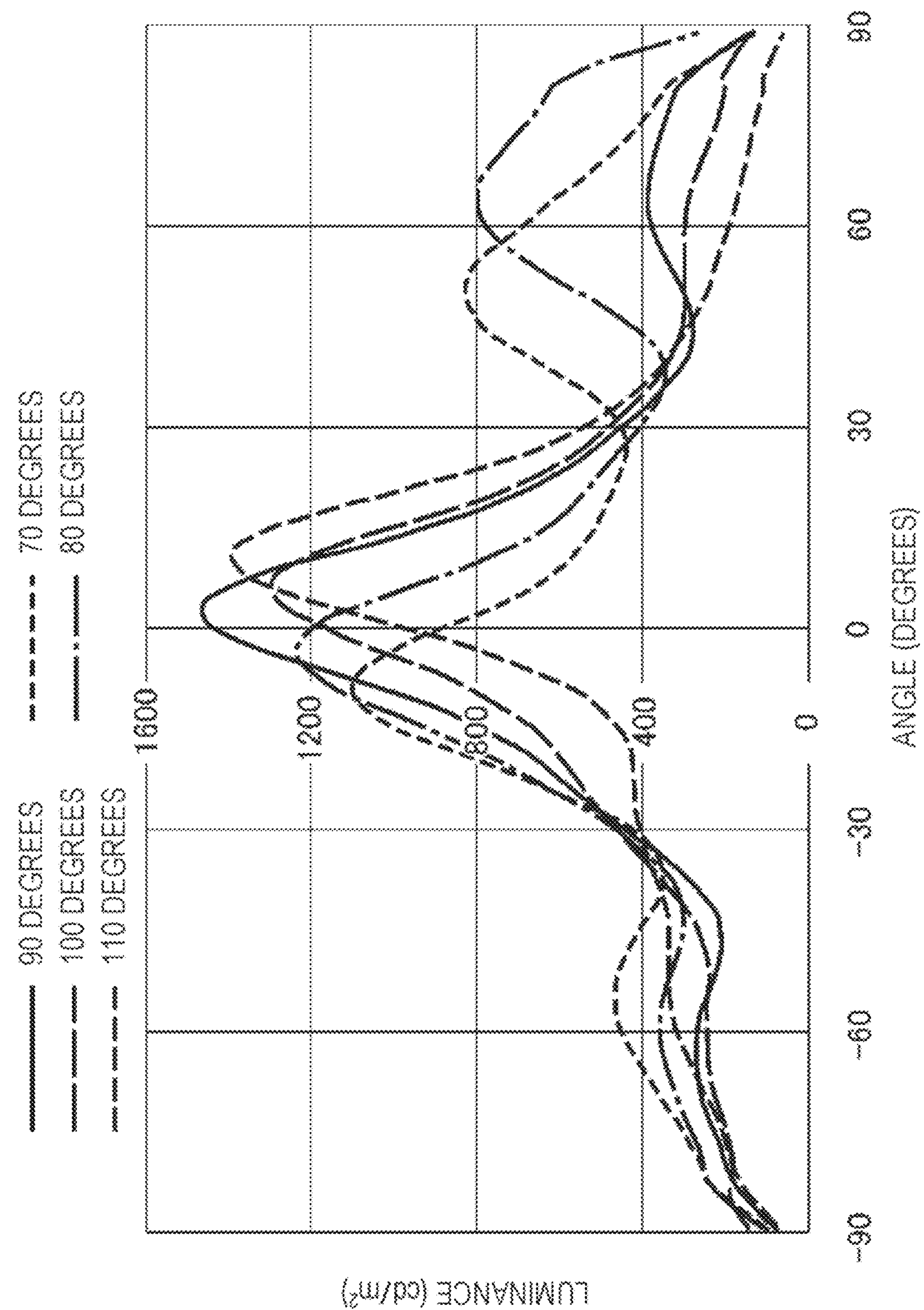
FIG. 16 is a graph showing luminance angle distributions in the Y-axis direction of light emitted from reflective polarizing sheets in Comparative Experiment 2.
Figure 17:
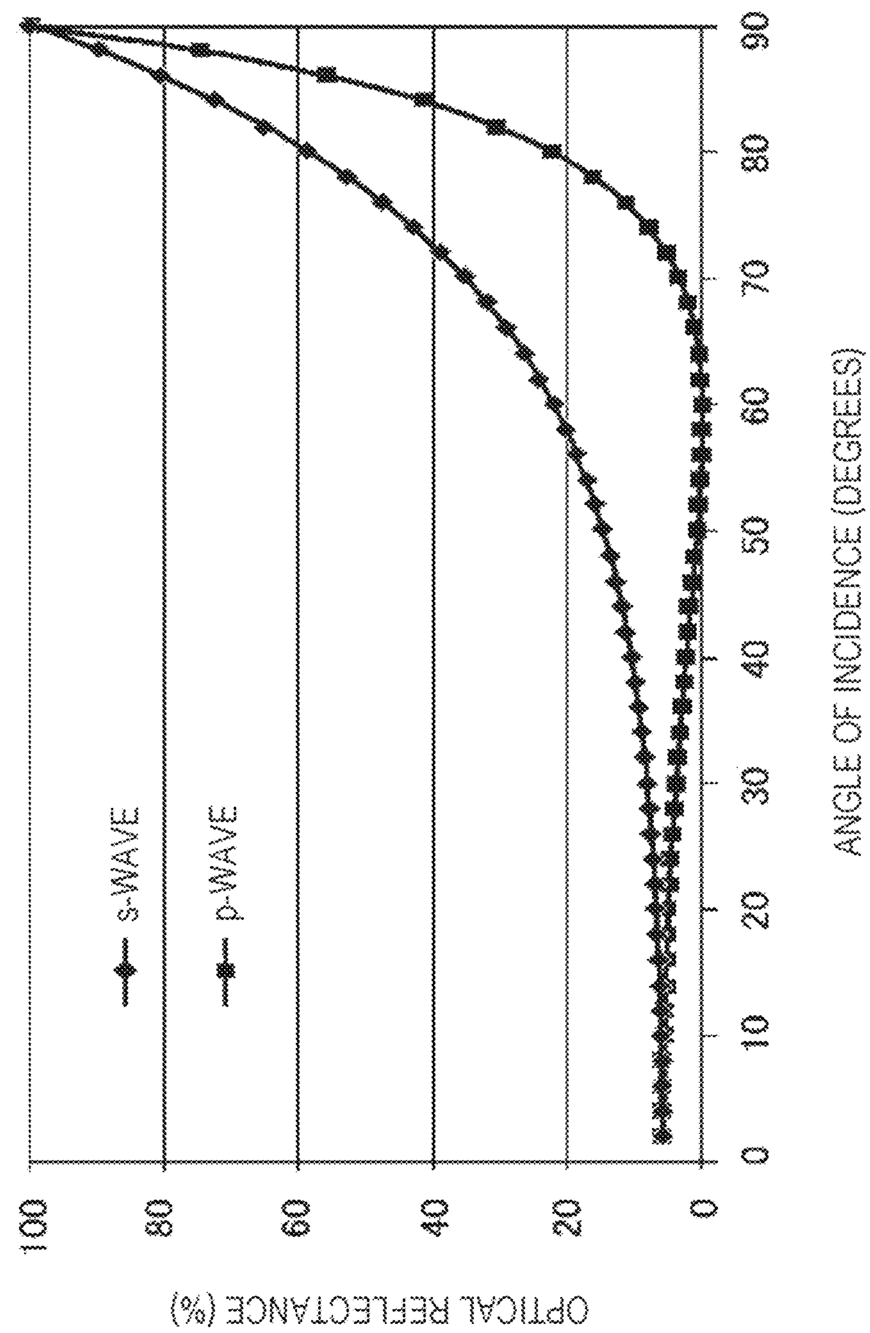
FIG. 17 is a graph representing a relationship between angles of incidence of light with respect to the reflective polarizing sheets and optical reflectances in Comparative Experiment 2.

Comparative Experiment 2 is described. Comparative Experiment 2 was conducted to examine variations in luminance angle distribution in cases of changes in configuration of the second unit prism 19B of the second prism sheet 19. Specifically, in Comparative Experiment 2, luminance angle distributions of light emitted from backlight devices 12 were measured in a manner similar to Demonstration Experiment 1 described above, with use of second prism sheets 19 with varying vertex angles θ6 of 70 degrees, 80 degrees, 90 degrees, 100 degrees, and 110 degrees of the second unit prisms 19B. Except for the second prism sheets 19, the backlight devices 12 had the same components as those described in the paragraphs preceding Demonstration Experiment 1. Experimental results of Comparative Experiment 2 are as shown in FIGS. 14 to 19. In FIG. 14, the solid line indicate a luminance angle distribution in the Y-axis direction of light emitted from the light-guiding plate 15, and the dotted line indicate a luminance angle distribution in the Y-axis direction of light emitted from the first prism sheet 18. FIG. 15 shows luminance angle distributions in the Y-axis direction of light emitted from the second prism sheets 19, and the legends in the drawing indicate the numerical values of the vertex angles θ6. FIG. 16 shows luminance angle distributions in the Y-axis direction of light emitted from the reflective polarizing sheets 20, and the legends in the drawing indicate the numerical values of the vertex angles θ6. In FIG. 14, the vertical axis represents relative luminance (in "%") based on maximum luminance (as 100%). In each of FIGS. 15 and 16, the vertical axis represents luminance (in "cd/m$^2$"). In each of FIGS. 14 to 16, the horizontal axis represents angles (in "degrees") in the Y-axis direction with respect to the frontal direction (Z-axis direction). The positive and negative signs assigned to this horizontal axis are the same in meaning as the description of FIGS. 6 to 9 of Demonstration Experiment 1 described above. FIG. 17 is a graph representing a relationship between angles of incidence of light with respect to the reflective polarizing sheets 20 and optical reflectances, and the legends in the drawing indicate an s-wave and a p-wave. In FIG. 17, the vertical axis represents the optical reflectances (in "%"), and the horizontal axis represents the angles of incidence (in "degrees") of light with respect to the reflective polarizing sheets 20. FIGS. 18 and 19 are tables of experimental results showing the vertex angles θ6, the maximum luminance, and full angles at half maximum in the Y-axis direction.

The experimental results of Comparative Experiment 2 are explained. FIG. 14 shows results which are similar to those shown in FIGS. 6 and 7 of Demonstration Experiment 1. According to FIGS. 15 and 18, the light emitted from the second prim sheets 19, whose vertex angles θ6 are 70 to 90 degrees, contain much side lobe light in an angular range of +40 to +90 degrees, and a larger vertex angle θ6 tends to cause side lobe light to reach a luminance peak at a larger angle. In particular, side lobe light contained in the light emitted from the second prism sheet 19 whose vertex angle is 90 degrees reaches a luminance peak at an angle of nearly 90 degrees. Compared to this, the light emitted from the second prism sheets 19 whose vertex angles θ6 are 100 degrees and 110 degrees only slightly contains side lobe light in a positive angular range, and in particular, the light emitted from the second prism sheet 19 whose vertex angle θ6 is 110 degrees hardly contains side lobe light in a positive angular range. According to FIGS. 16 and 19, the light emitted from the reflective polarizing sheets 20 with use of the second prism sheets 19 whose vertex angles θ6 are 80 to 100 degrees gives a high maximum luminance of 1200 cd/m$^2$ or higher. In particular, the vertex angle θ6 of 90 degrees gives the highest maximum luminance and sufficiently wide viewing angle characteristics with a full angle at half maximum of 38 degrees. Further, the vertex angles θ6 of 80 and 100 degrees give sufficiently high maximum luminance, albeit lower than does the vertex angle θ6 of 90 degrees, and give wider viewing angle characteristics with a full angle at half maximum of 40 degrees or larger than does the vertex angle θ6 of 90 degrees. Meanwhile, the vertex angle θ6 of 70 degrees gives remarkably low luminance in an angular range of +10 to +20 degrees while giving a maximum luminance of lower than 1200 cd/m$^2$, and is therefore inferior in both maximum luminance and viewing angle characteristics to the vertex angles θ6 of 80 to 100 degrees. Further, the vertex angle θ6 of 110 degrees gives remarkably low luminance in an angular range of −10 to −20 degrees while giving a maximum luminance of 1200 cd/m$^2$ or higher, and is therefore inferior in viewing angle characteristics to the vertex angles θ6 of 80 to 100 degrees. According to FIG. 17, it is found that a larger angle of incidence of light with respect to a reflective polarizing sheet 20 tends to lead to a higher optical reflectance. In particular, p-waves have very low optical reflectances of several percent with angles of incidence of light in an angular range of 0 to 70 degrees but tend to rapidly become higher in optical reflectance over 70 degrees. Comparing the results of FIG. 17 with the results of FIGS. 15 and 16 shows that at the vertex angles of 80 and 90 degrees, much side lobe light whose angle of incidence with respect to the reflective polarizing sheets 20 is 70 degrees or larger is contained and this side lobe light is very efficiently reflected by the reflective polarizing sheets 20. The light reflected by the reflective polarizing sheets 20 is converted into light having small angles of incidence through the process of being reflected by the reflective sheets 16 and the like and reaching the reflective polarizing sheets 20 again, and contributes to improvement in frontal luminance by being emitted at an angle close to the frontal direction.

Comparative Experiment 3 is described. Comparative Experiment 3 was conducted to examine variations in luminance angle distribution in cases of changes in configuration of the first unit prism 18B of the first prism sheet 18.

Figure 20:
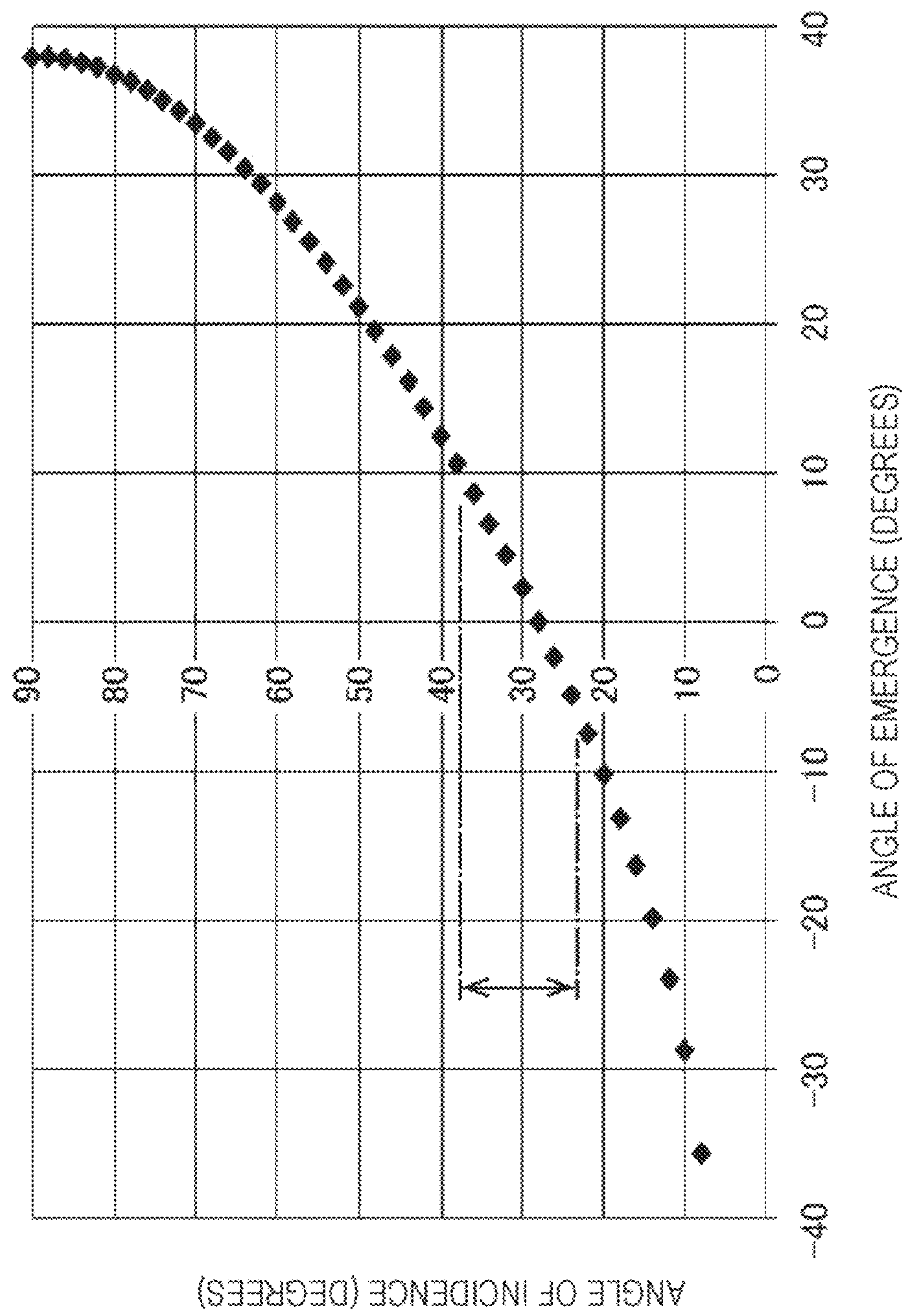
FIG. 20 is a graph representing a relationship between angles of incidence of light with respect to second prism sheets in Comparative Experiment 3 and angles of emergence of light that is emitted from the second prism sheets.
Figure 21:
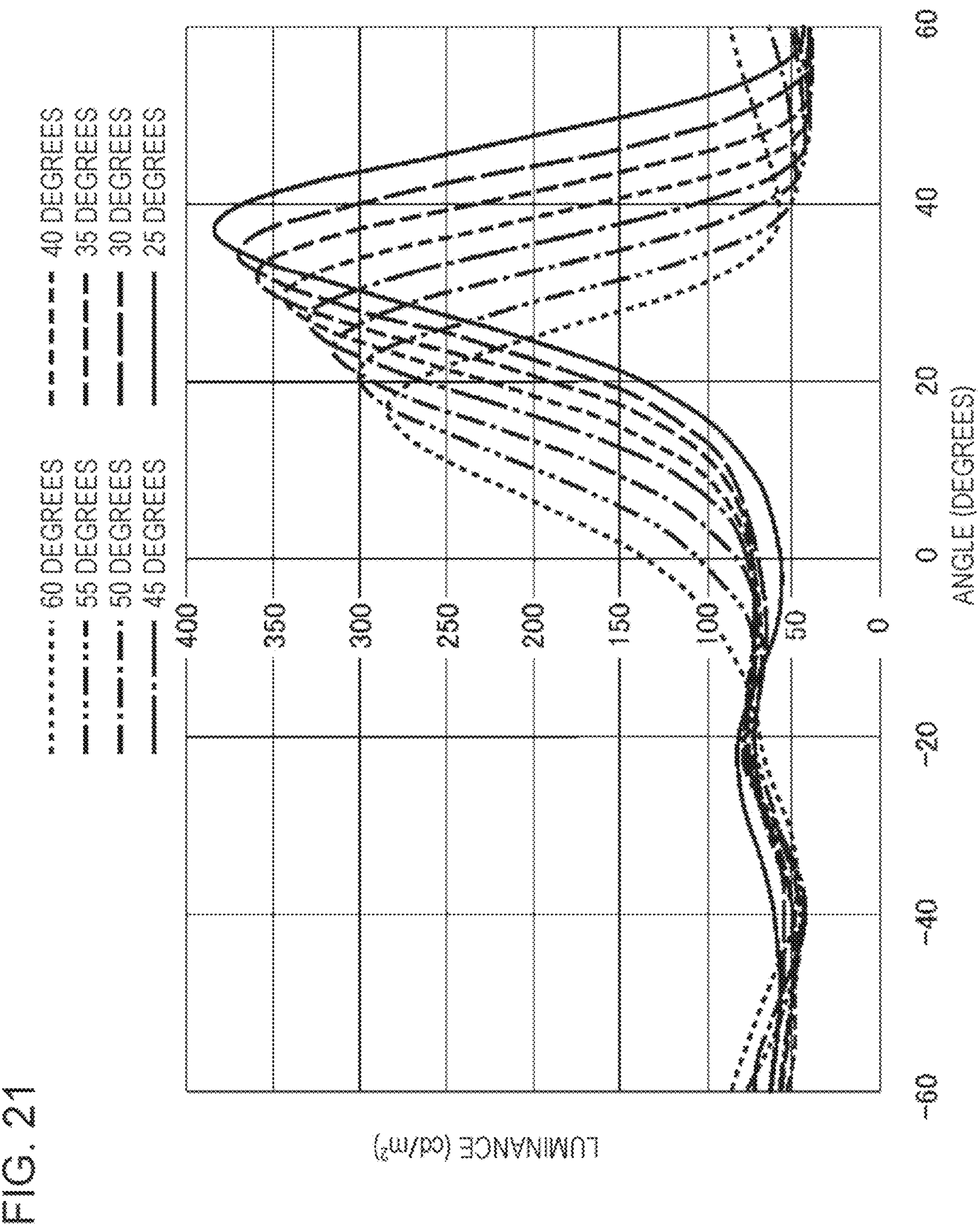
FIG. 21 is a graph showing luminance angle distributions in the Y-axis direction of light emitted from first prism sheets in Comparative Experiment 3.
Figure 22:
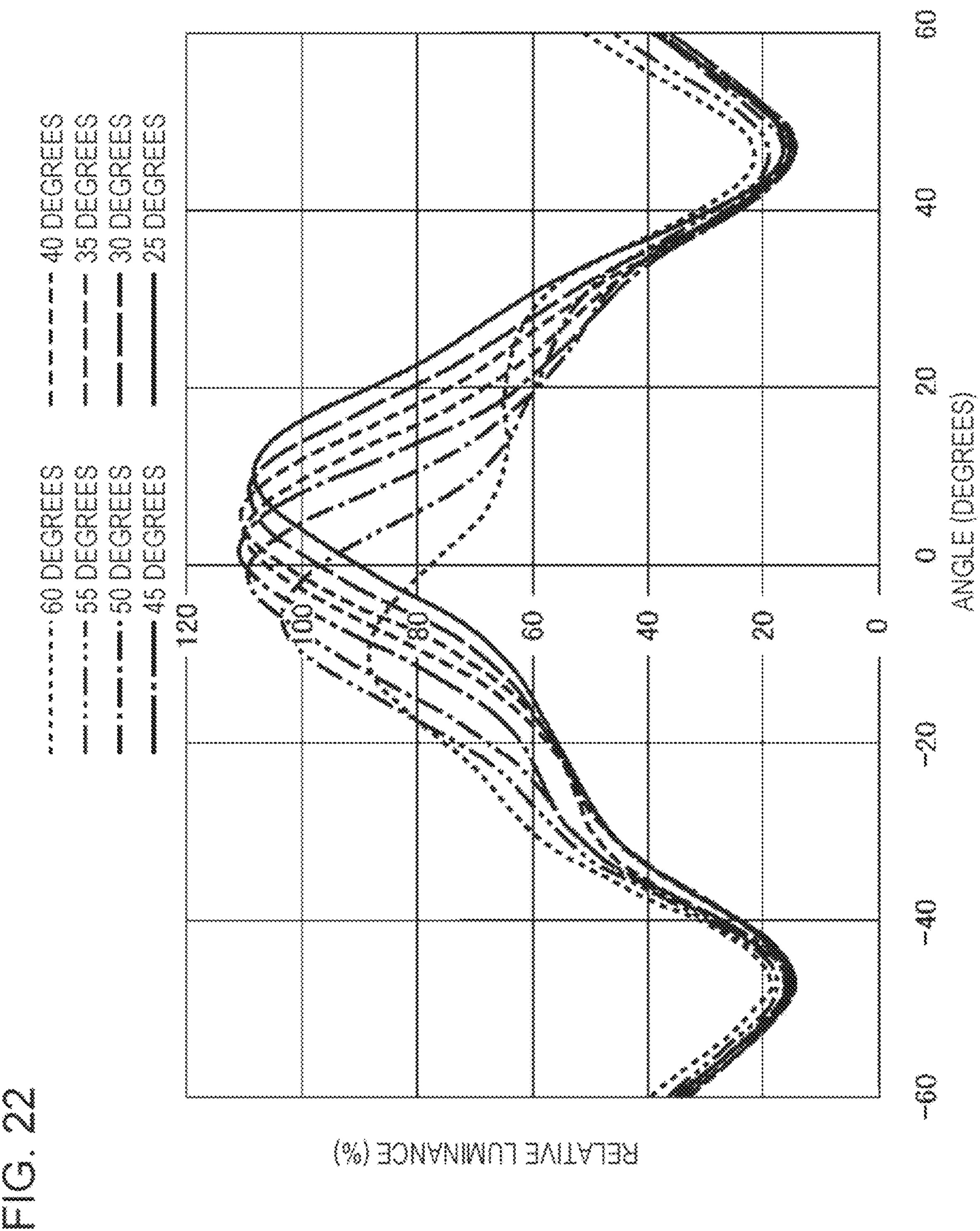
FIG. 22 is a graph showing luminance angle distributions in the Y-axis direction of light emitted from reflective polarizing sheets in Comparative Experiment 3.

Specifically, in Comparative Experiment 3, luminance angle distributions of light emitted from backlight devices 12 were measured with use of first prism sheets 18 with 5-degree increments in an angular range of 25 to 60 degrees of the angle of inclination θ2 of the first LED opposing oblique side 18B3 with respect to the base 18B1 of the first unit prism 18B. In each case, the angle of inclination θ1 of the first LED facing oblique side 18B2 was 55 degrees, and the vertex angle θ6 of the second unit prism 19B of the second prism sheet 19 was 90 degrees. Except for those components, the backlight devices 12 had the same components as those described in the paragraphs preceding Demonstration Experiment 1. Experimental results of Comparative Experiment 3 are as shown in FIGS. 20 to 23. FIG. 20 is a graph representing a relationship between angles of incidence of light with respect to the second prism sheets 19 and angles of emergence of light that is emitted from the second prism sheets 19. In FIG. 20, the vertical axis represents the angles of incidence of light (in "degrees"), and the horizontal axis represents the angles of emergence of light (in "degrees"). FIG. 21 shows luminance angle distributions in the Y-axis direction of light emitted from the first prism sheets 18, and the legends in the drawing indicate the numerical values of the angles of inclination θ2. FIG. 22 shows luminance angle distributions in the Y-axis direction of light emitted from the reflective polarizing sheets 20, and the legends in the drawing indicate the numerical values of the angles of inclination θ2. In FIG. 21, the vertical axis represents luminance (in "$cd/m^2$"). In FIG. 22, the vertical axis represents relative luminance (in "%") based on maximum luminance (as 100%). In each of FIGS. 21 and 22, the horizontal axis represents angles (in "degrees") in the Y-axis direction with respect to the frontal direction (Z-axis direction). The positive and negative signs assigned to this horizontal axis are the same in meaning as the description of FIGS. 6 to 9 of Demonstration Experiment 1 described above. FIG. 23 is a table of experimental results showing the angles of inclination θ2 and the relative luminance.

The experimental results of Comparative Experiment 3 are explained. According to FIG. 20, it is found that in order for an angle of emergence of light from a second prism sheet 19 to be in an angular range of −10 to +10 degrees that is effective in bringing about improvement in frontal luminance, it is preferable that an angle of incidence of light with respect to the second prism sheet 19 be in a range of 20 to 37 degrees. In particular, in order for an angle of emergence of light from a second prism sheet 19 to correspond to the frontal direction, it is preferable that an angle of incidence of light with respect to the second prism sheet 19 be approximately 28 degrees. According to FIG. 21, smaller angles of inclination θ2 tend to lead to larger angles of emergence at luminance peaks of light emitted from the first prism sheets 18. Among these, luminance peaks of light emitted from the first prism sheets 18 are in a range of 20 to 37 degrees when angles of inclination θ2 are in an angular range of 35 to 50 degrees. Above all, the angle of inclination θ2 of 45 degrees causes light emitted from the first prism sheet 18 to reach a luminance peak at around 28 degrees. According to FIGS. 22 and 23, in cases where angles of inclination θ2 are in an angular range of 35 to 50 degrees, the relative luminance of light emitted from the reflective polarizing sheet 20 is 95% or higher in each case, whereby sufficiently high frontal luminance is attained, and angles of emergence serving as luminance peaks are kept at around 0 degree, whereby good viewing angle characteristics are attained. Above all, the angle of inclination θ2 of 45 degrees gives the highest relative luminance, and can be said to be best in both frontal luminance and viewing angle characteristics. Meanwhile, in cases where angles of inclination θ2 are 25, 30, 55, and 60 degrees, the relative luminance of light emitted from the reflective polarizing sheet 20 to fall short of 95% in each case, whereby insufficient frontal luminance results, and angles of emergence serving as luminance peaks are relatively greatly displaced from 0 degree, whereby inferior viewing angle characteristics result.

Figure 24:
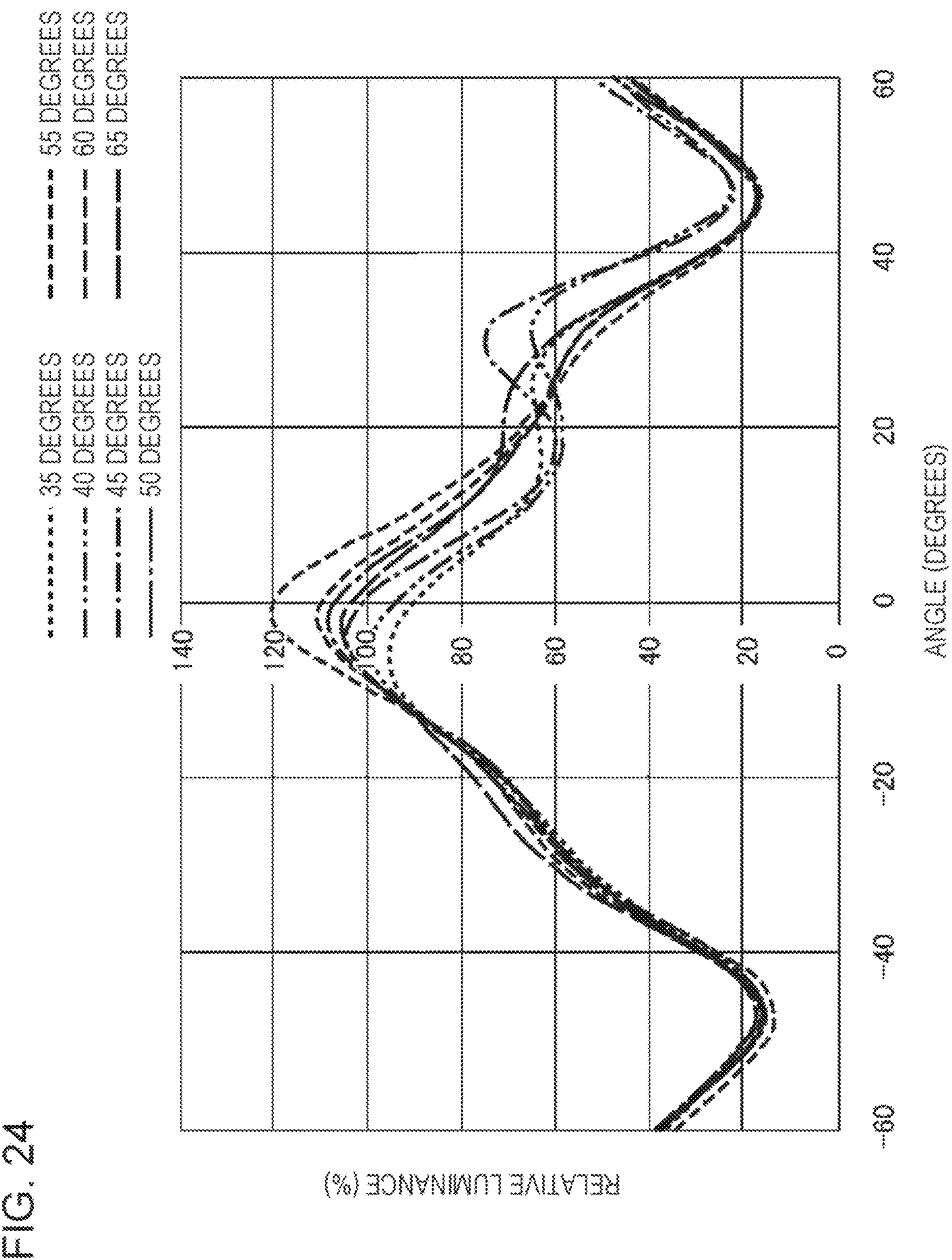
FIG. 24 is a graph showing luminance angle distributions in the Y-axis direction of light emitted from reflective polarizing sheets in Comparative Experiment 4.

Comparative Experiment 4 is described. In Comparative Experiment 4, luminance angle distributions of light emitted from backlight devices 12 were measured with use of first prism sheets 18 with 5-degree increments in an angular range of 35 to 65 degrees of the angle of inclination θ1 of the first LED facing oblique side 18B2 with respect to the base 18B1 of the components of the first unit prism 18B of each of the first prism sheets 18. In each case, the angle of inclination θ2 of the first LED opposing oblique side 18B3 was 45 degrees, and the vertex angle θ6 of the second unit prism 19B of the second prism sheet 19 was 90 degrees. Except for those components, the backlight devices 12 had the same components as those described in the paragraphs preceding Demonstration Experiment 1. Experimental results of Comparative Experiment 4 are as shown in FIGS. 24 and 25. FIG. 24 shows luminance angle distributions in the Y-axis direction of light emitted from the reflective polarizing sheets 20, and the legends in the drawing indicate the numerical values of the angles of inclination θ1. In FIG. 24, the vertical axis represents relative luminance (in "%") based on luminance (as 100%) in the case of an angle of inclination θ1 of 40 degrees, and the horizontal axis represents angles (in "degrees") in the Y-axis direction with respect to the frontal direction (Z-axis direction). The positive and negative signs assigned to this horizontal axis are the same in meaning as the description of FIGS. 6 to 9 of Demonstration Experiment 1 described above. FIG. 25 is a table of experimental results showing the angles of inclination θ1 and the relative luminance.

The experimental results of Comparative Experiment 4 are explained. According to FIGS. 24 and 25, in cases where angles of inclination θ1 are in an angular range of 50 to 60 degrees, the relative luminance of light emitted from the reflective polarizing sheet 20 exceeds 110% in each case, whereby sufficiently high frontal luminance is attained, and angles of emergence serving as luminance peaks are kept at around 0 degree, whereby good viewing angle characteristics are attained. Above all, the angle of inclination θ1 of 55 degrees gives the highest relative luminance, and can be said to be best in both frontal luminance and viewing angle characteristics. Meanwhile, in cases where angles of inclination θ2 are 35, 40, 45, and 65 degrees, the relative luminance of light emitted from the reflective polarizing sheet 20 to be 110% or lower in each case, whereby insufficient frontal luminance results, and angles of emergence serving as luminance peaks are relatively greatly displaced from 0 degree, whereby inferior viewing angle characteristics results.

Figure 26:
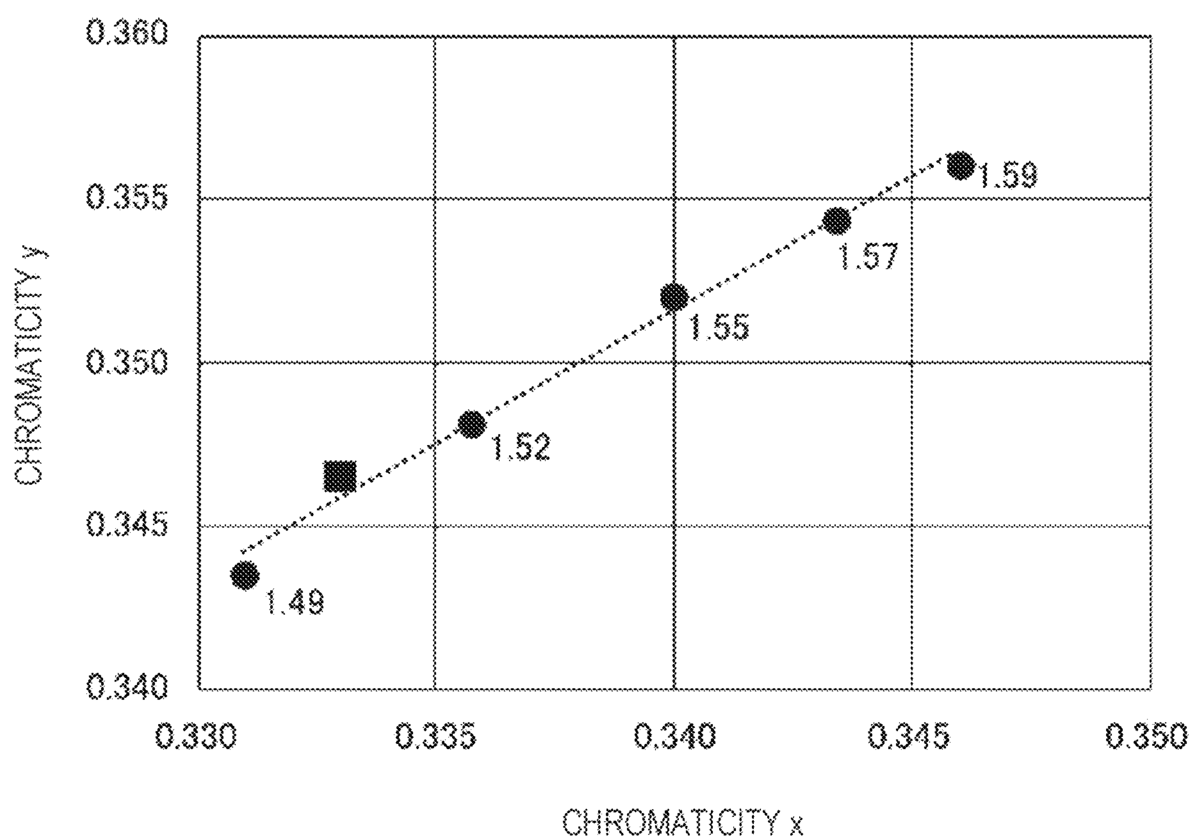
FIG. 26 is a 1931 chromaticity diagram showing the chromaticity of light emitted from reflective polarizing sheets with varying values of the refractive indices of first unit prisms in Comparative Experiment 5 in a range of 1.49 to 1.59.

Comparative Experiment 5 is described. In Comparative Experiment 5, the chromaticity of light emitted from backlight devices 12 was measured with use of first prism sheets 18 with varying values of the refractive indices of the first unit prisms 18B of the first prism sheets 18 in a range of 1.49 to 1.59. Except for the refractive indices of the first unit prisms 18B, the backlight devices 12 were configured as described in the paragraphs preceding Demonstration Experiment 1. Experimental results of Comparative Experiment 5 are as shown in FIGS. 26 and 27. The experimental results of Comparative Experiment 5 are put down with Reference Example 1, which indicates reference values of chromaticity. Reference Example 1 is the luminance of light emitted from a backlight device of the same configuration as Comparative Example 1 of Comparative Experiment 1. FIG. 26 is a CIE 1931 chromaticity diagram plotting the chromaticity of light emitted from the reflective polarizing sheets 20 with varying values of the refractive indices of the first unit prisms 18B in the range of 1.49 to 1.59. The plots "●" shown in FIG. 26 denote the numerical values (1.49, 1.52, 1.55, 1.57, and 1.59) of the refractive indices of the first unit prisms 18B. Of the plots shown in FIG. 26, the plot "■" denotes the chromaticity of Reference Example 1, which serves as a reference. In FIG. 26, the x axis, which is the horizontal axis, and the y axis, which is the vertical axis, represent x values and y values that are chromaticity coordinate values. FIG. 27 is a table of experimental results showing the refractive indices of the first unit prisms 18B, the chromaticity values (x values and y values) of emitted light, and differences (variations in x value and variations in y value) with respect to the chromaticity values of Reference Example 1.

The experimental results of Comparative Experiment 5 are explained. According to FIGS. 26 and 27, it is found that as the refractive index of a first unit prism 18B becomes larger, both the x and y values of emitted light increase to greater variations from the reference values of Reference Example 1, with the result that there is a tendency to have a tinge of yellow. Conversely, it is found that as the refractive index of a first unit prism 18B becomes smaller, both the x and y values of emitted light decrease, with the result that there is a tendency to have a tinge of blue. Within a range of 1.49 to 1.52 out of the range of 1.49 to 1.59, the refractive index of a first unit prism 18B results in chromaticity close to the reference values of Reference Example 1, giving satisfactory white light with no tinge of any particular color. On the other hand, when the refractive index of a first unit prism 18B is larger than 1.52, emitted light undesirably has a tinge of yellow and may be visually recognized as unevenness in color. Further, when the refractive index of a first unit prism 18B is smaller than 1.49, emitted light undesirably has a tinge of blue and may be visually recognized as unevenness in color.

Figure 28:
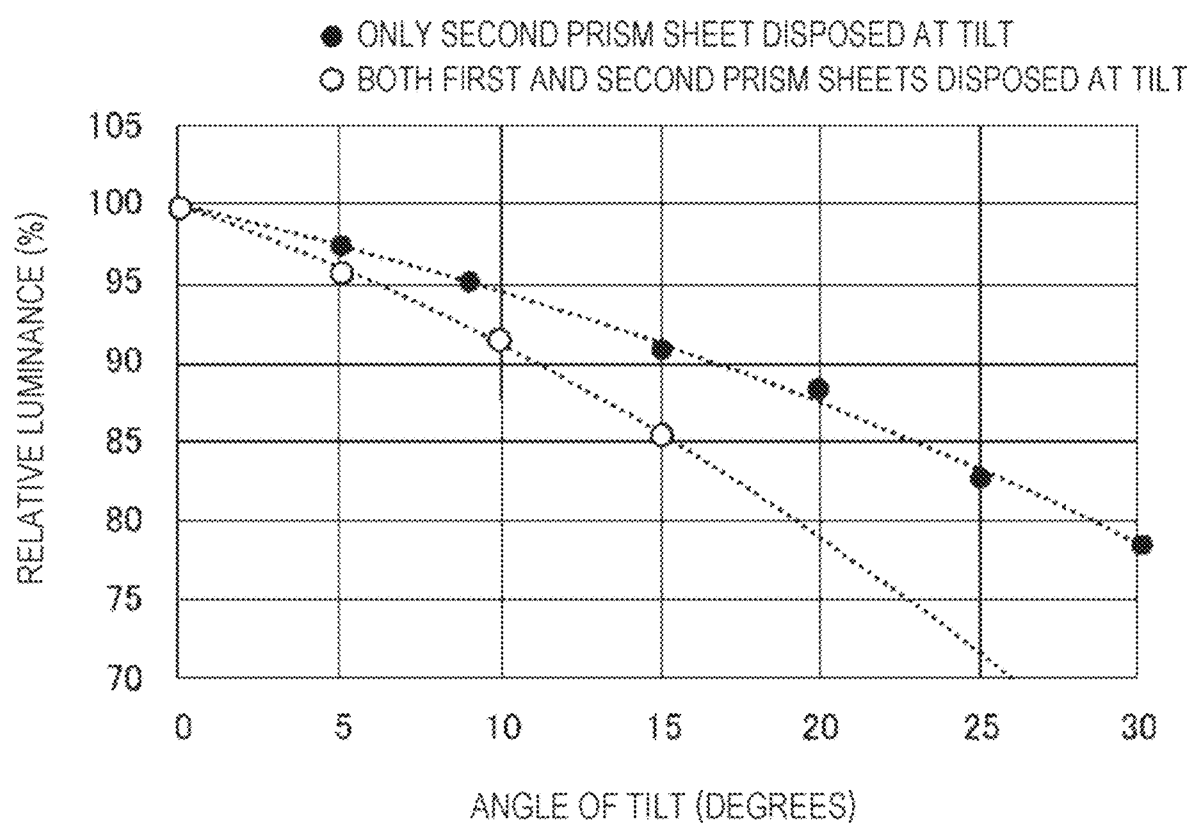
FIG. 28 is a graph showing a relationship of the luminance of light emitted from liquid crystal display devices with respect to the angles of tilt of first and second prism sheets with respect to liquid crystal panels in Comparative Experiment 6.

Comparative Experiment 6 is described. In Comparative Experiment 6, the luminance of light emitted in cases where second prism sheets 19 are disposed at tilts with respect to liquid crystal panels 11 in liquid crystal display devices 10 was measured. Specifically, in Comparative Experiment 6, the luminance of light emitted in cases where only second prism sheets 19 are tilted with respect to liquid crystal panels 11 and cases where both first and second prisms sheets 18 and 19 are tilted with respect to liquid crystal panels 11 was measured. Experimental results are as shown in FIG. 28. FIG. 28 is a graph showing a relationship of the luminance of light emitted from liquid crystal display devices 10 with respect to the angles of tilt of first and second prism sheets 18 and 19 with respect to liquid crystal panels 11. In FIG. 28, the vertical axis represents relative luminance (in "%") based on maximum luminance (as 100%), and the horizontal axis represents angles of tilt (in "degrees") of the first and second prism sheets 18 and 19.

The experimental results of Comparative Experiment 6 are described. According to FIG. 28, it is found that a larger angle of tilt leads to a decrease in luminance of emitted light in both a case where only a first prism sheet 18 is tilted with respect to a liquid crystal panel 11 and a case where both first and second prism sheets 18 and 19 are tilted with respect to a liquid crystal panel 11. Moreover, it is found that in a case where only a first prism sheet 18 is tilted, a decrease in luminance tends to be more suppressed even at a large angle of tilt than in a case where both first and second prism sheets 18 and 19 are tilted. In general, the larger the angle of tilt becomes, the harder it becomes for interference to occur with respect to the pixels of a liquid crystal panel 11. Accordingly, it can be said to be preferable that for reduction of moiré, only a second prism sheet 19 be placed at a tilt with respect to a liquid crystal panel 11.

As described above, a backlight device (lighting device) 12 of the present embodiment includes: an LED (light source) 13; a light-guiding plate 15 that forms a plate shape, at least a part of whose outer peripheral end face serves as a light entrance end face 15A on which light emitted from the LED 13 falls, and a first plate surface of which serves as a light exit plate surface 15B from which light is emitted; a first prism sheet 18, placed on a light exit side of the light-guiding plate 15, that includes a plurality of first unit prisms 18B which are arranged along a first direction including a direction from the LED 13 toward the light-guiding plate 15 and which extend along a second direction orthogonal to both the first direction and a plate thickness direction of the light-guiding plate 15; and a second prism sheet 19, placed on a light exit side of the first prism sheet 18, that includes a plurality of second unit prisms 19B which are arranged along the first direction and which extend along the second direction. In the backlight device 12, each of the first and second unit prisms 18B and 19B of the first and second prism sheets 18 and 19 has a base 18B1 or 19B1 that is parallel to the first direction and a pair of oblique sides 18B2 and 18B3 or 19B2 and 19B3 standing from both ends, respectively, of the base 18B1 or 19B1, and an angle that the second LED facing oblique side 19B2, which is one of the oblique sides that faces toward the LED 13, forms with respect to the base 19B1 in the first direction in the second unit prism 19B is smaller than an angle that the first LED facing oblique side 18B2 that faces toward the LED 13 forms with respect to the base 18B1 in the first direction in the first unit prism 18B.

In this way, light emitted from the LED 13 and having fallen on the light entrance end face 15A of the light-guiding plate 15 propagates through the inside of the light-guiding plate 15, is emitted from the light exit plate surface 15B, and falls on the first prism sheet 18. Most of the light having fallen on the first prism sheet 18 is refracted by striking one of the pair of oblique sides 18B2 and 18B3 of the first unit prism 18B that is located on a side opposite to the LED 13 in the first direction, and is emitted while being raised or travels toward the first LED facing oblique side 18B2, which is an oblique side that faces toward the LED 13 in the first direction. In comparison with the second unit prism 19B, the first unit prism 18B is configured such that the first LED facing oblique side 18B2, which is an oblique side that faces toward the LED 13 in the first direction, forms a larger angle with respect to the base 18B1 or 19B1; therefore, as compared with the case of the same angle or an inverted angular magnitude relationship, it becomes harder for the light having fallen on the first prism sheet 18 to strike the first LED facing oblique side 18B2, which is an oblique side of the first unit prism 18B that faces toward the LED 13. When the light having fallen on the first prism sheet 18 strikes the first LED facing oblique side 18B2, which is an oblique side of the first unit prism 18B that faces toward the LED 13, the light tends to be easily emitted as stray light without being raised in being emitted from the first unit prism 18B. Accordingly, when it becomes hard for the light having fallen on the first prism sheet 18 to strike the first LED facing oblique side 18B2, which is an oblique side of the first unit prism 18B that faces toward the LED 13, the generation of stray light is reduced. This results in improvement in efficiency in the use of light.

Most of light emitted from the first prism sheet 18 and having fallen on the second prism sheet 19 is refracted by striking one of the pair of oblique sides 19B2 and 19B3 of the second unit prism 19B that is located on a side opposite to the LED 13 in the first direction, and is emitted while being raised or travels toward the second LED facing oblique side 19B2, which is an oblique side that faces toward the LED 13 in the first direction. In comparison with the first unit prism 18B, the second unit prism 19B is configured such that the second LED facing oblique side 19B2, which is an oblique side that faces toward the LED 13 in the first direction, forms a smaller angle with respect to the base 19B1; therefore, as compared with the case of the same angle or an inverted angular magnitude relationship, it becomes easier for the light refracted by the oblique side located on the side opposite to the LED 13 in the first direction and traveling toward the second LED facing oblique side 19B2, which is an oblique side that faces toward the LED 13 in the first direction, to be returned toward the first prism sheet 18 by the second LED facing oblique side 19B2, which is an oblique side that faces toward the LED 13 in the first direction. This results in an increase in amount of light (hereinafter referred to as "recursive light") that is returned from the second prism sheet 19 toward the first prism sheet 18. This recursive light reaches the second prism sheet 19 again, for example, by being reflected within the backlight device 12 and is emitted while being raised by either of the pair of oblique sides 19B2 and 19B3 of the second unit prisms 19B. This brings about improvement in efficiency in the use of light. Since the recursive light has a complicated optical path unit it is emitted from the second prism sheet 19, it is given various rising angles by the second unit prism 19B. This brings about improvement in viewing angle characteristics. All this brings about improvement in viewing angle characteristics and luminance.

Further, the second prism sheet 19 may be configured such that the pair of oblique sides 19B2 and 19B3 of the second unit prism 19B form equals angles with respect to the base 19B1. This suitably brings about improvement in luminance by bringing about improvement in efficiency in the recycle of light that is returned toward the first prism sheet 18 by one of the pair of oblique sides 19B2 and 19B3 of the second unit prism 19B after having struck the other oblique side. Moreover, light emitted by striking the pair of oblique angles 19B2 and 19B3 of the second unit prism 19B is given equal raising effects, respectively. This brings about better viewing angle characteristics.

Further, the second prism sheet 19 may be configured such that the pair of oblique sides 19B2 and 19B3 of the second unit prism 19B form an angle in a range of 80 to 100 degrees with each other. The efficiency in the recycle of light that is returned toward the first prism sheet 18 by one of the pair of oblique sides 19B2 and 19B3 of the second unit prism 19B after having struck the other oblique side is highest in a case where the pair of oblique sides 19B2 and 19B3 of the second unit prism 19B form an angle of 90 degrees with each other. Accordingly, the efficiency in the recycle of light is kept high by causing the pair of oblique sides 19B2 and 19B3 of the second unit prism 19B to form an angle in a range of 80 to 100 degrees with each other. This further suitably brings about improvement in luminance.

Further, the first prism sheet 18 may be configured such that the first LED opposite oblique surface 18B3, which is an oblique side of the first unit prism 18B located on a side opposite to the LED 13, forms an angle in a range of 35 to 50 degrees with respect to the base 18B1. This makes viewing angle characteristics better than if the first LED opposite oblique surface 18B3, which is an oblique side of the first unit 18B located on the side opposite to the LED 13, forms an angle of smaller than 35 degrees or larger than 50 degrees with respect to the base 18B1. That is, the direction of travel of light that is emitted while being raised by the first LED opposite oblique surface 18B3, which is an oblique side of the first unit prism 18B of the first prism sheet 18 located on the side opposite to the LED 13, depends on the angle that the oblique side forms with respect to the base 18B1, and directly affects the angle of incidence of light with respect to the second prism sheet 19. On the other hand, the direction of travel of light that is emitted while being raised by the pair of oblique sides 19B2 and 19B3 of the second unit prism 19B of the second prism sheet 19 depends on the angle of incidence of light with respect to the second prism sheet 19. Moreover, since the first LED opposite oblique surface 18B3, which is an oblique side of the first unit prism 18B located on the side opposite to the LED 13, forms an angle in a range of 35 to 50 degrees with respect to the base 18B1, light emitted from the second prism sheet 19 is efficiently raised to an angle close to the plate thickness direction of the light-guiding plate 15, whereby good viewing angle characteristics are attained.

Further, the first prism sheet 18 may be configured such that the first LED opposing oblique side 18B3, which is an oblique side of the first unit prism 18B located on the side opposite to the LED 13, forms an angle of 45 degrees with respect to the base 18B1. In this way, light emitted from the second prism sheet 19 is most efficiently raised to an angle close to the plate thickness direction of the light-guiding plate 15, whereby good viewing angle characteristics and high luminance are attained.

Further, the first prism sheet 18 may be configured such that the first LED facing oblique side 18B2, which is an oblique side of the first unit prism 18B that faces toward the LED 13, forms an angle in a range of 50 to 60 degrees with respect to the base 18B1. This makes luminance higher than if the first LED facing oblique surface 18B2, which is an oblique side of the first unit prism 18B that faces toward the LED 13, forms an angle of smaller than 50 degrees or larger than 60 degrees with respect to the base 18B1. If the first LED facing oblique surface 18B2, which is an oblique side of the first unit prism 18B that faces toward the LED 13, forms an angle of smaller than 50 degrees with respect to the base 18B1, the first LED facing oblique surface 18B2, which is an oblique side that faces toward the LED 13, occupies too large a portion of the area within a plate surface of the first prism sheet 18. This makes it easy for light having fallen on the first prism sheet 18 to strike the first LED facing oblique surface 18B2, which is an oblique side of the first unit prism 18B that faces toward the LED 13. This causes more stray light to be emitted without being raised in being emitted from the first unit prism 18B. Meanwhile, if the first LED facing oblique surface 18B2, which is an oblique side of the first unit prism 18B that faces toward the LED 13, forms an angle of larger than 60 degrees with respect to the base 18B1, light returned from the second prism sheet 19 tends to easily become stray light upon striking the first LED facing oblique surface 18B2, which is an oblique side of the first unit prism 18B that faces toward the LED 13. In that regard, since the first LED facing oblique side 18B2, which is an oblique side of the first unit prism 18B that faces toward the LED 13, forms an angle in a range of 50 to 60 degrees with respect to the base 18B1, the generation of stray light is effectively reduced, whereby improvement in luminance is brought about.

Further, the first prism sheet 18 may be configured such that the first LED facing oblique side 18B2, which is an oblique side of the first unit prism 18B that faces toward the LED 13, forms an angle of 55 degrees with respect to the base 18B1. In this way, the generation of stray light is most effectively reduced, whereby further improvement in luminance is brought about.

Further, the backlight device 12 may further include a reflective polarizing sheet 20, placed on a light exit side of the second prism sheet 19, that includes a multilayer film in which layers differing in refractive index from each other are alternately stacked. In this way, a portion of light emitted from the second prism sheet 19 is returned to the second prism sheet 19 by being reflected by the multilayer film of the reflective polarizing sheet 20, and the remaining portion of the light passes through the reflective polarizing sheet 20. The light returned to the second prism sheet 19 falls on the reflective polarizing sheet 20 again by repeating reflections and refractions. Note here that since the second prism sheet 19 is configured such that the pair of oblique sides 19B2 and 19B3 of the second unit prism 19B form an angle in a range of 80 to 100 degrees with each other, the emitted light tends to contain more light whose angle of incidence with respect to the reflective polarizing sheet 20 is larger than in a case where the angle is out of the range. Light falling on the reflective polarizing sheet 20 tends to become higher in reflectance by the multilayer film as the angle of incidence becomes larger. Accordingly, since more light is reused by being reflected by the multilayer film of the reflective polarizing sheet 20, improvement in efficiency in the use of light is brought about, whereby further improvement in luminance is brought about.

Further, the first prism sheet 18 may be configured such that the first unit prism 18B has a refractive index in a range of 1.49 to 1.52. Light having fallen on the first prism sheet 18 is refracted by the first LED opposing oblique side 18B3, which is an oblique side of the first unit prism 18B located on the side opposite to the LED 13; however, the angle of refraction at this point in time has wavelength dependency, so that light of a short wavelength tends to be larger in angle of refraction than light of a long wavelength and the difference tends to become greater as the refractive index of the first unit prism 18B becomes larger. If the first unit prism 18B has a refractive index of smaller than 1.49, the ratio of light of a short wavelength that is contained in light emitted from the first prism sheet 18 becomes so excessive that the light may have a tinge of blue. Meanwhile, if the first unit prism 18B has a refractive index of larger than 1.52, the ratio of light of a long wavelength that is contained in light emitted from the first prism sheet 18 becomes so excessive that the light may have a tinge of yellow. In that regard, since the first unit prism 18B has a refractive index in a range of 1.49 to 1.52, light of a short wavelength and light of a long wavelength are contained at an appropriate ratio in light emitted from the first prism sheet 18, so that the light hardly has a tinge of any particular color. This reduces the appearance of unevenness in color.

Further, the light-guiding plate 15 may include a light exit reflector 23 provided on an opposite plate surface 15C that is a plate surface opposite to the light exit plate surface 15B or on the light exit plate surface 15B, and the light exit reflector 23 includes a plurality of unit reflectors 23A arranged at intervals along the first direction. In this way, light propagating through the inside of the light-guiding plate 15 is reflected on the way by the unit reflectors 23, which extend along the second direction, whereby emission of light from the light exit plate surface 15B is promoted.

Further, the opposite plate surface 15C and the light exit plate surface 15B of the light-guiding plate 15 may include a plate surface on which the light exit reflector 23 is placed, the plate surface may be provided with an inclined surface 24, placed adjacent to the unit reflectors 23A in the first direction, that has a gradient whose distance from a plate surface on which the light exit reflector 23 is not placed becomes gradually greater away from the LED 13, each of the unit reflectors 23A of the light exit reflector 23 may have a first reflection surface 23A1 placed toward the LED 13 in the first direction and inclined with respect to the first direction and a second reflection surface 23A2 disposed on a side opposite to the first reflection surface 23A1 and inclined with respect to the first direction, and the light-guiding plate 15 may be configured such that an angle of inclination of the second reflection surface 23A2 with respect to the first direction is larger than an angle of inclination of the first reflection surface 23A1 with respect to the first direction and the angle of inclination of the first reflection surface 23A1 with respect to the first direction is larger than an angle of inclination of the inclined surface 24 with respect to the first direction. In this way, light traveling through the inside of the light-guiding plate 15 away from the LED 13 is reflected by the inclined surface 24, which has a gradient whose distance from a plate surface on which the light exit reflector 23 is not placed becomes gradually greater away from the LED 13, and thereby guided away from the LED 13 in the first direction. This makes it hard for light emitted from the light exit plate surface 15B to be deflected toward the LED 13 in the first direction. The inclined surface 24 can guide reflected light farther away from the LED 13, as the inclined surface 24 is smaller in angle of inclination with respect to the first direction than any of the reflection surfaces of the unit reflector 23A.

A portion of light propagating through the inside of the light-guiding plate 15 that travels away from the LED 13 in the first direction is reflected by the first reflection surface 23A1 of the unit reflector 23A, whereby emission of the light is promoted. On the other hand, a portion of light propagating through the inside of the light-guiding plate 15 that travels toward the LED 13 in the first direction is reflected by the second reflection surface 23A2 of the unit reflector 23A, whereby emission of the light is promoted, although the light is less than the light that travels away from the LED 13 in the first direction. The first reflection surface 23A1, which is smaller in angle of inclination with respect to the first direction than the second reflection surface 23A2, exerts a weaker raising effect on reflected light than the second reflection surface 23A2. Accordingly, even when more light travels away from the LED 13 in the first direction than in the opposite direction, excessive emission of those rays of light is avoided. On the other hand, the second reflection surface 23A2, which is larger in angle of inclination with respect to the first direction than the first reflection surface 23A1, exerts a stronger raising effect on reflected light that the first reflection surface 23A1. Accordingly, even when more light travels toward the LED 13 in the first direction than in the opposite direction, those rays of light can be exhaustively emitted, whereby improvement in efficiency in the use of light is brought about.

Further, the light-guiding plate 15 may include first and second light-guiding plate lens units (light-guiding plate lens unit) 21 and 22 provided both on an opposite plate surface 15C that is a plate surface opposite to the light exit plate surface 15B and on the light exit plate surface 15B, respectively, and the first and second light-guiding plate lens units 21 and 22 may include pluralities of first and second light-guiding plate unit lenses (light-guiding plate unit lenses) 21A and 22A, respectively, extending along the first direction and arranged along the second direction. In this way, light propagating through the inside of the light-guiding plate 15 travels along the first direction while being repeatedly reflected by the pluralities of first and second light-guiding plate unit lenses 21A and 22A constituting the first and second light-guiding plate lens units 21 and 22, respectively, extending along the first direction, and arranged along the second direction, whereby the spread of the light in the second direction is restricted. This makes it hard for unevenness in brightness to appear near or around the LED 13 in the second direction. Incidentally, a side end face of the outer peripheral end faces of the light-guiding plate 15 that is adjacent to the light entrance end face 15A may have a rough surface for production reasons, and in that case, when light propagating through the inside of the light-guiding plate 15 strikes the side end face, the light may reenter after having been emitted without being reflected or be diffusedly reflected by the side end face. Such light is easily emitted from the light exit plate surface 15B and may cause a locally bright section to appear near the side end face. In particular, since at least either the opposite plate surface 15C or the light exit plate surface 15B of the light-guiding plate 15 is provided with the first and second light-guiding plate lens units 21 and 22 including the pluralities of first and second light-guiding plate unit lenses 21A and 22A, respectively, the bright spot may appear only in particular first and second light-guiding plate unit lenses 21A and 22A and be visually recognized as an emission line. In that regard, since the first prism sheet 18 and the second prism sheet 19 are placed on the light exit side of the light-guiding plate 15 and, furthermore, provided with the first and second unit prisms 18B and 19B extending along the second direction, respectively, light emitted from near the side end face of the light-guiding plate 15 can be diffused in the second direction by the first unit prisms 18B and the second unit prisms 19B. This makes it hard for an emission line to be visually recognized as extending along the first direction.

Further, a liquid crystal display device (display device) 10 according to the present embodiment includes: the backlight device 12 described above; and a liquid crystal panel (display panel) 11 that performs a display through the use of light from the backlight device 12. The liquid crystal display device 10 thus configured has improved viewing angle characteristics of light emitted from the backlight device 12 and therefore can achieve a display that is superior in display quality.

Embodiment 2

Embodiment 2 of the present disclosure is described with reference to FIGS. 29 to 34. Embodiment 2 illustrates changes made to configure a light-guiding plate 115 and a first prism sheet 118. It should be noted that a repeated description of structures, workings, effects which are the same as those of Embodiment 1 described above is omitted.

Figure 29:
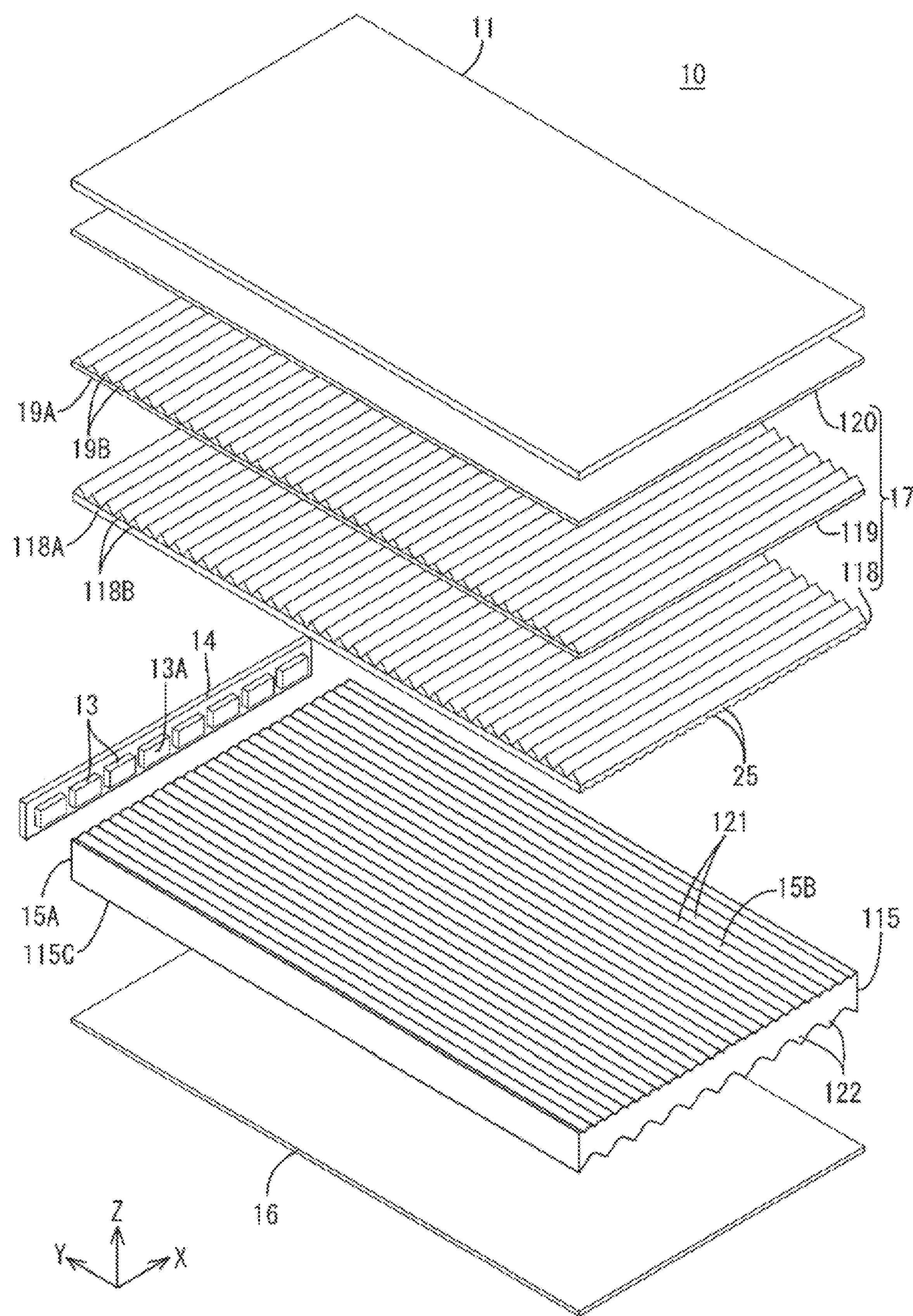
FIG. 29 is an exploded perspective view of a liquid crystal display device according to Embodiment 2 of the present disclosure.
Figure 31:
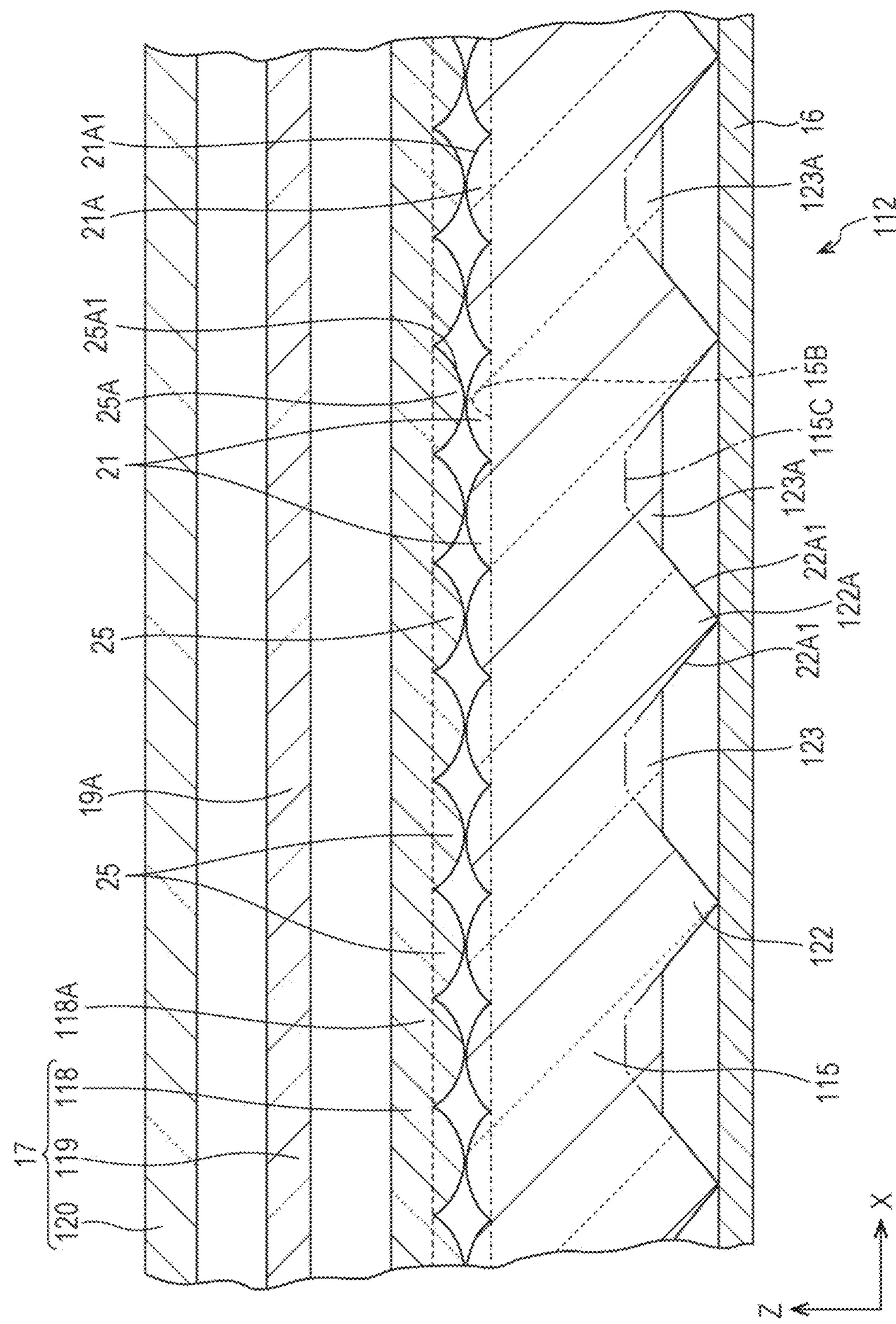
FIG. 31 is a cross-sectional view of the backlight device as taken along an X-axis direction.

As shown in FIGS. 29 and 31, the first prism sheet 118 according to the present embodiment is configured such that a lens unit 25 is provided on a plate surface of a first base member 118A opposite to a first unit prim 118B (light exit side). The lens unit 25 includes a plurality of unit lenses 25A extending along the Y-axis direction and arranged along the X-axis direction on a light entrance side plate surface of the first base member 118A. In the present embodiment, the lens unit 25 is a so-called lenticular lens, and each of the unit lenses 25A is a convex cylindrical lens that projects from the plate surface of the first base member 118A backward. A cross-sectional shape of each of the unit lenses 25A as taken along the X-axis direction is a semicircular shape and a semicylindrical shape that extends linearly along the Y-axis direction, and each of the unit lenses 25A has its surface serving as an arc surface 25A1. Assuming that an angle that a tangent to a base end of the arc surface 25A1 forms with respect to the X-axis direction is an "angle of contact", the angle of contact of the unit lens 25A is for example approximately 50 degrees. The plurality of unit lenses 25A arranged along the X-axis direction are substantially equal in all of the angles of contact and the width dimensions (intervals of arrangement) and height dimensions of the bases. Further, for reduction of moiré, it is preferable that the intervals of arrangement of the unit lenses 25A be set to be different from the intervals of arrangement of first light-guiding plate unit lenses 121A on a light-guiding plate 115. The unit lenses 25A are constituted by a substantially transparent ultraviolet-curable resin material that is a type of photo-curable resin material, and are integrally provided on the first base member 118A by a manufacturing method similar to the first unit prism 118B.

Figure 30:
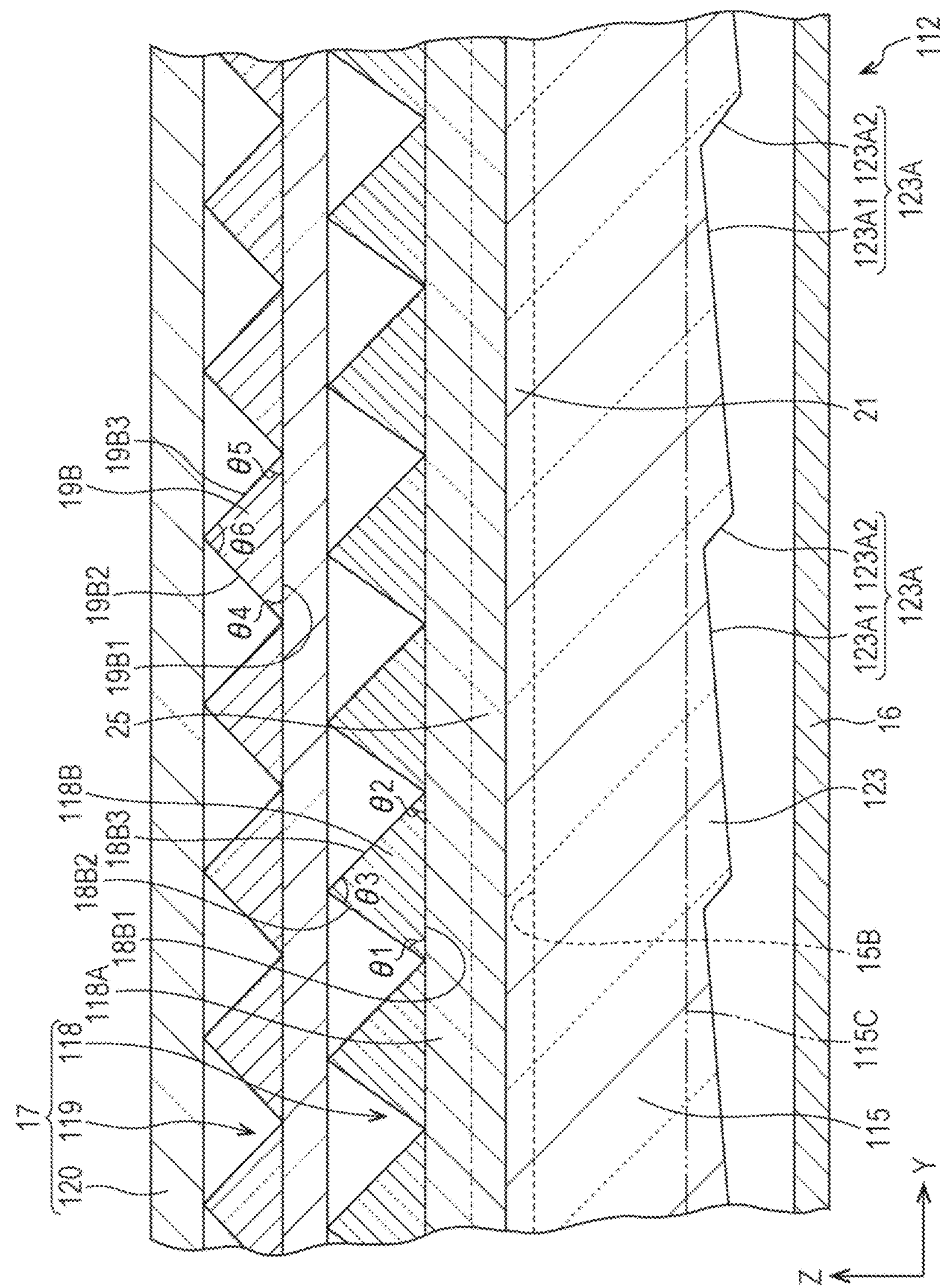
FIG. 30 is a cross-sectional view of a backlight device as taken along a Y-axis direction.

As shown in FIG. 30, the light-guiding plate 115 according to the present embodiment differs from Embodiment 1 described above in that an opposite plate surface 115C is not provided with an inclined surface 24 (see FIG. 2). The opposite plate surface 115C of the light-guiding plate 115 is provided with a plurality of unit reflectors 123A, continuously arranged along the Y-axis direction, that constitute a light exit reflector 123. The unit reflectors 123A each have a first reflection surface 123A1 whose angle of inclination with respect to the Y-axis direction is for example approximately 6 degrees and a second reflection surface 123A2 whose angle of inclination with respect to the Y-axis direction is for example approximately 40 degrees.

Figure 32:
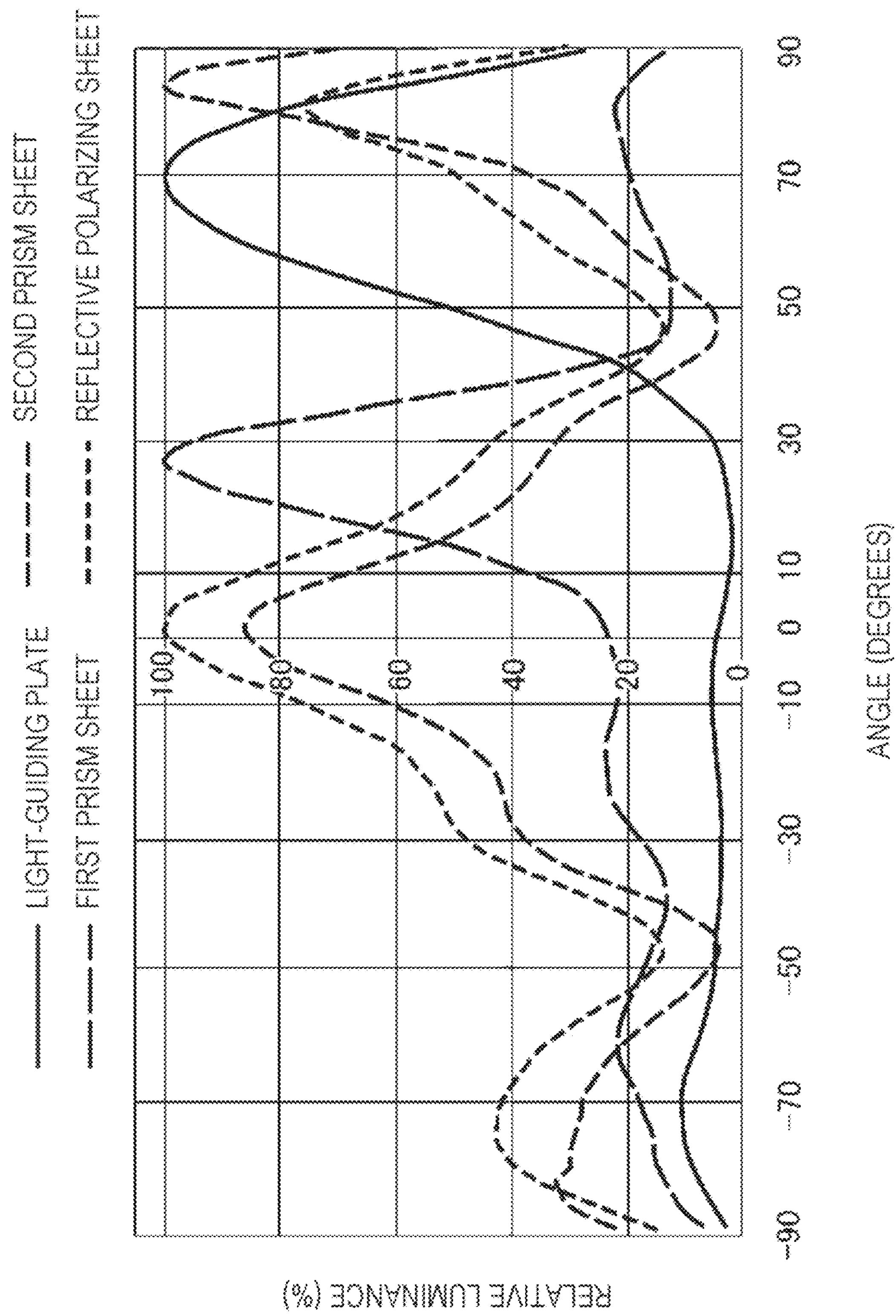
FIG. 32 is a graph showing luminance angle distributions in the Y-axis direction of light emitted from a light-guiding plate, a first prism sheet, a second prism sheet, and a reflective polarizing sheet in Demonstration Experiment 2.

Next, Demonstration Experiment 2 and Comparative Experiments 7 and 8 were conducted as follows in order to examine the superiority of a backlight device 112 according to the present embodiment. In Demonstration Experiment 2, luminance angle distributions of light emitted from a backlight device 112 according to the present embodiment were measured. Specifically, in Demonstration Experiment 2, a luminance angle distribution in the Y-axis direction of light emitted from the light-guiding plate 115, a luminance angle distribution in the Y-axis direction of light emitted from the first prism sheet 118, a luminance angle distribution in the Y-axis direction of light emitted from a second prism sheet 119, and a luminance angle distribution in the Y-axis direction of light emitted from a reflective polarizing sheet 120 were measured, and the results are as shown in FIG. 32. In FIG. 32, the vertical axis represents relative luminance (in "%") based on maximum luminance of each ray of emitted light (as 100%), and the horizontal axis represents angles (in "degrees") in the Y-axis direction with respect to the frontal direction (Z-axis direction). The positive and negative signs assigned to this horizontal axis are the same in meaning as the description of FIGS. 6 to 9 of Demonstration Experiment 1 described above. The legends in FIG. 32 indicate which line on the graph represents which ray of emitted light.

Experimental results of Demonstration Experiment 2 are explained. According to the graph shown in FIG. 32, it can be said that all of the rays of emitted light exhibit luminance angle distributions which are substantially the same as the experimental results (FIGS. 6 to 9) of Demonstration Experiment 1 described above. Accordingly, it can be said that even when the lens unit 25 is provided on the light exit side plate surface of the first base member 118A of the first prism sheet 118, a negative impact on a luminance angle distribution in the Y-axis direction is averted.

Figure 33:
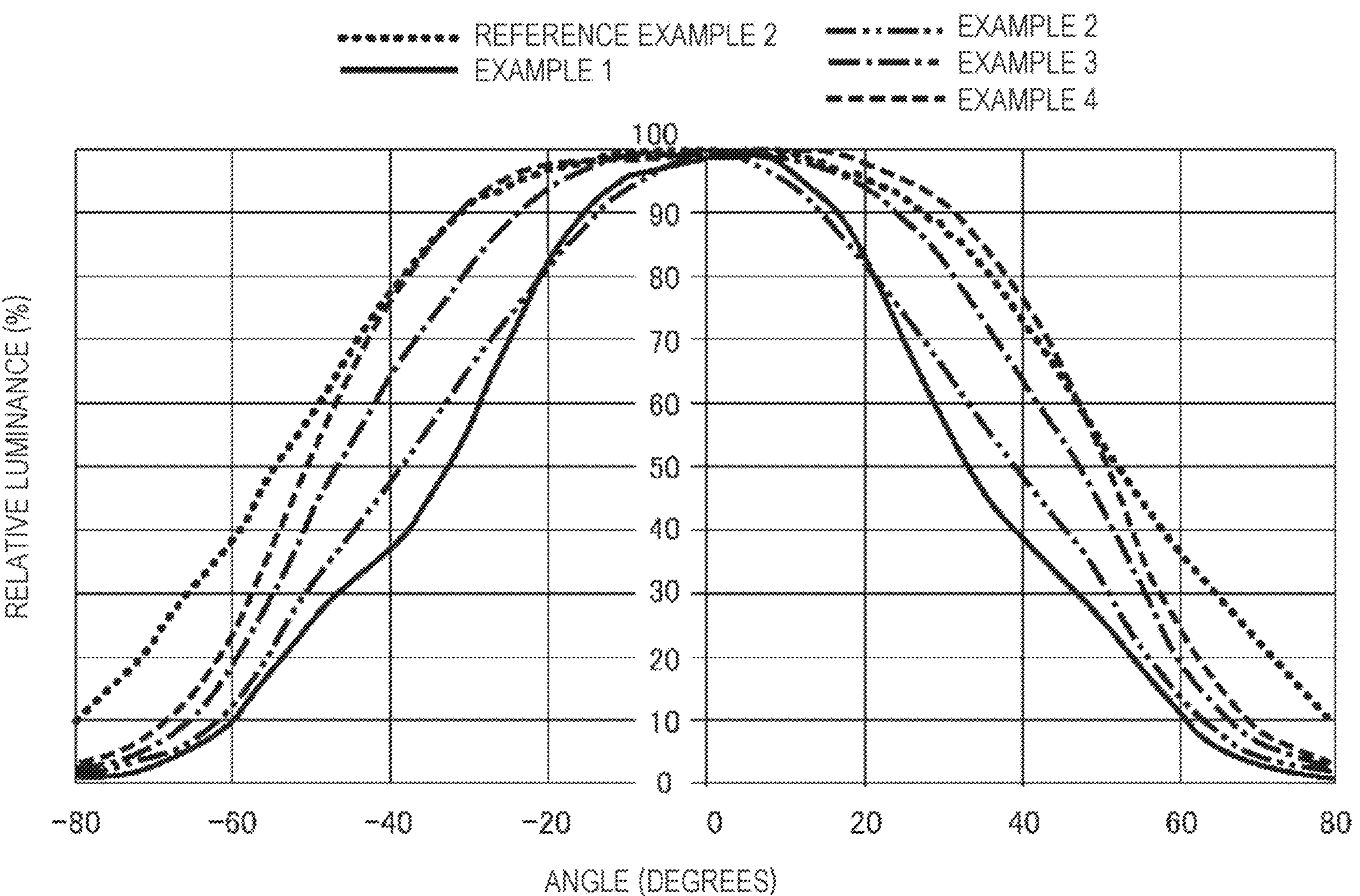
FIG. 33 is a graph showing luminance angle distributions in the X-axis direction of light emitted from reflective polarizing sheets in Comparative Experiment 7.

Comparative Experiment 7 is described. In Comparative Experiment 7, luminance angle distributions in the X-axis direction of light emitted from backlight devices 112 were measured with use of first prism sheets 118 whose lens units 25 are constituted by unit lenses 25A having angles of contact 20, 30, and 50 degrees, respectively. Comparative Experiment 7 includes Example 2, in which the angle of contact of each of the unit lenses 25A is 20 degrees, Example 3, in which the angle of contact of each of the unit lenses 25A is 30 degrees, and Example 4, in which the angle of contact of each of the unit lenses 25A is 50 degrees. Experimental results are as shown in FIG. 33. The experimental results of Comparative Experiment 7 are put down with Reference Example 2, which indicates a reference luminance angle distribution in the X-axis direction. Reference Example 2 is a backlight device of the same configuration as Comparative Example 1 of Comparative Experiment 1. In addition, the experimental results of Comparative Experiment 7 are put down with a luminance angle distribution in the X-axis direction of Example 1 of Comparative Experiment 1 described above. FIG. 33 shows luminance angle distributions in the X-axis direction of light emitted from reflective polarizing sheets 120. In FIG. 33, the vertical axis represents relative luminance (in "%") based on maximum luminance (as 100%), and the horizontal axis represents angles (in "degrees") in the X-axis direction with respect to the frontal direction (Z-axis direction). The positive and negative signs assigned to this horizontal axis are the same in meaning as the description of FIGS. 6 to 9 of Demonstration Experiment 1 described above.

The experimental results of Comparative Experiment 7 are explained. According to FIG. 33, it is found that as the angle of contact of each of the unit lenses 25A becomes larger, the more the directivity of emitted light in the X-axis direction is lessened and the greater the full angle at half maximum tends to become. Specifically, Example 2, in which the angle of contact of each of the unit lenses 25A is 20 degrees, exhibits a luminance angle distribution which is equal to that of Example 1 of Comparative Experiment 1, in which no lens unit 25 is placed. On the other hand, in Example 3, in which the angle of contact of each of the unit lenses 25A is 30 degrees, the directivity of emitted light in the X-axis direction is lessened to an intermediate level between Example 1 and Reference Example 2. Moreover, Example 4, in which the angle of contact of each of the unit lenses 25A is 50 degrees, gives a luminance angle distribution which is equal to that of Reference Example 2. Thus, it can be said that causing each of the unit lenses 25A to have an angle of contact of 50 degrees gives superior viewing angle characteristics in the X-axis direction.

Comparative Experiment 8 is described. Comparative Experiment 8 was conducted to gain findings as to how the presence or absence of a lens unit 25, a first light-guiding plate lens unit 121, and a second light-guiding plate lens unit 122 and a change in configuration of the second light-guiding plate lens unit 122 affect luminance unevenness that may develop in emitted light. Comparative Experiment 8 includes Comparative Example 2, which is a backlight device including a first prism sheet having no lens unit 25 and a light-guiding plate having no second light-guiding plate lens unit 122, Comparative Example 3, which as a backlight device including a light-guiding plate having no second light-guiding plate lens unit 122, and Reference Example 3, which is a backlight device including a first prism sheet having no lens unit 25. Furthermore, Comparative Experiment 8 includes Example 5, in which the vertex angle of a second light-guiding plate unit lens 122A of the second light-guiding plate lens unit 122 is 140 degrees, Example 6, in which the vertex angle of a second light-guiding plate unit lens 122A is 120 degrees, and Example 7, in which the vertex angle of a second light-guiding plate unit lens 122A is 100 degrees. In each of Comparative Examples 2 and 3, Reference Example 3, and Examples 5 to 7, the angle of contact of a first light-guiding plate unit lens 121A of the first light-guiding plate lens unit 121 is 50 degrees. Comparative Examples 2 and 3, Reference Example 3, and Examples 5 to 7 are the same in configuration as the backlight device 112 described in the present embodiment, except for the points described above. Moreover, in Comparative Experiment 8, Comparative Examples 2 and 3, Reference Example 3, and Examples 5 to 7 were taken photos of from the front in a glowing state, and on the basis of the photos, the presence or absence of luminance unevenness was determined and Cm (Michelson contrast) values were measured. Experimental results are as shown in FIG. 34. FIG. 34 shows the angles of contact of the unit lenses 25A, the angles of contact of the first light-guiding plate unit lenses 121A, the vertex angles of the second light-guiding plate unit lenses 122A, photos, Cm values, and determination results in Comparative Examples 2 and 3, Reference Example 3, and Examples 5 to 7. Determinations of the presence or absence of luminance unevenness were made by an inspector visually checking the images taken. Determination results include "GOOD", which represents a case where no luminance unevenness was visually recognized, "FAIR", which represents a case where substantially no luminance unevenness was visually recognized, "INSUFFICIENT", which represents a case where slight luminance unevenness was visually recognized to cause insufficiency, and "BAD", which represents a case where luminance unevenness was visually recognized. A Cm value is obtained by dividing a value obtained by subtracting the minimum luminance of emitted light from the maximum luminance of the emitted light by a value obtained by adding together the maximum luminance and the minimum luminance. With a large Cm value, luminance unevenness tends to be easily visually recognized, as the difference between the maximum luminance and the minimum luminance is great and the sum of the maximum luminance and the minimum luminance is small. Conversely, with a small Cm value, luminance unevenness tends to be hardly visually recognized, as the difference between the maximum luminance and the minimum luminance is small and the sum of the maximum luminance and the minimum luminance is large.

The experimental results of Comparative Experiment 8 are explained. According to FIG. 34, Comparative Example 2, in which luminance unevenness appears prominently, yields a determination result of "BAD" and the largest Cm value of 0.222. A possible reason for this is that in Comparative Example 2, in which the light-guiding plate 122 has no second light-guiding plate lens unit 122 and the first prism sheet has no lens unit 25, light is hardly diffused in the X-axis direction. Comparative Example 3 shows a certain improvement in luminance unevenness as compared with Comparative Example 2 but is insufficient in improvement effect, so that the determination result is "INSUFFICIENT"

and the Cm value is as large as 0.117. A possible reason for this is that in Comparative Example 3, in which the first prism sheet has a lens unit 25 but the light-guiding plate has no second light-guiding plate lens unit 122, the diffusion of light in the X-axis direction is insufficient. Reference Example 3 shows a further improvement in luminance unevenness as compared with Comparative Example 3 but is still insufficient in improvement effect, so that the determination result is “INSUFFICIENT” and the Cm value is as large as 0.087. A possible reason for this is that in Reference Example 3, in which the light-guiding plate has a second light-guiding plate lens unit 122 but the first prism sheet has no lens unit 25, the diffusion of light in the X-axis direction is insufficient. On the other hand, Examples 5 to 7, in which luminance unevenness hardly visually recognized, yield determination results of “GOOD” or “FAIR” and small Cm values of 0.053 to 0.061. A possible reason for this is that in Examples 5 to 7, in each of which the light-guiding plate 115 has a second light-guiding plate lens unit 122 and the first prism sheet 118 has a lens unit 25, light is sufficiently diffused in the X-axis direction. Comparing Examples 5 to 7 shows that Examples 5 and 7, in which the vertex angles of the second light-guiding plate lens units 122A are 140 and 100 degrees, are more highly effective than Example 6 in improving luminance unevenness.

According to the present embodiment, as described above, the first prism sheet 118 may include a first base member 118A formed in a sheet shape and provided with a plurality of the first unit prisms 118B on a light exit side plate surface and a lens unit 25 provided on a plate surface opposite to the light exit side of the first base member 118A, and the lens unit 25 may include a plurality of unit lenses 25A extending along the first direction and arranged along the second direction. In this way, light emitted from the light-guiding plate 115 falls on the lens unit 25 provided on the plate surface opposite to the light exit side of the first base member 118A of the first prism sheet 118. Since the lens unit 25 includes the plurality of unit lenses 25A extending along the first direction and arranged along the second direction, the incident light is given a diffusion effect in the second direction by the plurality of unit lenses 25A. This brings about improvement in viewing angle characteristics in the second direction. Further, a situation can be avoided in which if the second prism sheet 119 is provided with a lens unit 25, the lens unit 25 may reduce the light-raising effect of the first unit prisms 118B.

Embodiment 3

Figure 41:
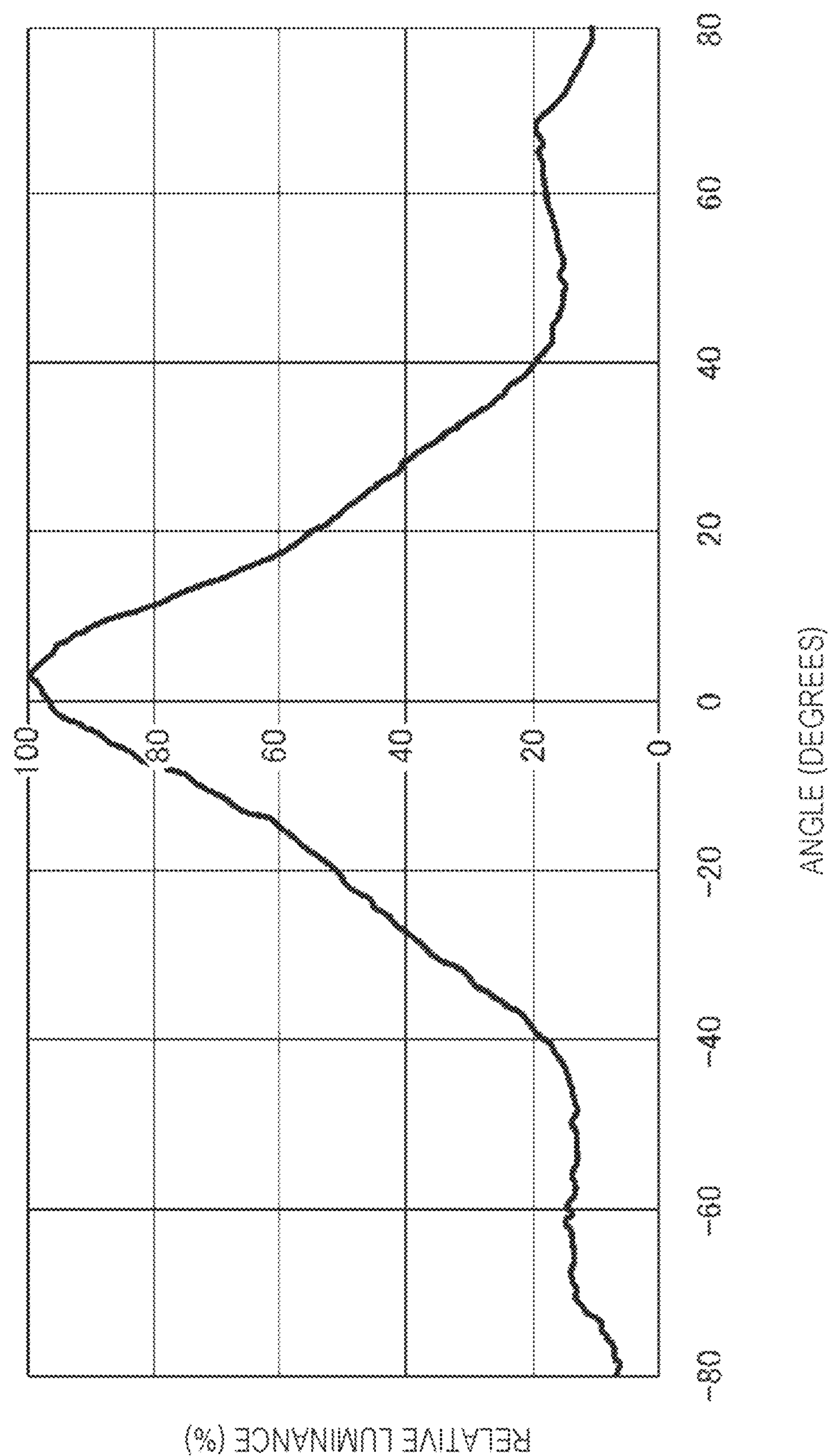
FIG. 41 is a graph showing a luminance angle distribution in the Y-axis direction of light emitted from the reflective polarizing sheet when the angle of tilt of the transmission axis is 0 degree in Comparative Experiment 9.

Embodiment 3 of the present disclosure is described with reference to FIGS. 35 and 41. Embodiment 3 illustrates changes made from Embodiment 1 described above to configure a second prism sheet 219. It should be noted that a repeated description of structures, workings, effects which are the same as those of Embodiment 1 described above is omitted.

Figure 35:
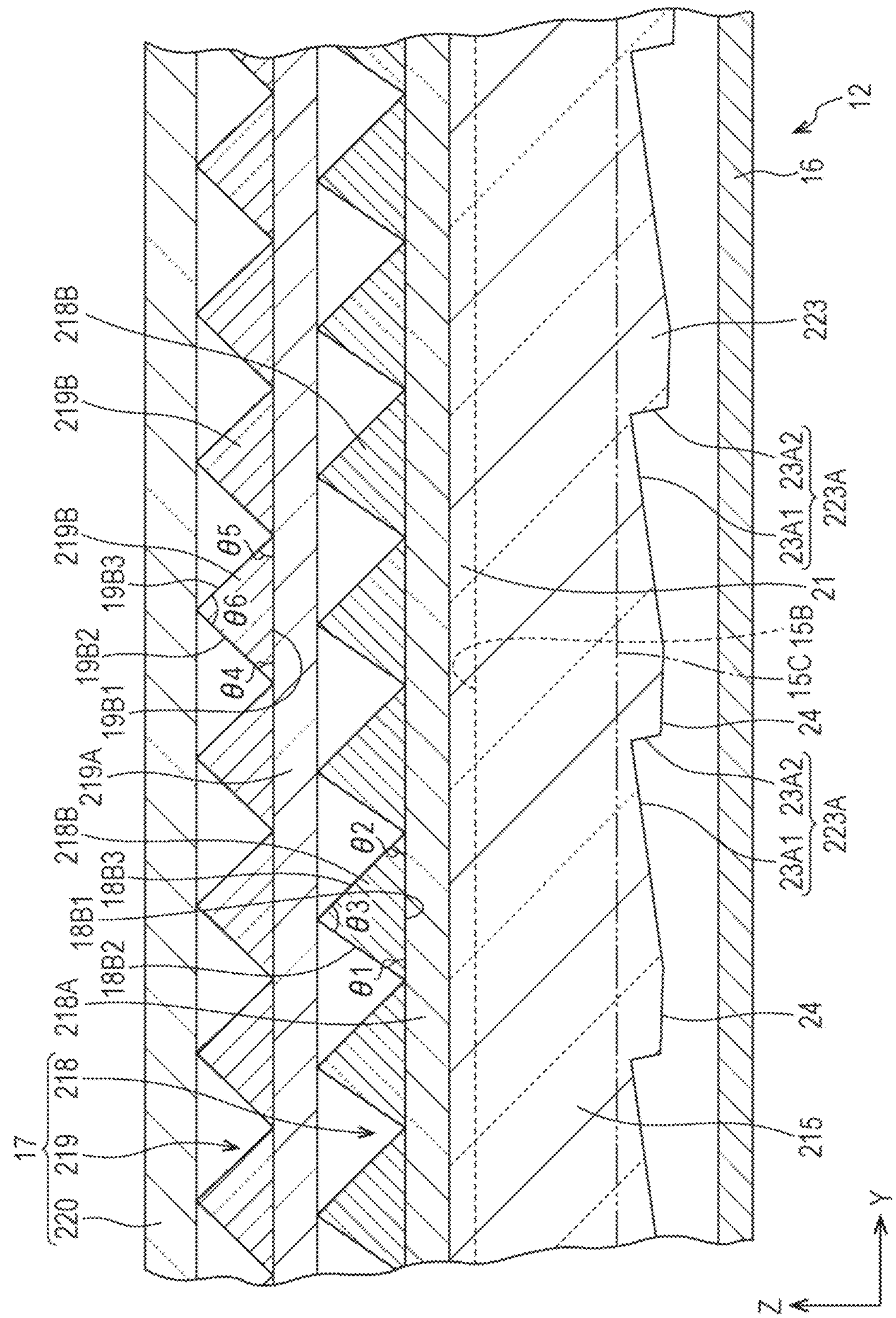
FIG. 35 is a cross-sectional view of a backlight device according to Embodiment 3 of the present disclosure as taken along a Y-axis direction.

As shown in FIG. 35, the second prism sheet 219 according to the present embodiment includes a second base member 219A made of a material having a non-birefringent property. Note here that birefringence occurs due to a difference in refractive index in a case where a material has two or more refractive indices under the influence of a crystal structure, polymer orientation, and the like. The phrase “having a non-birefringent property” herein means “having substantially no birefringent property” and, more specifically, is defined as having substantially no birefringent property in a case where an in-place phase difference (retardation value) expressed by the product of a difference in refractive index and a film thickness is 10 nm or smaller. The second base member 219A according to the present embodiment is manufactured by forming PC (polycarbonate), which is an amorphous transparent resin material having a non-birefringent property, into a sheet shape by melt extrusion. Since the amorphous resin material is composed of an amorphous section, the amorphous resin material hardly suffers from a refractive index difference due to the crystal structure and can keep the retardation value low. Accordingly, the second base member 219A has a non-birefringent property whose retardation value is defined as 10 nm or smaller, and light passing through the second prism sheet 219 is inhibited with high certainty from being doubly refracted by the second base member 219A. Since the second base member 219A has a non-birefringent property, light having fallen on the liquid crystal panel from the second prism sheet 219 can be prevented from causing colored interference fringes called “rainbow spots” to appear on the display surface of the liquid crystal panel. Usable examples of the amorphous transparent resin material of which the second base member 219A is made include acrylic resin such as PMMA (polymethyl methacrylate), TAC (triacetyl cellulose), and the like in addition to PC; however, PC is suitable, as PMMA and TAC have a high water absorption rate and easily suffer from warpage due to swelling in conditions of high ambient temperature and humidity.

Figure 36:
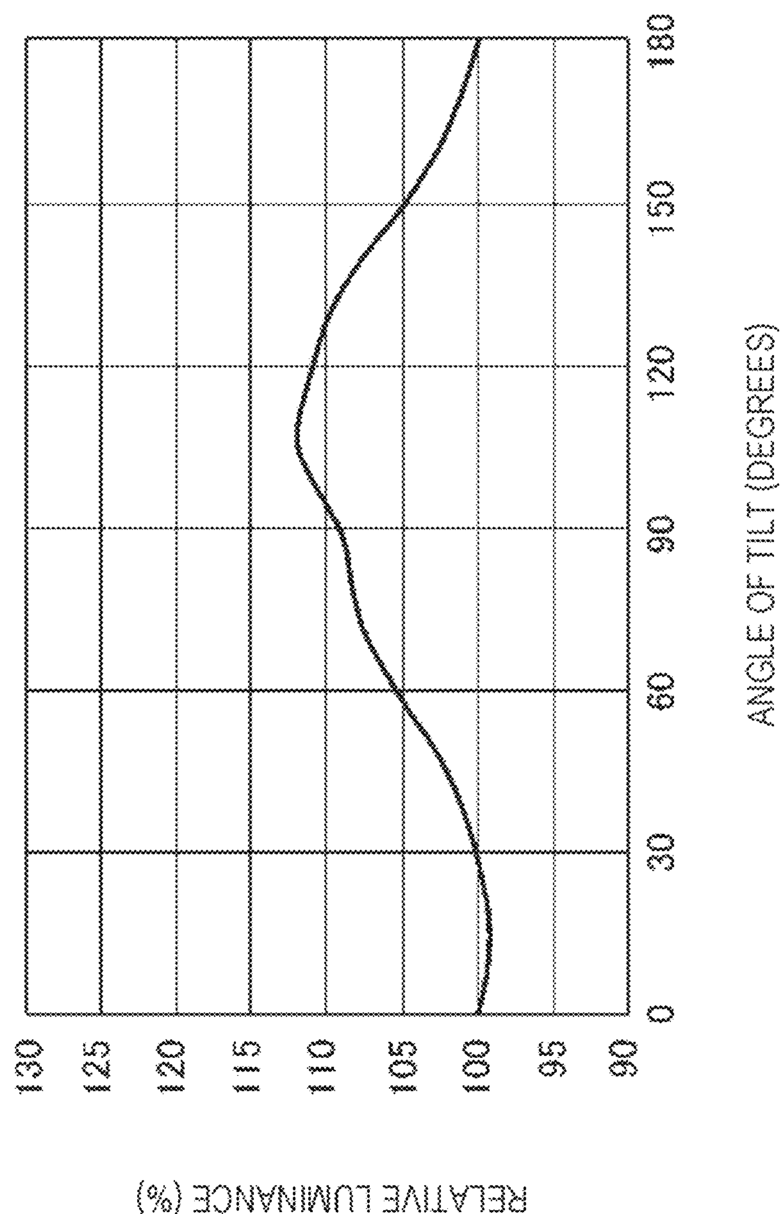
FIG. 36 is a graph showing a relationship between the angle of tilt of a transmission axis of a reflective polarizing sheet and the relative luminance of emitted light in Reference Example 4 of Comparative Experiment 9.
Figure 37:
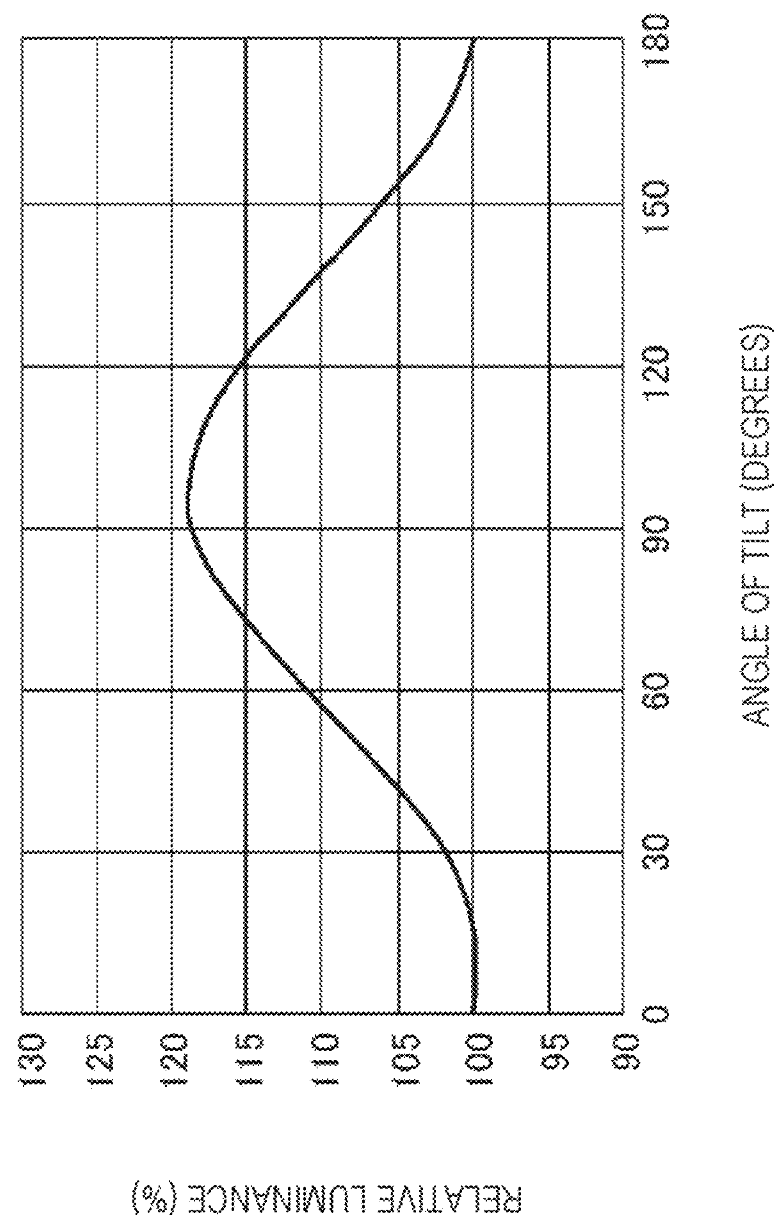
FIG. 37 is a graph showing a relationship between the angle of tilt of a transmission axis of a reflective polarizing sheet and the relative luminance of emitted light in Example 8 of Comparative Experiment 9.
Figure 38:
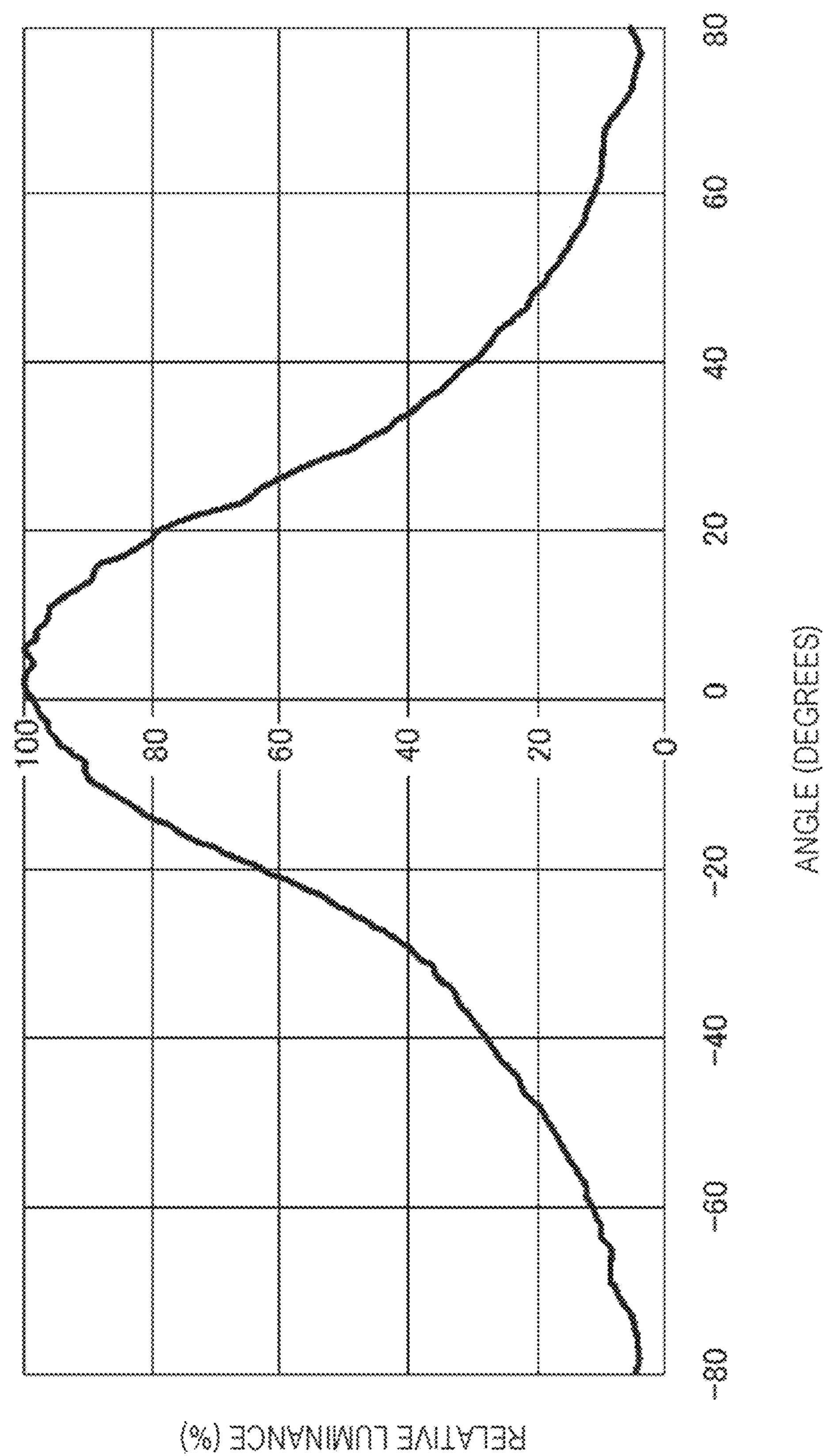
FIG. 38 is a graph showing a luminance angle distribution in an X-axis direction of light emitted from a reflective polarizing sheet when the angle of tilt of the transmission axis is 90 degrees in Comparative Experiment 9.
Figure 39:
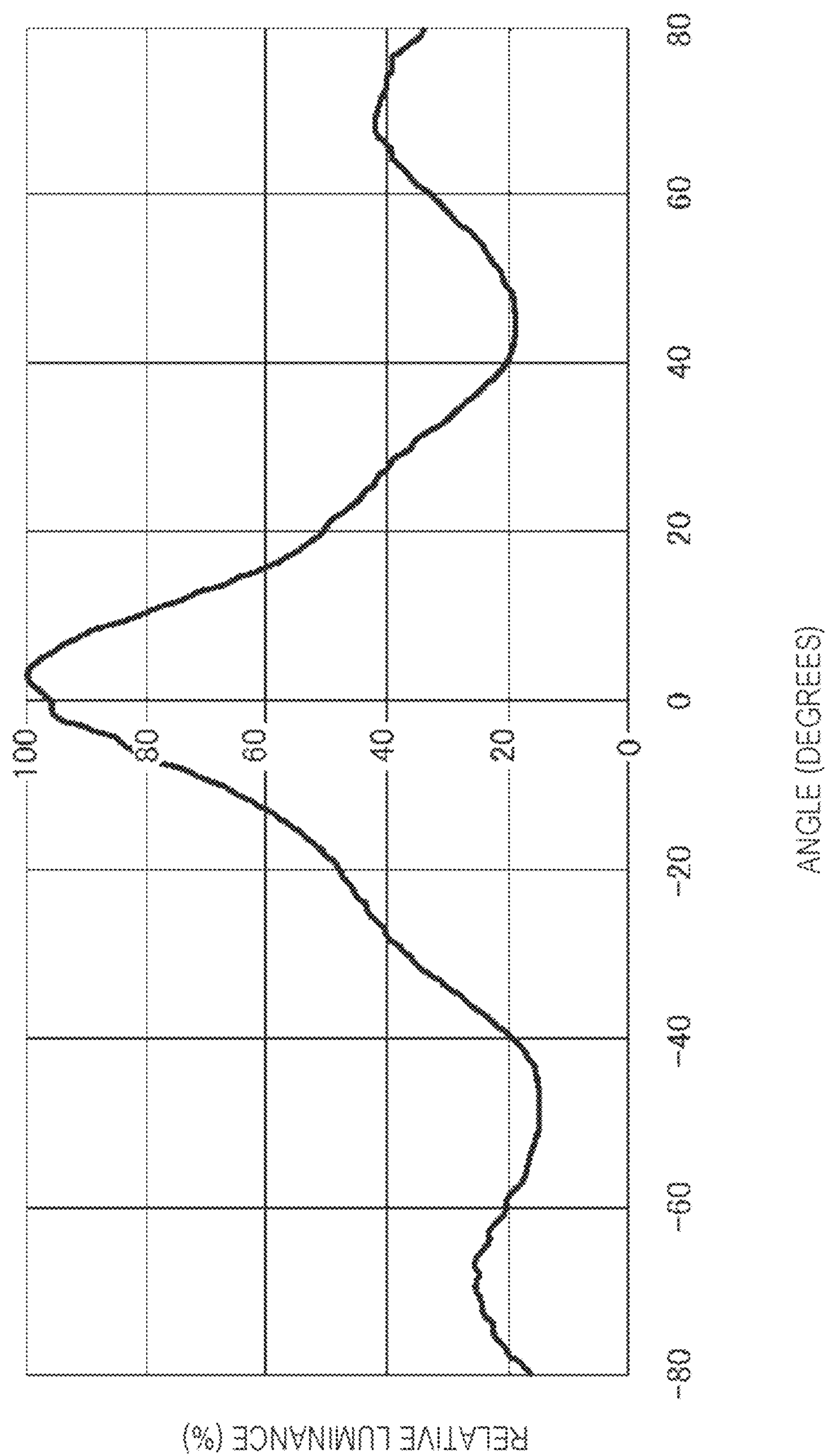
FIG. 39 is a graph showing a luminance angle distribution in the Y-axis direction of light emitted from the reflective polarizing sheet when the angle of tilt of the transmission axis is 90 degrees in Comparative Experiment 9.
Figure 40:
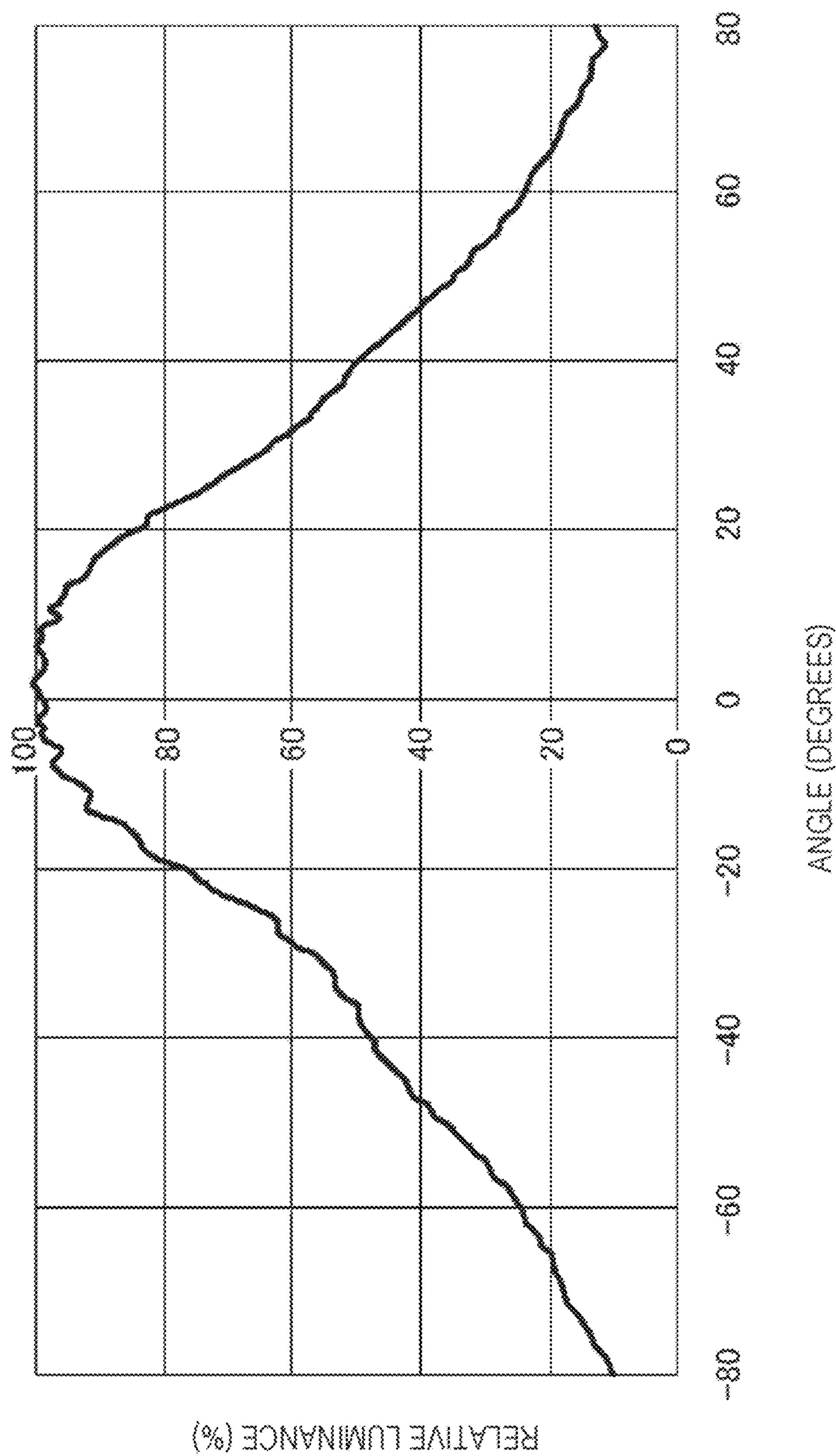
FIG. 40 is a graph showing a luminance angle distribution in the X-axis direction of light emitted from the reflective polarizing sheet when the angle of tilt of the transmission axis is 0 degree in Comparative Experiment 9.

Next, Comparative Experiment 9 was conducted as follows in order to examine the superiority of a backlight device 212 according to the present embodiment. In Comparative Experiment 9, a second prism sheet 219 whose second base member 219A is made of PC was used, and the luminance of emitted light was measured while a reflective polarizing sheet 220 was being rotated with respect to the second prism sheet 219. Specifically, Comparative Experiment 9 includes Example 8, which is a backlight device 212, configured in the same way as Example 1 of Comparative Experiment 1 described above except for including a second prism sheet 219 whose second base member 219A is made of PC, that includes a first prism sheet 218 whose first base member 218A is made of PET. For reference, Comparative Experiment 9 includes Reference Example 4, which is a backlight device of the same configuration as Example 1 of Comparative Experiment 1 described above. Experimental results of Reference Example 4 are as shown in FIG. 36, and experimental results of Example 8 are as shown in FIG. 37. In each of FIGS. 36 and 37, the horizontal axis represents an angle of tilt (in “degrees”) that a transmission axis of the reflective polarizing sheet 220 forms with respect to the X-axis direction (i.e. the direction of extension of second unit prisms 219B), and the vertical axis represents relative luminance (in “%”) based on luminance (as 100%) at the time that the angle of tilt of the transmission axis is 0 degree (180 degrees). Further, FIGS. 38 and 39 show luminance angle distributions in the X-axis and Y-axis directions, respectively, at the time that the angle of tilt of the transmission axis is 90 degrees in Example 8, and FIGS. 40 and 41 show luminance angle distributions in the X-axis and Y-axis directions, respectively, at the time that the angle of tilt of the transmission axis is 0 degree. In each of FIGS. 38 and 40, the vertical axis represents relative luminance (in “%”) based on maximum luminance of each ray of emitted light (as 100%), and the horizontal axis represents angles (in “degrees”) in the X-axis direction with respect to the frontal direction (Z-axis direction). In each of FIGS. 39 and 41, the vertical axis represents relative luminance (in “%”) based on maximum luminance of each ray of emitted light (as 100%), and the horizontal axis represents angles (in "degrees") in the Y-axis direction with respect to the frontal direction (Z-axis direction).

The experimental results of Comparative Experiment 9 are explained. According to FIGS. 36 and 37, each of Reference Example 4 and Example 8 reaches its minimum luminance when the angle of tilt of the transmission axis is around 0 degree (180 degrees) and reaches its maximum luminance when the angle of tilt of the transmission axis is around 90 degrees. Note here that Reference Example 4 and Example 8 have it in common that they are configured such that a direction of extension of unit reflectors 223A that constitute a light exit reflector 223 of a light-guiding plate 215 and a direction of extension of the respective unit prisms 218B and 219B of the prism sheets 218 and 219 correspond to each other, and this common configuration makes it hard for a degree of polarization of light to be disturbed. Since this direction of polarization of light substantially corresponds to the Y-axis direction, the transmission axis of the reflective polarizing sheet 220 corresponds to the direction of polarization of light when the angle of tilt of the transmission axis with respect to the X-axis direction is 90 degrees. This makes it conceivable that when the angle of tilt of the transmission axis is around 90 degrees, the transmittance of (efficiency in the use of) light through the reflective polarizing sheet 220 is maximized, so that the luminance of emitted light reaches its maximum. According to FIG. 36, in Reference Example 4, the maximum luminance is less than 115%. A possible reason for this is that since the second base member of the second prism sheet is made of PET, which has a birefringent property, a refractive index difference easily occurs due to the crystal structure, whereby the degree of polarization of light is easily disturbed and the transmittance of light becomes low. On the other hand, according to FIG. 37, in Example 8, the maximum luminance exceeds 115% and the luminance difference from the case where the angle of tilt of the transmission axis is 0 degree is greater than in Reference Example 4. A possible reason for this is that since the second base member 219A of the second prism sheet 219 is made of PC, which has a non-birefringent property, a refractive index difference hardly occurs due to the crystal structure, whereby the degree of polarization of light is hardly disturbed and the transmittance of light is kept high.

Next, luminance angle distributions of emitted light in Example 8 are described with reference to FIGS. 38 to 41. It can be said that a comparison between FIGS. 38 and 39, which show experimental results yielded in a case where the angle of tilt of the transmission axis of the reflective polarizing sheet 220 was 90 degrees, and FIGS. 40 and 41, which show experimental results yielded in a case where the angle of tilt of the transmission axis of the reflective polarizing sheet 220 was 0 degree, shows that the latter is superior in viewing angle characteristics to the former. Specifically, according to FIG. 38, the full angle at half maximum in the luminance angle distribution in the X-axis direction is 54 degrees in a case where the angle of tilt of the transmission axis is 90 degrees, and according to FIG. 39, the full angle at half maximum in the luminance angle distribution in the Y-axis direction is 40 degrees in a case where the angle of tilt of the transmission axis is 90 degrees. According to FIG. 40, the full angle at half maximum in the luminance angle distribution in the X-axis direction is 76 degrees in a case where the angle of tilt of the transmission axis is 0 degree, and according to FIG. 41, the full angle at half maximum in the luminance angle distribution in the X-axis direction is 44 degrees in a case where the angle of tilt of the transmission axis is 0 degree. In a case where the angle of tilt of the transmission axis is 90 degrees, the transmission axis and the direction of polarization of light correspond to each other, and a reflection axis of the reflective polarizing sheet 220 and the direction of polarization of light are orthogonal to each other. For this reason, the amount of light that is reflected by the reflective polarizing sheet 220 and returned backward is small, and the amount of light that is reused by the prism sheets 218 and 219 and the like becomes smaller. This makes it hard to diversify the direction of travel of emitted light and presumably results in a slightly narrower viewing angle. Meanwhile, in a case where the angle of tilt of the transmission axis is 0 degree, the transmission axis and the direction of polarization of light are orthogonal to each other, and the reflection axis of the reflective polarizing sheet 220 and the direction of polarization of light correspond to each other. For this reason, the amount of light that is reflected by the reflective polarizing sheet 220 is large, and the amount of light that is reused by the prism sheets 218 and 219 and the like becomes larger. This diversifies the direction of travel of emitted light and presumably results in a wider viewing angle. Above all, since the X-axis direction is orthogonal to a light-gathering direction of the prism sheets 218 and 219, light reflected by the reflective polarizing sheet 220 is easily emitted while diffusely traveling without being affected by a light-gathering effect of the prism sheets 218 and 219. As a result, the full angle at half maximum in the luminance angle distribution in the X-axis direction in a case where the angle of tilt of the transmission axis is 0 degree is very wide, i.e. 76 degrees.

According to the present embodiment, as described above, the second prism sheet 219 may include a second base member 219A, formed in a sheet shape and provided with a plurality of the second unit prisms 219B on a light exit side plate face, that has a non-birefringent property. Since the first unit prisms 218B of the first prism sheet 218 and the second unit prisms 219B of the second prism sheet 219 both extend along the second direction, the degree of polarization of transmitted light is more easily maintained than if the direction of extension of the first unit prisms 218B and the direction of extension of the second unit prisms 219B are orthogonal to each other. Moreover, since the second base member 219A of the second prism sheet 219 has a non-birefringent property (i.e. has no birefringent property), the degree of polarization of transmitted light by the second base member 219A is hardly disturbed. This is suitable to achieving improvement in efficiency in the use of light and makes it possible to reduce the appearance of colored interference fringes called "rainbow spots".

Embodiment 4

Embodiment 4 of the present disclosure is described with reference to FIG. 42 or 43. Embodiment 4 illustrates changes made from Embodiment 3 described above to configure a first prism sheet 318. It should be noted that a repeated description of structures, workings, effects which are the same as those of Embodiment 3 described above is omitted.

Figure 42:
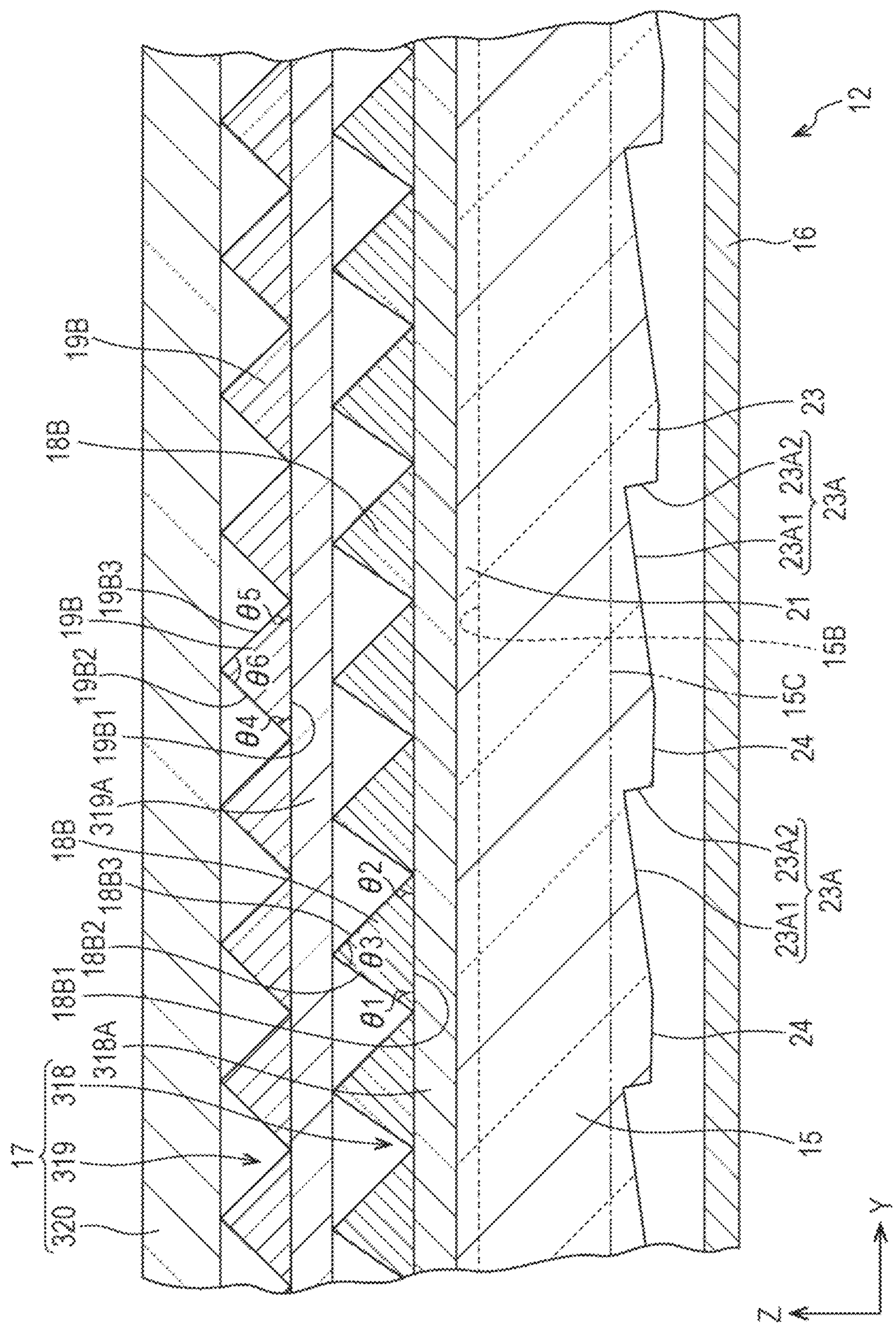
FIG. 42 is a cross-sectional view of a backlight device according to Embodiment 4 of the present disclosure as taken along a Y-axis direction.
Figure 43:
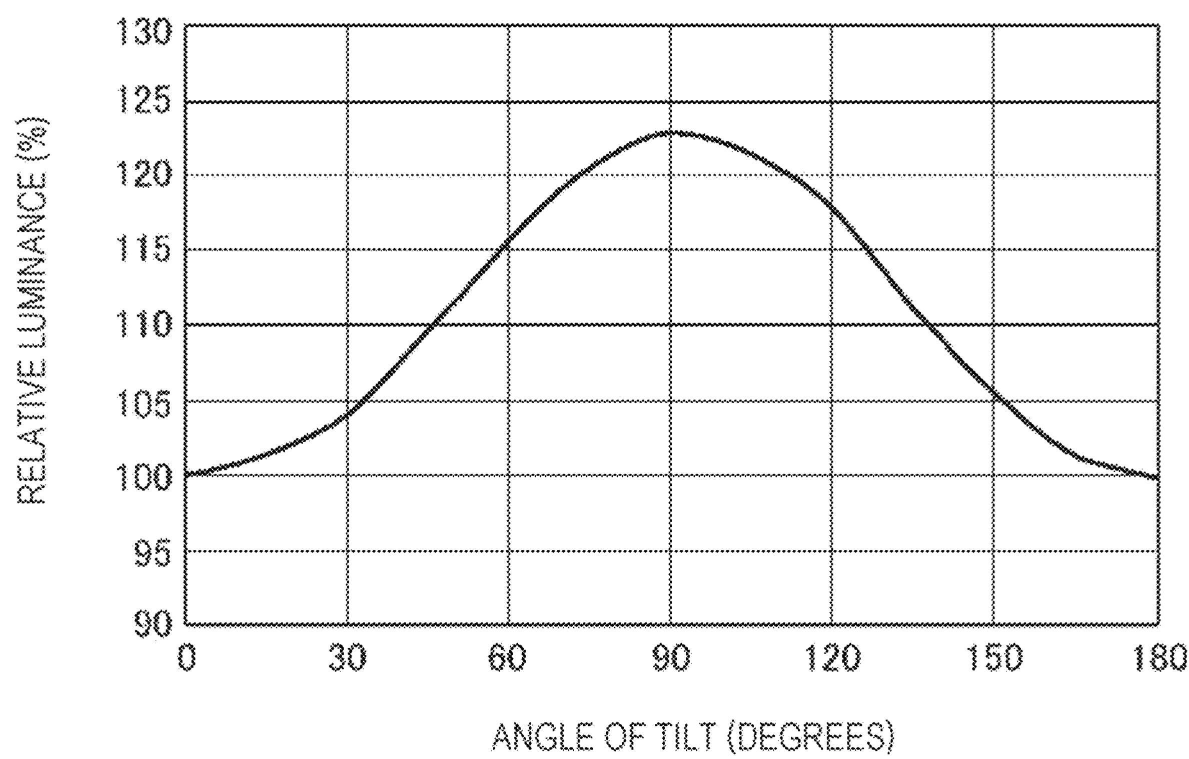
FIG. 43 is a graph showing a relationship between the angle of tilt of a transmission axis of a reflective polarizing sheet and the relative luminance of emitted light in Example 9 of Comparative Experiment 10.

As shown in FIG. 42, the first prism sheet 318 according to the present embodiment includes a first base member 318A made of a material having a non-birefringent property as is the case with a second base member 319A of a second prism sheet 319. The first base member 318A according to the present embodiment is manufactured by forming PC, which is an amorphous transparent resin material having a non-birefringent property, into a sheet shape by melt extrusion as is the case with the second base member 319A. The first base member 318A has a non-birefringent property whose retardation value is defined as 10 nm or smaller, and light passing through the first prism sheet 318 is inhibited with high certainty from being doubly refracted by the first base member 318A. Since the first base member 318A has a non-birefringent property, light having fallen on the liquid crystal panel from the first prism sheet 318 can be prevented from causing colored interference fringes called "rainbow spots" to appear on the display surface of the liquid crystal panel. Usable examples of the amorphous transparent resin material of which the first base member 318A is made include acrylic resin such as PMMA, TAC, and the like in addition to PC; however, PC is suitable.

Next, Comparative Experiment 10 was conducted as follows in order to examine the superiority of a backlight device 312 according to the present embodiment. In Comparative Experiment 10, a first prism sheet 318 whose first base member 318A is made of PC and a second prism sheet 319 whose second base member 319A is made of PC were used, and the luminance of emitted light was measured while a reflective polarizing sheet 320 was being rotated with respect to the first prism sheet 318 and the second prism sheet 319. Specifically, Comparative Experiment 10 includes Example 9, which is a backlight device 312 configured in the same way as Example 1 of Comparative Experiment 1 described above except for including first and second prism sheets 318 and 319 whose respective first second base members 318A and 319A are made of PC. Experimental results of Example 9 are as shown in FIG. 43. In FIG. 43, the horizontal axis represents an angle of tilt (in "degrees") that a transmission axis of the reflective polarizing sheet 320 forms with respect to the X-axis direction, and the vertical axis represents relative luminance (in "%") based on luminance (as 100%) at the time that the angle of tilt of the transmission axis is 0 degree (180 degrees).

The experimental results of Comparative Experiment 10 are explained. According to FIG. 43, Example 9 reaches its minimum luminance when the angle of tilt of the transmission axis is around 0 degree (180 degrees) and reaches its maximum luminance when the angle of tilt of the transmission axis is around 90 degrees. These experimental results are the same as those of Comparative Experiment 8 described above. Of special note is that in Example 9, the maximum luminance exceeds 120% and the luminance difference from the case where the angle of tilt of the transmission axis is 0 degree is greater than in Reference Example 4 and Example 8 of Comparative Experiment 8 described above. A possible reason for this is that since the first base member 318A of the first prism sheet 318, as well as the second base member 319A of the second prism sheet 319, is made of PC, which has a non-birefringent property, a refractive index difference hardly occurs due to the crystal structure, whereby the degree of polarization of light is hardly disturbed and the transmittance of light is kept high.

Embodiment 5

Embodiment 5 of the present disclosure is described with reference to FIG. 44. Embodiment 5 illustrates changes made from Embodiment 2 described above to configure a light-guiding plate 415. It should be noted that a repeated description of structures, workings, effects which are the same as those of Embodiment 2 described above is omitted.

Figure 44:
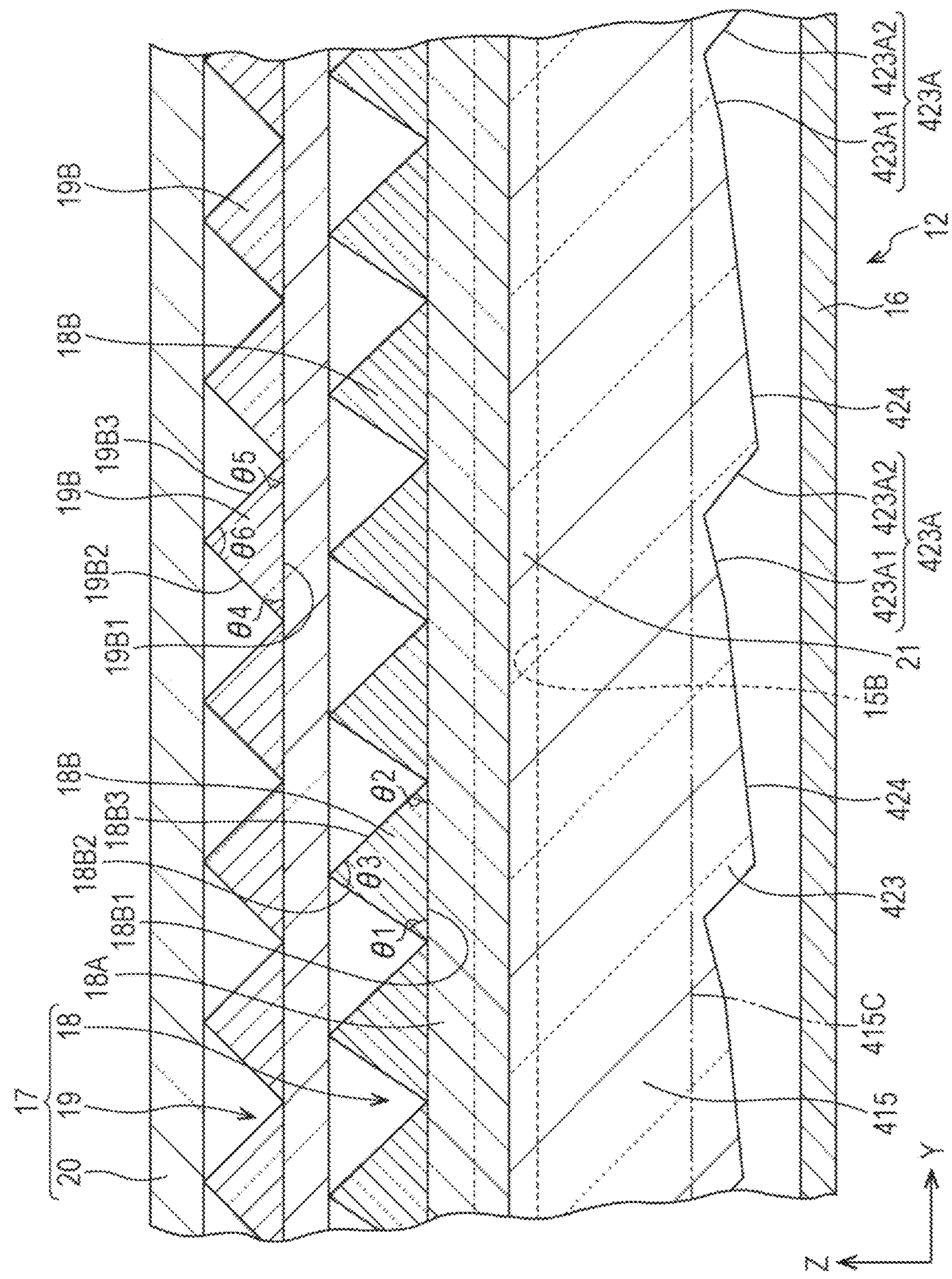
FIG. 44 is a cross-sectional view of a backlight device according to Embodiment 5 of the present disclosure as taken along a Y-axis direction.

As shown in FIG. 44, the light-guiding plate 415 according to the present embodiment differs from Embodiment 2 described above in that an opposite plate surface 415C is provided with an inclined surface 424 as in the case of Embodiment 1 described above. As in the case of Embodiment 2 described above, unit reflectors 423A that constitute a light exit reflector 423 each have a first reflection surface 423A1 whose angle of inclination with respect to the Y-axis direction is for example approximately 6 degrees and a second reflection surface 423A2 whose angle of inclination with respect to the Y-axis direction is for example approximately 40 degrees. The inclined surface 424 has an angle of inclination of, for example, approximately 15 degrees with respect to the Y-axis direction.

Embodiment 6

Embodiment 6 of the present disclosure is described with reference to FIG. 45 or 46. Embodiment 6 illustrates changes made from Embodiment 2 described above to configure a light-guiding plate 515. It should be noted that a repeated description of structures, workings, effects which are the same as those of Embodiment 2 described above is omitted.

Figure 45:
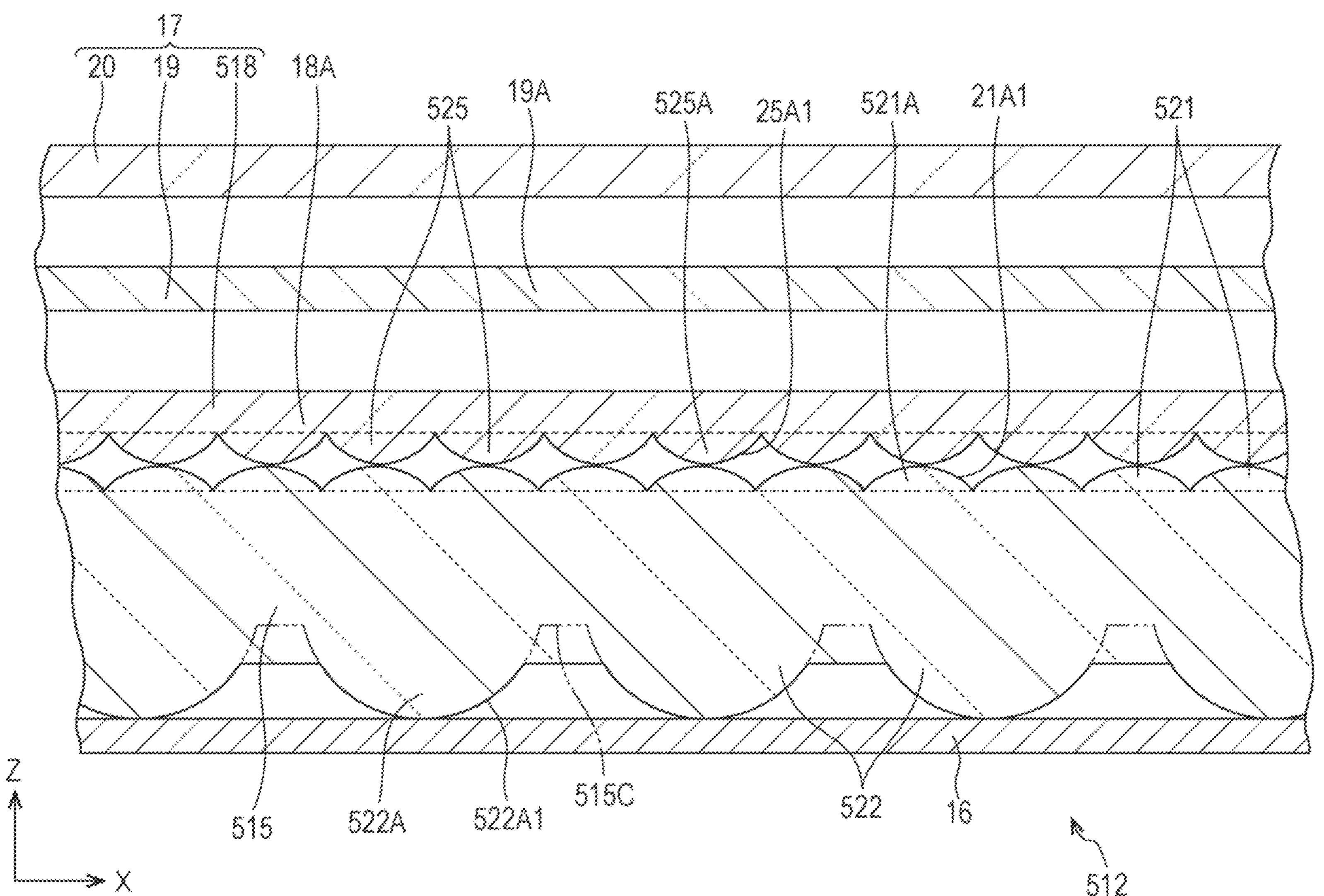
FIG. 45 is a cross-sectional view of a backlight device according to Embodiment 6 of the present disclosure as taken along an X-axis direction.

As shown in FIG. 45, the light-guiding plate 515 according to the present embodiment differs from Embodiment 2 described above in that a second light-guiding plate lens unit 522 is a lenticular lens. Second light-guiding plate unit lenses 522A that constitute the second light-guiding plate lens unit 522 are each a convex cylindrical lens that projects from an opposite plate surface 515C backward. A cross-sectional shape of each of the second light-guiding plate unit lenses 522A as taken along the X-axis direction is a semicircular shape and a semicylindrical shape that extends linearly along the Y-axis direction, and each of the second light-guiding plate unit lenses 522A has its surface serving as an arc surface 522A1. Assuming that an angle that a tangent to a base end of the arc surface 522A1 forms with respect to the X-axis direction is an "angle of contact", the angle of contact of the second light-guiding plate unit lens 522A is for example approximately 30 degrees. The plurality of second light-guiding plate unit lenses 522A arranged along the X-axis direction are substantially equal in all of the angles of contact and the width dimensions (intervals of arrangement) and height dimensions of the bases.

Next, Comparative Experiment 11 was conducted as follows in order to examine the superiority of a backlight device 312 according to the present embodiment. Comparative Experiment 11 was conducted to gain findings as to how the presence or absence of a lens unit 525, a first light-guiding plate lens unit 521, and a second light-guiding plate lens unit 522 and a change in configuration of the second light-guiding plate lens unit 522 affect luminance unevenness that may develop in emitted light. Comparative Experiment 11 involves the use of Comparative Examples 2 and 3 which are the same as those of Comparative Experiment 8 described above. In addition to them, Comparative Experiment 11 includes Reference Example 5, which is a backlight device including a first prism sheet having no lens unit 525, and in Reference Example 5, the angle of contact of each of the second light-guiding plate unit lenses 522A of the second light-guiding plate lens unit 522 is 30 degrees. Furthermore, Comparative Experiment 11 includes Example 10, in which the angle of contact of each of the second light-guiding plate unit lenses 522A of the second light-guiding plate lens unit 522 is 30 degrees, Example 11, in which the angle of contact of each of the second light-guiding plate unit lenses 522A is 49 degrees, and Example 12, in which the angle of contact of each of the second light-guiding plate unit lenses 522A is 62 degrees. In each of Comparative Examples 2 and 3, Reference Example 5, and Examples 10 to 12, the angle of contact of a first light-guiding plate unit lens 521A of the first light-guiding plate lens unit 512 is 50 degrees. Comparative Examples 2 and 3, Reference Example 5, and Examples 10 to 12 are the same in configuration as the backlight device 512 described in the present embodiment, except for the points described above. Moreover, in Comparative Experiment 11, Comparative Examples 2 and 3, Reference Example 5, and Examples 10 to 12 were taken photos of from the front in a glowing state, and on the basis of the photos, the presence or absence of luminance unevenness was determined and Cm values were measured. Experimental results are as shown in FIG. 46. FIG. 46 shows the angles of contact of the unit lenses 525A, the angles of contact of the first light-guiding plate unit lenses 521A, the angles of contact of the second light-guiding plate unit lenses 522A, photos, Cm values, and determination results in Comparative Examples 2 and 3, Reference Example 5, and Examples 10 to 12. A method for determining the presence or absence of luminance unevenness and contents of the determination results are as described in Comparative Experiment 8 described above. Further, an explanation of the CM values is as described in Comparative Experiment 8 described above.

The experimental results of Comparative Experiment 11 are explained. According to FIG. 46, experimental results of Comparative Examples 2 and 3 are as described in Comparative Experiment 8 described above. Reference Example 5 shows a further improvement in luminance unevenness as compared with Comparative Example 3 but is still insufficient in improvement effect, so that the determination result is "INSUFFICIENT" and the Cm value is as large as 0.085. A possible reason for this is that in Reference Example 5, in which the light-guiding plate has a second light-guiding plate lens unit 522 but the first prism sheet has no lens unit 525, the diffusion of light in the X-axis direction is insufficient. On the other hand, Examples 10 to 12, in which luminance unevenness hardly visually recognized, yield determination results of "GOOD" or "FAIR" and small Cm values of 0.061 to 0.066. A possible reason for this is that in Examples 10 to 12, in each of which the light-guiding plate 515 has a second light-guiding plate lens unit 522 and the first prism sheet 518 has a lens unit 525, light is sufficiently diffused in the X-axis direction. Comparing Examples 10 to 12 shows that Example 10, in which the angle of contact of each of the second light-guiding plate unit lenses 522A is 30 degrees, are more highly effective than Examples 11 and 12 in improving luminance unevenness.

Embodiment 7

Embodiment 7 of the present disclosure is described with reference to FIG. 47 or 48. Embodiment 7 illustrates changes made from Embodiment 2 described above to configure a first prism sheet 618. It should be noted that a repeated description of structures, workings, effects which are the same as those of Embodiment 2 described above is omitted.

Figure 47:
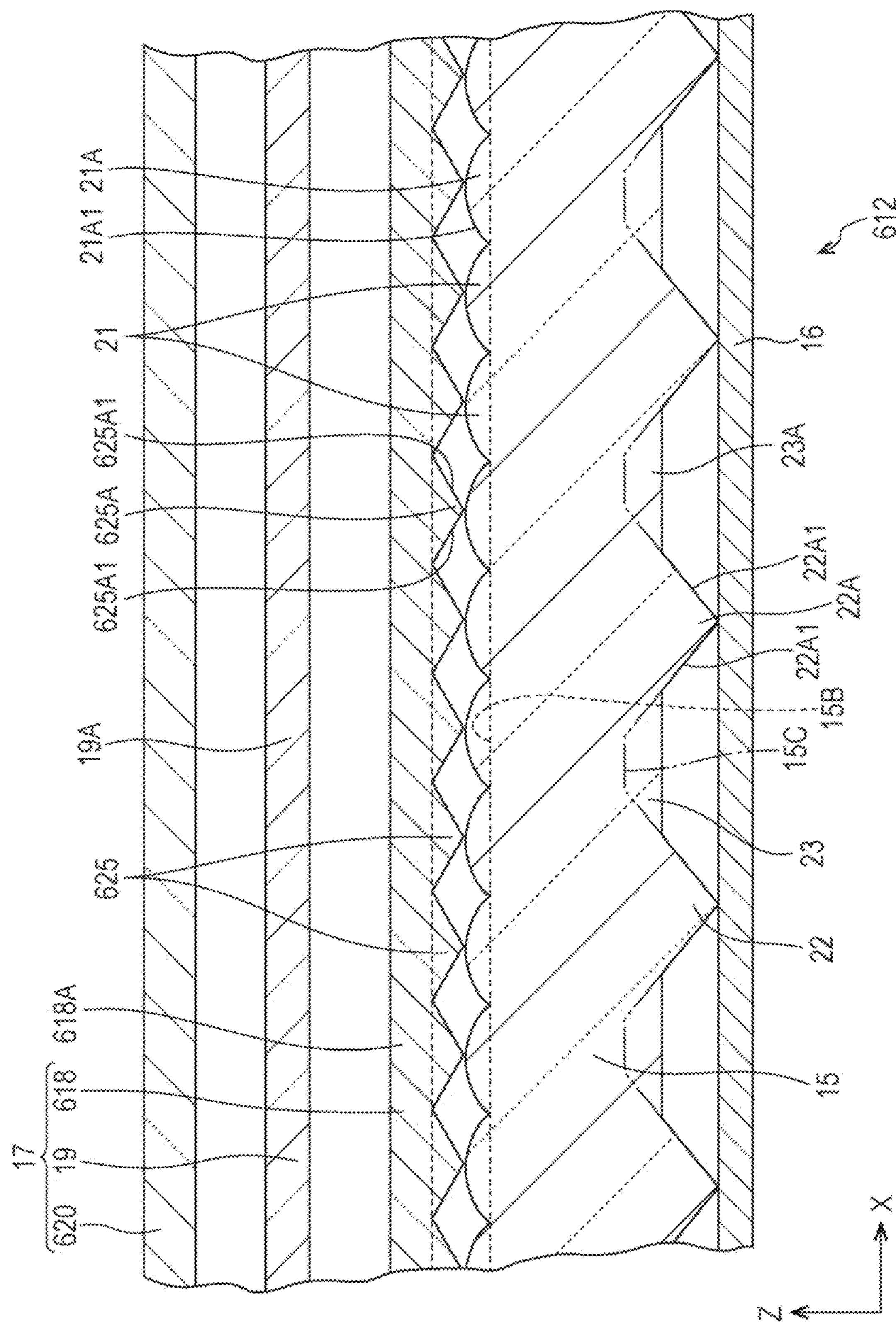
FIG. 47 is a cross-sectional view of a backlight device according to Embodiment 7 of the present disclosure as taken along an X-axis direction.
Figure 48:
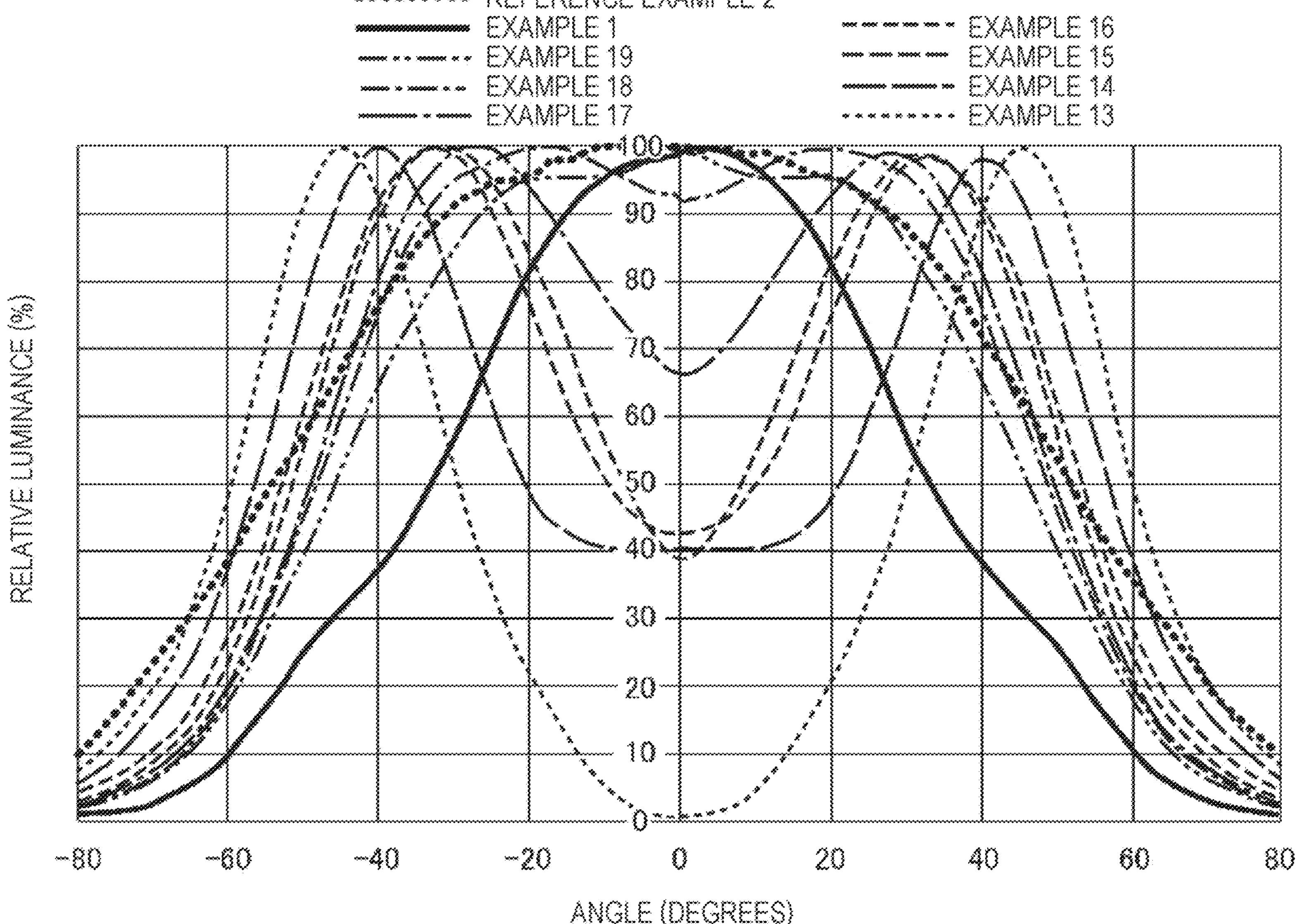
FIG. 48 is a graph showing a luminance angle distribution in the X-axis direction of light emitted from a reflective polarizing sheet in Comparative Experiment 12.

As shown in FIG. 47, the first prism sheet 618 according to the present embodiment has a lens unit 625 that is a prism lens. The lens unit 625 includes unit lenses 625A each of which is a convex prism that projects from a back plate surface C of a first base member 618A backward. A cross-sectional shape of each of the unit lenses 625A as taken along the X-axis direction forms a substantially triangular shape (substantially mountain shape) and extends linearly along the Y-axis direction. Each of the unit lenses 625A has its width dimension uniform over the entire length in the first direction. Each of the unit lenses 625A is substantially isosceles triangular in cross-section and has a pair of oblique surfaces 625A1, and it is preferable that the vertex angle of each of the unit lenses 625A be an obtuse angle (angle exceeding 90 degrees) or, specifically, be in a range of 110 to 145 degrees, most preferably 140 to 145 degrees. In some cases, it is preferable that the vertex angle be in a range of 110 to 130 degrees. The plurality of unit lenses 625A arranged along the X-axis direction are substantially equal in all of the vertex angles and the width dimensions (intervals of arrangement) and height dimensions of the bases.

Next, Comparative Experiment 12 was conducted as follows in order to examine the superiority of a backlight device 612 according to the present embodiment. In Comparative Experiment 12, luminance angle distributions in the X-axis direction of light emitted from backlight devices 612 were measured with use of first prism sheets 618 whose lens units 625 are constituted by unit lenses 625A having vertex angles of 90, 100, 110, 120, 130, 140, and 145 degrees, respectively. Comparative Experiment 12 includes Example 13, in which the vertex angle of each of the unit lenses 625A is 90 degrees, Example 14, in which the vertex angle of each of the unit lenses 625A is 100 degrees, Example 15, in which the vertex angle of each of the unit lenses 625A is 110 degrees, Example 16, in which the vertex angle of each of the unit lenses 625A is 120 degrees, Example 17, in which the vertex angle of each of the unit lenses 625A is 130 degrees, Example 18, in which the vertex angle of each of the unit lenses 625A is 140 degrees, and Example 19, in which the vertex angle of each of the unit lenses 625A is 145 degrees. Experimental results are as shown in FIG. 48. The experimental results of Comparative Experiment 12 are put down with Reference Example 2, which indicates a reference luminance angle distribution in the X-axis direction. Reference Example 2 is a backlight device of the same configuration as Comparative Example 1 of Comparative Experiment 1. In addition, the experimental results of Comparative Experiment 12 are put down with a luminance angle distribution in the X-axis direction of Example 1 of Comparative Experiment 1 described above. FIG. 48 shows luminance angle distributions in the X-axis direction of light emitted from reflective polarizing sheets 620. In FIG. 48, the vertical axis represents relative luminance (in "%") based on maximum luminance (as 100%), and the horizontal axis represents angles (in "degrees") in the X-axis direction with respect to the frontal direction (Z-axis direction). The positive and negative signs assigned to this horizontal axis are the same in meaning as the description of FIGS. 6 to 9 of Demonstration Experiment 1 described above.

The experimental results of Comparative Experiment 12 are explained. According to FIG. 48, each of Examples 13 to 18, in which the vertex angle of each of the unit lenses 525A is 140 degrees or smaller, exhibits two luminance peaks across the frontal direction and accordingly tends to be lower in frontal luminance. On the other hand, Example 19, in which the vertex angle of each of the unit lenses 525A is 145 degrees exceeding 140 degrees, is highest in frontal luminance by having a luminance peak corresponding to the frontal direction and exhibits an luminance angle distribution which approximates to that of Reference Example 2. Accordingly, it can be said that Example 19 is best in viewing angle characteristics and frontal luminance. Of Examples 13 to 18, Example 18, in which the vertex angle of each of the unit lenses 525A is 140 degrees, exhibits a minor decrease in frontal luminance due to the appearance of the two luminance peaks and exhibits a luminance angle distribution which is close to that of Example 19. Incidentally, for example, in a case where the liquid crystal display device is mounted on a vehicle for use, an image might be viewed from a driver's seat and a passenger seat. In such a case, since a luminance angle distribution of light emitted from the liquid crystal display device needs to have luminance peaks for both the driver's seat and the passenger seat, it is suitable to apply Examples 13 to 17. Above all, Examples 15 to 17 are especially suitable, as a luminance peak having an angle of around ±30 degrees provides excellent viewability from both the driver's seat and the passenger seat.

OTHER EMBODIMENTS

The present disclosure is not limited to the embodiments described above with reference to the drawings. The following embodiments may be included in the technical scope of the present disclosure.

(1) Each of the embodiments described above has illustrated a case where the vertex angle of each of the second unit prisms of the second prism sheet is 90 degrees. However, as long as the vertex angle is in a range of 80 to 100 degrees, good viewing angle characteristics can be attained. Therefore, it is possible to change specific angles within the range. Further, the vertex angle may be out of the range of 80 to 100 degrees. Even in that case, better viewing angle characteristics can be attained than in a case where the pair of oblique angles form different angles with respect to the base.

(2) Each of the embodiments described above has illustrated a case where the angle that the LED opposing oblique side of each of the first unit prisms of the first prism sheet forms with respect to the base is 45 degrees. However, as long as the angle is in a range of 35 to 50 degrees, good viewing angle characteristics can be attained. Therefore, it is possible to change specific angles within the range. Further, the angle may be out of the range of 35 to 50 degrees.

(3) Each of the embodiments described above has illustrated a case where the angle that the LED facing oblique side of each of the first unit prisms of the first prism sheet forms with respect to the base is 55 degrees. However, as long as the angle is in a range of 50 to 60 degrees, a sufficient luminance-improving effect can be brought about. Therefore, it is possible to change specific angles within the range. Further, the vertex angle may be out of the range of 50 to 60 degrees.

(4) Each of the embodiments described above has illustrated a case where the refractive index of each of the first unit prisms of the first prism sheet is in a range of 1.49 to 1.52. However, depending on the chromaticity that emitted light needs to have, it is possible to set the refractive index out of the range of 1.49 to 1.52.

(5) Besides each of the embodiments described above, it is possible to appropriately change the numerical values of the specific angles of inclination of the reflection surfaces and inclined surfaces of the light exit reflector of the light-guiding plate.

(6) Besides each of the embodiments described above, it is possible to appropriately change the specific numerical values of the vertex angles and angles of contact of the first and second light-guiding plate unit lenses of the first and second light-guiding lens units of the light-guiding plate.

(7) Besides each of the embodiments described above, it is possible to appropriately change the specific materials of which the first and second base members of the first and second prism sheets are made. Similarly, it is possible to appropriately change the specific materials of which the first and second unit prisms are made.

(8) Each of the embodiments described above has illustrated a case where the first and second unit prisms of the first and second prism sheets are simply triangular in cross-section. However, it is possible to appropriately change the specific cross-sectional shapes of the first and second unit prisms. In that case, for example, it is preferable that either oblique side of each of the first and second unit prisms be formed into a curved shape so as to have plural angles of inclination.

(9) Each of the embodiments described above has illustrated a case where the opposite plate surface of the light-guiding plate is provided with the light exit reflector. However, the light exit plate surface of the light-guiding plate may be provided with the light exit reflector.

(10) Each of the embodiments described above has illustrated a case where the light-guiding plate includes the first light-guiding plate lens unit and the second light-guiding plate lens unit. However, it is possible to omit either or both of the first and second light-guiding plate lens units. Similarly, it is also possible to omit the light exit reflector from the light-guiding plate. In that case, it is preferable to separately provide the light exit plate surface or opposite plate surface of the light-guiding plate with a structure for promoting emission of light.

(11) Each of the embodiments described above has illustrated a case where the light-guiding plate has a substantially uniform thickness over the entire length and has a flat opposite plate surface. However, the light-guiding plate may be configured to have a thickness that becomes gradually smaller away from the LED and have an inclined opposite plate surface.

(12) Each of the embodiments described above has illustrated a case where the liquid crystal display device and the backlight device are rectangular in planar shape. However, the liquid crystal display device and the backlight device may for example be square, circular, elliptical, trapezoidal, or rhomboidal in planar shape. In the case of a change in planar shape of the backlight device, it is enough to change the planar shapes of its constituent members (such as the light-guiding plate, the reflective sheet, and the optical sheets) accordingly.

(13) Each of the embodiments described above has illustrated a case where the reflective polarizing sheet has the polarizing layer and the multilayer film. However, the reflective polarizing sheet may be configured to include a multilayer film without including a polarizing layer. In that case, a polarizing plate including a polarizing layer needs only be attached to the liquid crystal panel separately from the reflective polarizing sheet.

(14) Each of the embodiments described above has illustrated a case where the LED is of a top-surface-emitting type. However, the LED may be of a side-surface-emitting type.

The present disclosure contains subject matter related to that disclosed in Japanese Priority Patent Application JP 2019-008050 filed in the Japan Patent Office on Jan. 21, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lighting device comprising:

a light source;

a light-guiding plate that forms a plate shape, at least a part of whose outer peripheral end face serves as a light entrance end face on which light emitted from the light source falls, and a first plate surface of which serves as a light exit plate surface from which light is emitted;

a first prism sheet, placed on a light exit side of the light-guiding plate, that includes a plurality of first unit prisms which are arranged along a first direction including a direction from the light source toward the light-guiding plate and which extend along a second direction orthogonal to both the first direction and a plate thickness direction of the light-guiding plate; and a second prism sheet, placed on a light exit side of the first prism sheet, that includes a plurality of second unit prisms which are arranged along the first direction and which extend along the second direction, wherein each of the first and second unit prisms of the first and second prism sheets has a base that is parallel to the first direction and a pair of oblique sides standing from both ends, respectively, of the base, an angle that one of the oblique sides that faces toward the light source forms with respect to the base in the first direction in the second unit prism is smaller than an angle that the oblique side that faces toward the light source forms with respect to the base in the first direction in the first unit prism, the light-guiding plate includes a light exit reflector provided on an opposite plate surface that is a plate surface opposite to the light exit plate surface or on the light exit plate surface, the light exit reflector includes a plurality of unit reflectors arranged at intervals along the first direction, the opposite plate surface and the light exit plate surface of the light-guiding plate include a plate surface on which the light exit reflector is placed, the plate surface is provided with an inclined surface, placed adjacent to the unit reflectors in the first direction, that has a gradient whose distance from a plate surface on which the light exit reflector is not placed becomes gradually greater away from the light source, each of the unit reflectors of the light exit reflector has a first reflection surface placed toward the light source in the first direction and inclined with respect to the first direction and a second reflection surface disposed on a side opposite to the first reflection surface and inclined with respect to the first direction, and the light-guiding plate is configured such that an angle of inclination of the second reflection surface with respect to the first direction is larger than an angle of inclination of the first reflection surface with respect to the first direction and the angle of inclination of the first reflection surface with respect to the first direction is larger than an angle of inclination of the inclined surface with respect to the first direction.

2. The lighting device according to claim 1, wherein the second prism sheet is configured such that the pair of oblique sides of the second unit prism form equals angles with respect to the base.

3. The lighting device according to claim 2, wherein the second prism sheet is configured such that the pair of oblique sides of the second unit prism form an angle in a range of 80 to 100 degrees with each other.

4. The lighting device according to claim 3, wherein the first prism sheet is configured such that one of the oblique sides that is located on a side opposite to the light source forms an angle in a range of 35 to 50 degrees with respect to the base.

5. The lighting device according to claim 4, wherein the first prism sheet is configured such that the oblique side located on the side opposite to the light source forms an angle of 45 degrees with respect to the base.

6. The lighting device according to claim 5, wherein the first prism sheet is configured such that the oblique side that faces toward the light source forms an angle in a range of 50 to 60 degrees with respect to the base.

7. The lighting device according to claim 6, wherein the first prism sheet is configured such that the oblique side that faces toward the light source forms an angle of 55 degrees with respect to the base.

8. The lighting device according to claim 3, further comprising a reflective polarizing sheet, placed on a light exit side of the second prism sheet, that includes a multilayer film in which layers differing in refractive index from each other are alternately stacked.

9. The lighting device according to claim 1, wherein the first prism sheet is configured such that the first unit prism has a refractive index in a range of 1.49 to 1.52.

10. The lighting device according to claim 1, wherein the first prism sheet includes a first base member formed in a sheet shape and provided with a plurality of the first unit prisms on a light exit side plate surface and a lens unit provided on a plate surface opposite to the light exit side of the first base member, and the lens unit includes a plurality of unit lenses extending along the first direction and arranged along the second direction.

11. The lighting device according to claim 1, wherein the second prism sheet includes a second base member, formed in a sheet shape and provided with a plurality of the second unit prisms on a light exit side plate face, that has a non-birefringent property.

12. The lighting device according to claim 1, wherein the light-guiding plate includes a light-guiding plate lens unit provided on at least either an opposite plate surface that is a plate surface opposite to the light exit plate surface or on the light exit plate surface, and the light-guiding plate lens unit includes a plurality of light-guiding plate unit lenses extending along the first direction and arranged along the second direction.

13. A display device comprising:

the lighting device according to claim 1; and a display panel that performs a display through use of light from the lighting device.

* * * * *